(12) United States Patent
Slezak et al.

(10) Patent No.: US 11,301,467 B2
(45) Date of Patent: Apr. 12, 2022

(54) SYSTEMS AND METHODS FOR INTELLIGENT CAPTURE AND FAST TRANSFORMATIONS OF GRANULATED DATA SUMMARIES IN DATABASE ENGINES

(71) Applicant: Security On-Demand, Inc., San Diego, CA (US)

(72) Inventors: Dominik Slezak, Warsaw (PL); Richard Glick, Valley Center, CA (US); Pawel Betlinski, Warsaw (PL); Piotr Synak, Winterthur (CH); Jakub Wroblewski, Lomianki (PL); Agnieszka Chadzynska-Krasowska, Sulejowek (PL); Janusz Borkowski, Warsaw (PL); Arkadiusz Wojna, Warsaw (PL); Joel Alan Holland, Encinitas, CA (US)

(73) Assignee: Security On-Demand, Inc., San Diego, CA (US)

( * ) Notice: Subject to any disclaimer, the term of this patent is extended or adjusted under 35 U.S.C. 154(b) by 463 days.

(21) Appl. No.: 16/459,274

(22) Filed: Jul. 1, 2019

(65) Prior Publication Data

US 2020/0004749 A1 Jan. 2, 2020

Related U.S. Application Data

(60) Provisional application No. 62/691,751, filed on Jun. 29, 2018.

(51) Int. Cl.
*G06F 16/2458* (2019.01)
*G06F 16/2453* (2019.01)
(Continued)

(52) U.S. Cl.
CPC .... *G06F 16/24539* (2019.01); *G06F 16/2282* (2019.01); *G06F 16/2462* (2019.01); *G06N 5/003* (2013.01)

(58) Field of Classification Search
CPC .......... G06F 16/24539; G06F 16/2282; G06F 16/2462; G06N 5/003
See application file for complete search history.

(56) References Cited

U.S. PATENT DOCUMENTS 6,671,772 B1 12/2003 Cousins et al.
8,266,147 B2 9/2012 Slezak et al.
(Continued)

FOREIGN PATENT DOCUMENTS

WO 2008034219 A1 3/2008

OTHER PUBLICATIONS

International Preliminary Report on Patentability for International Patent Application No. PCT/CA2007/001627 dated Jan. 7, 2008.
(Continued)

*Primary Examiner* — Kris E Mackes
(74) *Attorney, Agent, or Firm* — Smith, Gambrell & Russell LLP

(57) ABSTRACT

Embodiments may provide methods and systems for intelligent capture and fast transformation of granulated data summaries. An engine may be used to transform input data summaries into result sets representing query outcomes. The data summaries contain enough knowledge about the original data to accurately perform operations on the summaries without needing to access the original data. In an embodiment, the contents of data summaries are accessible via an SQL approximate engine which retrieves summaries stored on disk and utilizes them for its operations. Alternatively, the contents of data summaries are accessible via virtual tables which give users direct access to the summary contents and (Continued)

allow for the creation and implementation of algorithms to work with the data summaries independently from the SQL approximate engine.

30 Claims, 37 Drawing Sheets

(51) Int. Cl.
  *G06N 5/00* (2006.01)
  *G06F 16/22* (2019.01)

(56) References Cited

U.S. PATENT DOCUMENTS

| | | | |
|---|---|---|---|
| 8,417,727 | B2 | 4/2013 | Slezak et al. |
| 8,521,748 | B2 | 8/2013 | Slezak et al. |
| 8,700,579 | B2 | 4/2014 | Apanowicz et al. |
| 8,838,593 | B2 | 9/2014 | Wroblewski et al. |
| 8,943,100 | B2 | 1/2015 | Slezak et al. |
| 9,519,676 | B1* | 12/2016 | Finnie ............... G06F 16/2358 |
| 2001/9042167 | | 11/2001 | Ewaga |
| 2002/0007368 | A1 | 1/2002 | Lee et al. |
| 2003/0176931 | A1 | 9/2003 | Pednault et al. |
| 2003/0212713 | A1 | 11/2003 | Campos et al. |
| 2011/0145223 | A1* | 6/2011 | Cormode ............ G06F 16/2462 707/722 |
| 2011/0295786 | A1* | 12/2011 | Reynolds ........... H03M 13/1111 706/46 |
| 2013/0268520 | A1* | 10/2013 | Fisher ................ G06F 16/2455 707/723 |
| 2014/0114941 | A1 | 4/2014 | Ahlberg et al. |
| 2014/0136563 | A1* | 5/2014 | Pompey .............. G06F 16/2477 707/760 |
| 2011/4022945 | | 8/2014 | Slezak et al. |
| 2014/0280065 | A1 | 9/2014 | Cronin et al. |
| 2014/0337315 | A1 | 11/2014 | Slezak et al. |
| 2015/0006508 | A1 | 1/2015 | Slezak et al. |
| 2015/0088807 | A1* | 3/2015 | Toppin ................. G06F 16/254 707/602 |

OTHER PUBLICATIONS

Written Opinion of the International Searching Authority for International Patent Application No. PCT/CA2007/001627 dated Jan. 7, 2008.

Chadzynska-Krasowska et al., A Metadata Diagnostic Framework for a New Approximate Query Engine Working With Granulated Data Summaries. Rough Sets: International Joint Conference, IJCRS 2017, Olsztyn, Poland, Jul. 3-7, 2017, Proceedings, Part I pp. 623-643.

Slezak el al., Scalable Cyber-Security Analytics with a New Summary-based Approximate Query Engine. 2017 IEEE International Conference on Big Data (Big Data), Boston, MA, USA, Dec. 11-14, 2017, pp. 1840-1849.

Slezak et al., Rough SQL—Semantics and Execution. IPMU 2012, Part II, Communications in Computer and Information Science 298, Jul. 2012, pp. 570-579.

Chadzynska-Krasowska et al., Quality of Histograms as Indicator of Approximate Query Quality. 2016 Federated Conference on Computer Science and Information Systems (FedCSIS), Sep. 11-14, 2016, pp. 9-15.

Slezak et al., A New Approximate Query Engine Based on Intelligent Capture and Fast Transformations of Granulated Data Summaries. Journal of Intelligent Information Systems, vol. 50, Issue 2, Jul. 2017, pp. 385-414.

International Search Report for International Patent Application No. PCT/US2019/40168 dated Sep. 27, 2019.

Written Opinion for International Patent Application No. PCT/US2019/40168 dated Sep. 27, 2019.

* cited by examiner

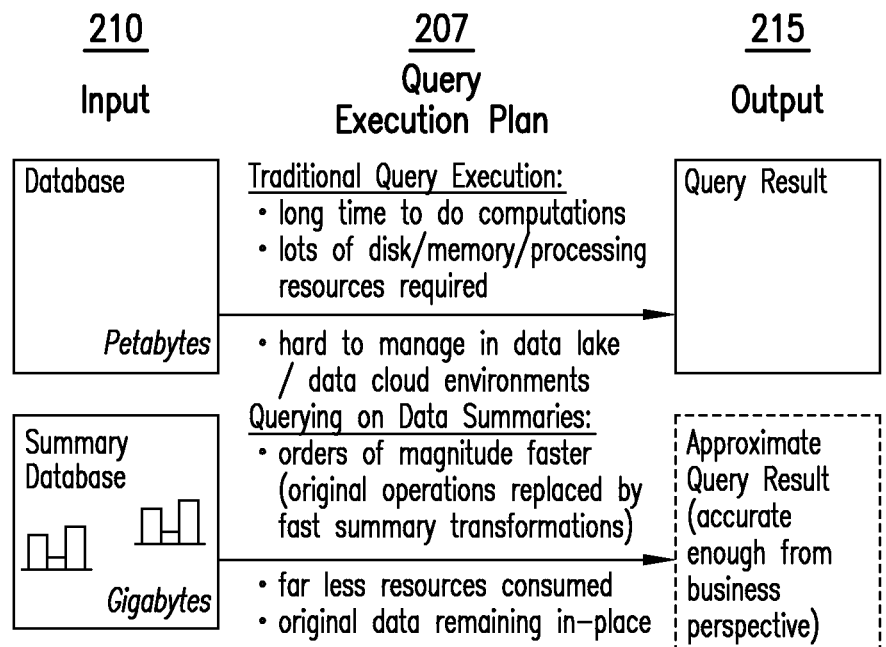

FIG.1A

| Use Case 220 | Improvements 230 |
|---|---|
| Intrusion Detection | faster analytics ►<br>► improved reaction time<br>► improved customer retention |
| Digital Advertising | richer sources of analytics ►<br>► improved quality of customer profiles<br>► increased click-thru customer revenue |
| Sensor-based Monitoring of Industry Processes | faster/deeper machine learning ►<br>► improved risk prediction efficiency<br>► lower cost of incorrect predictions |

| Algorithm 1 histogram construction |
|---|
| Input: *list*: sorted list of values *v* of column *c* in packrow *t* in table *T*;<br>    *max_no_of_areas*: maximum number of equal-length long intervals (8 by default)<br>    *max_no_of_bars*: maximum number of resulting histogram bars (64 by default)<br>Output: *cuts*: the list of cut-points between bars describing *c* in packrow *t*;<br>1: begin<br>2:  if the number of distinct values in the list $\leq$ *max_no_of_bars* then<br>3:     add to *cuts* all elements of *list* except max(*list*);<br>4:  else<br>5:     split [min(*list*), max(*list*)] onto *max_no_of_areas* intervals of equal length;<br>6:     remove intervals which do not contain any elements of *list*;<br>7:     shift intervals' right and left sides to their closest leftmost elements of *list*;<br>8:     add all intervals' right sides except max(*list*) to *cuts*;<br>9:     *no_of_waiting_areas* ← the number of intervals;<br>10:    *no_of_undefined_bars* ← *max_no_of_bars*;<br>11:    for all intervals sorted by the number of elements of *list* that they contain do<br>12:        # ← the number of elements of *list* contained in the considered interval;<br>13:        if # $\leq$ [bno_of_undefined_bars /no_of_waiting_areasc] then<br>14:           add to *cuts* all elements of *list* contained in the considered interval;<br>15:        else<br>16:           # ← [bno_of_undefined_bars /no_of_waiting_areasc];<br>17:           split the considered interval onto # bars with roughly uniform supports;<br>18:           and cut-points between the obtained bars to *cuts*;<br>19:        end if<br>20:        *no_of_waiting_areas* ← *no_of_waiting_areas* − 1;<br>21:        *no_of_undefined_bars* ← *no_of_undefined_bars* − #;<br>22:    end for<br>23: end if<br>24: end |

252 — Input block
260 — lines 3–4
270 — lines 14–18

FIG.2A

340 (data summaries)

| Table/COLUMN | Description of Contents |
|---|---|
| All tables | Columns identifying specific packrows in all considered metadata tables |
| database_name | Database name |
| table_name | Table name |
| packrow_code | Packrow identifier |
| table *packrow* | Basic information about specific packrows |
| packrow_count | The number of original rows collected within the packrow ($2^{16}$ by default) |
| table *pack* | Information about values in data packs |
| column_name | Column name |
| min_value | Minimum value occurring in the data pack |
| max_value | Maximum value occurring in the data pack |
| gcd | Greatest common divisor for all values in the data pack |
| hist_type | Histogram type |
| table *bar* | Information about particular bars |
| column_name | Column name |
| code | Bar identifier (unique in the data pack) |
| left | Minimum value in the bar |
| right | Maximum value in the bar |
| freq | Number of rows with values contained within the bar's range |
| special_values_freq | Number of rows with special values in the bar |
| special_values_no | Number of special values in the bar |
| cumulative_gaps_len | Cumulative length of gaps in the bar |
| modeled_values_no | Number of unique values which can be generated |
| table *special* | Information about special values |
| column_name | Column name |
| code | Special value identifier (unique in the data pack) |
| value | Value |
| freq | Number of rows with the special value |
| bar_code | Identifier of the bar containing the special value |
| table *gap* | Information about gaps |
| column_name | Column name |

340 (data summaries)

Continue From FIG.5C

| | |
|---|---|
| *code* | Gap identifier (unique in the data pack) |
| *left* | Left border of the gap |
| *right* | Right border of the gap |
| *bar_code* | Identifier of the bar which contains the gap |
| table *pack_pack* | Co-occurrence ratios not present in tables *bar_bar* and *special_special* |
| *column_name_1* | The first column in the pair |
| *column_name_2* | The second column in the pair |
| *default_bar_bar_tau* | Default ratio for pairs of bars not present in table *bar_bar* |
| *default_not_covered_special_special_tau* | Default ratio for pairs of special values not present in table *special_special* and whose "parents" (bars they belong to) are not present in table *bar_bar* |
| table *bar_bar* | Information about co-occurrence ratios at the level of pairs of bars |
| *column_name_1* | The first column in the pair |
| *code_1* | First column's bar identifier |
| *column_name_2* | The second column in the pair |
| *code_2* | Second column's bar identifier |
| *tau* | Ratio for the pair of bars |
| *default_special_special_tau* | Default ratio for pairs of special values belonging to the considered pair of bars that are not present in table *special_special* |
| table *special_special* | Information about co-occurrence ratios for pairs of special values |
| *column_name_1* | The first column in the pair |
| *code_1* | First column's special value identifier |
| *column_name_2* | The second column in the pair |
| *code_2* | Second column's special value identifier |
| *tau* | Ratio for the pair of special values |
| *is_covered* | Does the pair of special values belong to a pair of bars in table *bar_bar* |

| Algorithm 2 WHERE-related belief propagation |
| --- |

Input: $t^\sim$: summarized representation of packrow $t$ of table $T$;
       $B$: columns in $T$ that will be required at further stages of query $Q$;
       $C$: columns in $T$ that correspond to conjunction of conditions in $Q$;
Output: $t^{\sim O}$: summarized representation of the filtered content of packrow $t$;

410   1: begin
        2:   initiate undirected graph $G_t$ with nodes corresponding to columns in $B \cup C$ ;
        3:   connect each pair of columns represented by at least one co-occurrence ratio in $t^\sim$;
415   4:   set $p_t(Q) \leftarrow 1 -$ estimated ratio of rows holding $Q$'s filters on $C$;
        5:   for all $G_t$'s connected components denoted by $G_t^X$, defined over $X \subseteq B \cup C$ do
        6:     construct spanning tree $S_t^X$ maximizing the sum of values of $I_t$ (equation (6));
        7:     find $a \in X$ with the minimum average distance to nodes $c \in C \cap X$ in $S_t^X$;
        8:     use $a$ as the root of directed tree $\vec{S}_t^X$ created at the basis of $S_t^X$;
417   9:     for all $c \in C \cap X$ do
      10:       create variable $c_Q$ with two single-valued ranges $r_Q^c[1]$ and $r_Q^c[2]$;
      11:       extend tree $\vec{S}_t^X$ by adding node $c_Q$ and making it a child of $c$;
418   12:       use equation (7) to set probabilities $p_t(r_Q^c[1]/r_t^c[i])$ of $c_Q$ subject to $c$;
      13:     end for
419   14:     use equations (10–11) to run $-$downward $\vec{S}_t^X$-based belief propagation;
420   15:     use equation (14) to derive $p_t(Q^{\downarrow X})$ – ratio of rows holding filters on $C \cap X$;
      16:     $p_t(Q) \leftarrow p_t(Q) \cdot p_t(Q^{\downarrow X})$;
      17:   end for
      18:   if $p_t(Q) > 0$ then
425   19:     for all directed trees $\vec{S}_t^X$ do
      20:       use equations (12–13) to run $-$upward $\vec{S}_t^X$-based belief propagation;
      21:       use proportion (9) to add to $t^{\sim O}$ the revised summaries for columns in $B \cap X$;
      22:       for all pairs of columns $a,b \in B \cap X$ which were connected in $G_t$ do
      23:         if $a$ and $b$ are not directly connected in $\vec{S}_t^X$ then
      24:           if $\vec{S}_t^X$ contains directed path from $a$ to $b$ or from $b$ to $a$ then
      25:             temporarily replace $b$'s parent with $a$ or $a$'s parent with $b$;
      26:           else
426   27:             do one of the above, replacing temporarily an edge with lower $I_t$;
      28:           end if
      29:         end if
      30:         use equation (15) to add to $t^{\sim O}$ the revised co-occurrence ratios for $a$ and $b$;
      31:       end for
      32:     end for
      33:   else
      34:     flash $t^{\sim O}$ and ignore packrow $t$ during further execution of $Q$;
428   35:   end if
      36: end

FIG.7B

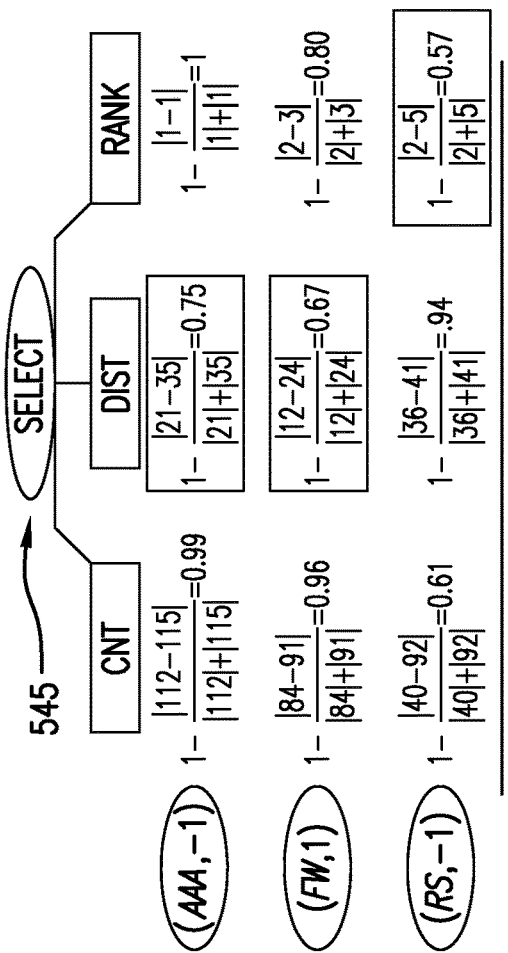
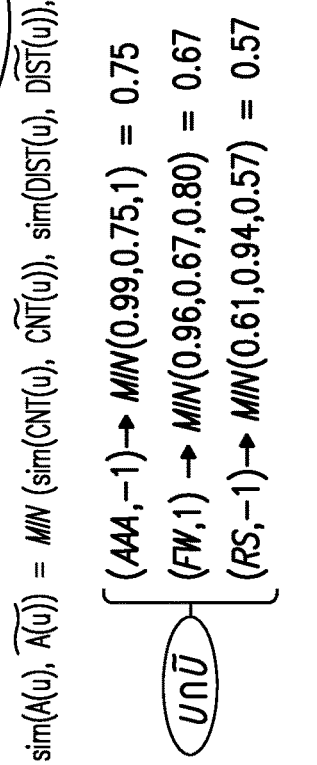
FIG. 14A

590

Algorithm 3 Simplified mRMR feature selection method

Input: the set of features $A$ and the dependent variable $d$; $\varphi: A \times A \cup \{d\} \longrightarrow [0, +\infty)$ function for measuring pairwise dependencies;
Output: the ordered set of features $A^0 = A$
1: begin
2: $A^0 \longleftarrow \text{argmax}_{a \in A} \varphi(a, d); A \longleftarrow A \setminus A^0$;
3: while $A \ 6 = \phi$ do
4: $\quad a^- \longleftarrow \text{argmax}_{a \in A}(\varphi(a, d) - \text{avg}_{b \in A^0} \varphi(a, b))$;
5: $\quad A^0 \longleftarrow A^0 \cup \{a^-\}; A \longleftarrow A \setminus \{a^-\}$;
6: end while
7: end

FIG.23

SYSTEMS AND METHODS FOR INTELLIGENT CAPTURE AND FAST TRANSFORMATIONS OF GRANULATED DATA SUMMARIES IN DATABASE ENGINES

FIELD OF INVENTION

The present disclosure relates generally to database engines and methods and systems of capturing data and providing data summaries that are utilized to execute queries on databases without accessing the original data.

BACKGROUND

The present disclosure relates to processes of intelligent creation and utilization of granulated data summaries in an engine aimed at fast approximate execution of analytical SQL statements. In an embodiment, an engine may be used for the purposes of ad-hoc data exploration over large and quickly increasing data collected in a heterogeneous or distributed fashion. Input data summaries may be transformed into result sets representing query outcomes. Further, computational principles may be put together with other paradigms of scaling and harnessing data analytics.

Existing database engines may cluster incoming rows into so-called packrows, further decomposed into data packs gathering values of particular columns. In these frameworks, packrows can be described by simple summaries accessible independently from the underlying data. One may combine the ideas taken from classical database technologies and the theory of rough sets, by means of using summaries to classify data packs as relevant, irrelevant and partially relevant for particular SELECT statements—by analogy to deriving rough set positive, negative and boundary regions of the considered concepts, respectively. Such higher-level classifications can be useful to limit the amounts of compressed data packs required to access to finish calculations.

Presently, existing engines include rough query functionality developed for the purposes of both external usage and internal query execution accelerations in order to quickly deliver some bounds for actual query results. However, it is hard to configure other tools to work with such a new kind of output syntax. External tools expect engines to use rough query capabilities to generate approximate results in standard format. Somewhat in parallel, the academic community has been encouraged to design summary-based machine learning and knowledge discovery methods. However, once the original data access is disallowed, summaries stored within that previous framework cannot provide the new versions of machine learning algorithms with sufficient information to make their results truly meaningful.

Further, there is a need to address the rapidly growing challenges of analyzing and managing the data of standard database system users following the same strategy of grouping rows into packrows. Accordingly, a need arises for techniques that may provide the capability to build compact summaries that contain enough knowledge about the original packrows and to accurately perform operations on those summaries thereby removing the need for access to the actual data.

SUMMARY

Embodiments of the present systems and methods may provide the capability to build compact summaries that contain enough knowledge about the original packrows and to accurately perform operations on those summaries thereby removing the need for access to the actual data.

An embodiment of the present systems and methods is a novel approximate query processing engine, which works by means of SQL-related transformations of granulated data summaries. The engine does not assume an access to the original data. Instead, it processes quantized histograms and a low percentage of co-occurrence ratios reflecting multi-column interdependencies detected in the buffered chunks of ingested data tables. Switching from the level of atomic data rows to low footprint descriptions of their bigger clusters—called packrows—facilitates a significant decrease on the computational cost of operations corresponding to filtering, joining, aggregating, etc. On the other hand, by dealing with summaries at the level of data chunks—unlikely in the case of other database solutions that do it for larger partition blocks or the whole tables—quality control is provided and complex trends occurring in the original data can be addressed. The engine is suitable for data owners and data-based services providers who cannot currently cope with exploring permanently growing data, or who simply want to lower the cost of resources required for data maintenance and analytics.

In an embodiment, the contents of data summaries are accessible via an SQL approximate engine which retrieves summaries stored on disk and utilizes them for its operations, such as filtering, group by, etc. Alternatively, the contents of data summaries are accessible via virtual tables which give users direct access to the summary contents and allow for the creation and implementation of algorithms to work with the data summaries independently from the SQL approximate engine.

Validated use cases include network traffic analytics and intrusion detection, digital advertising, as well as monitoring of industry processes. More generally, the users of similar engines can come from the fields of online applications, internet of things, sensor-based risk management systems and other tools related to machine-generated data. Strengthening connections of the invention with the theories of rough sets and granular computing, e.g., with respect to designing multi-level models of approximate summary-based computations may provide additional benefits. Moreover, although the existing approximate querying approaches based on data sampling do not seem to scale sufficiently in real-world scenarios, they provide the users with very helpful functionalities such as confidence interval derivations. Thus, the inclusion of such functionalities into an exemplary framework, by enriching the granulated data summaries with small subsets of original rows may present added benefits.

BRIEF DESCRIPTION OF THE DRAWINGS

The details of the present disclosure, both as to its structure and operation, can best be understood by referring to the accompanying drawings, in which like reference numbers and designations refer to like elements.

FIG. 1A illustrates a high-level comparison of the traditional approach to relational query processing versus an embodiment of the present systems and methods based on computing with data summaries.

FIG. 1B illustrates examples of use cases related to deployments of analytic databases.

FIG. 2A is exemplary algorithm (Algorithm 1) which outlines how cut-points between consecutive histogram bars are derived.

FIGS. 5A-5C-1 illustrates data summary tables available for diagnostic and analytical purposes.

FIG. 7B is an exemplary algorithm (Algorithm 2) which addresses the task of tree construction.

FIGS. 14A-14B provide a comparison of the exact and approximate query results for the case of GROUP BY statement.

FIG. 23 is an exemplary algorithm featuring a simplified minimum redundancy maximum relevance (mRMR) feature selection method (Algorithm 3).

DETAILED DESCRIPTION

Figure 1C:
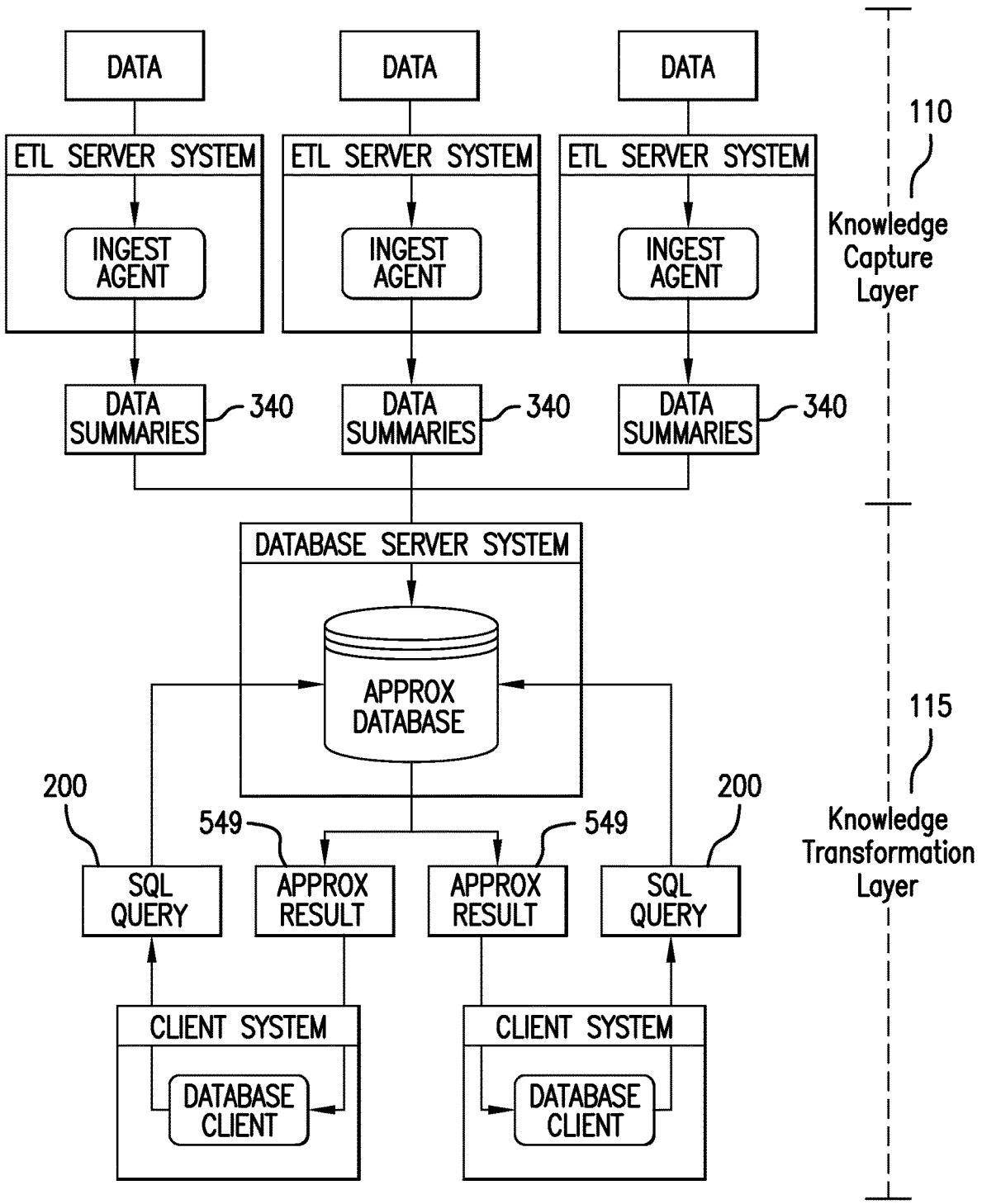
FIG. 1C illustrates an exemplary system architecture.

There is a growing need to explore big data sets. Most companies address this challenge by scaling out resources. However, this strategy is increasingly cost-prohibitive and inefficient for large and distributed data sources. On the other hand, people are realizing that the tasks of data exploration could be successfully performed in at least partially approximate fashion. This way of thinking opens new opportunities to seek for a balance between the speed, resource consumption and accuracy of computations. In an exemplary embodiment, an engine produces high value approximate answers to SQL statements by utilizing granulated summaries of input data.

Embodiments may capture knowledge in a form of single- and multicolumn data summaries. Embodiments may collect chunks of newly gathered data and builds summaries for each chunk separately. Unlike in standard databases, the query execution mechanisms of the present systems and methods do not assume any access to the original chunks. Those chunks may be available in a broader application framework. In an embodiment, the primary goal of the engine is to work with summaries, as illustrated in FIG. 1A. Namely, for a given query 200 received from an external tool 205 (not shown), each consecutive data operation (such as filtering, joining, grouping, etc.) scheduled within the query execution plan 207 is performed as a transformation of summaries representing its input 210 into summaries representing its output 215.

FIG. 1B illustrates benefits of the present systems and methods in particular areas, where the emphasis is put on the speed of query-based analytical processes and the ability to integrate broader aspects of the data. Thanks to informative richness of summaries, the approximate results can be used for insightful decisions. Moreover, the analytical testing environment allows users to investigate similarities of approximate answers compared to query outputs 215 that would be extracted in a standard way from the atomic data. Use cases 220 include intrusion detection, digital advertising and sensor-based monitoring of industry processes. Improvements 230 relating to the particular use cases 220 include faster analytics, richer sources of analytics and faster/deeper machine learning.

Properties highlighted in FIGS. 1A-1B may be considered from the perspectives of business intelligence and cognitive computing, where crisp query answers/output 215 need not be exact and it may not be advantageous to wait for them. Further, in many scenarios, the analysis needs to be conducted over the data collected in a lake or cloud environment. Traditional solutions require moving/reorganizing large amounts of the data to make them efficiently accessible. The data sets might be queried in their original locations making it hard to jointly analyze diverse data sources in single operations. Thus, the ability to work with easily manageable summaries provides a great advantage.

The present systems and methods allow its users to achieve approximate—yet sufficiently accurate—analytical insights 100-1000 times faster than traditional solutions. Referring now to FIG. 1C, from an architectural perspective, the system may comprise two layers: 1) the knowledge capture layer 110 responsible for software-agent-style acquisition of data summaries 340 and 2) the knowledge transformation layer 115 responsible for utilizing already-stored summaries to produce fast approximate answers to ad-hoc queries 200. The first layer 110 looks through potentially distributed and heterogeneous data sources, leaving the actual data in-place. The second layer 115 operates on the output of the first layer 110, removing the need of accessing the original data, which would be far too costly and simply not needed for analytical purposes. The knowledge capture layer 110 may comprise a plurality of ETL/database server systems. The knowledge transformation layer 115 may comprise a database server system and a plurality of client systems.

The present systems and methods rely on some significant scientific novelties. In an exemplary embodiment discussed below, the mechanism of tree-based belief propagation is adapted to populate the WHERE-related changes in data summaries, by introducing new methods of dynamic derivation of optimal trees from input summaries, extending the standard propagation model to let it work with more complex filter conditions, using partial knowledge about data-derived joint probabilities to efficiently run recursive calculations and producing output summaries representing the filtered data for the purposes of further transformations reflecting execution of a given SELECT statement.

Figure 1D:
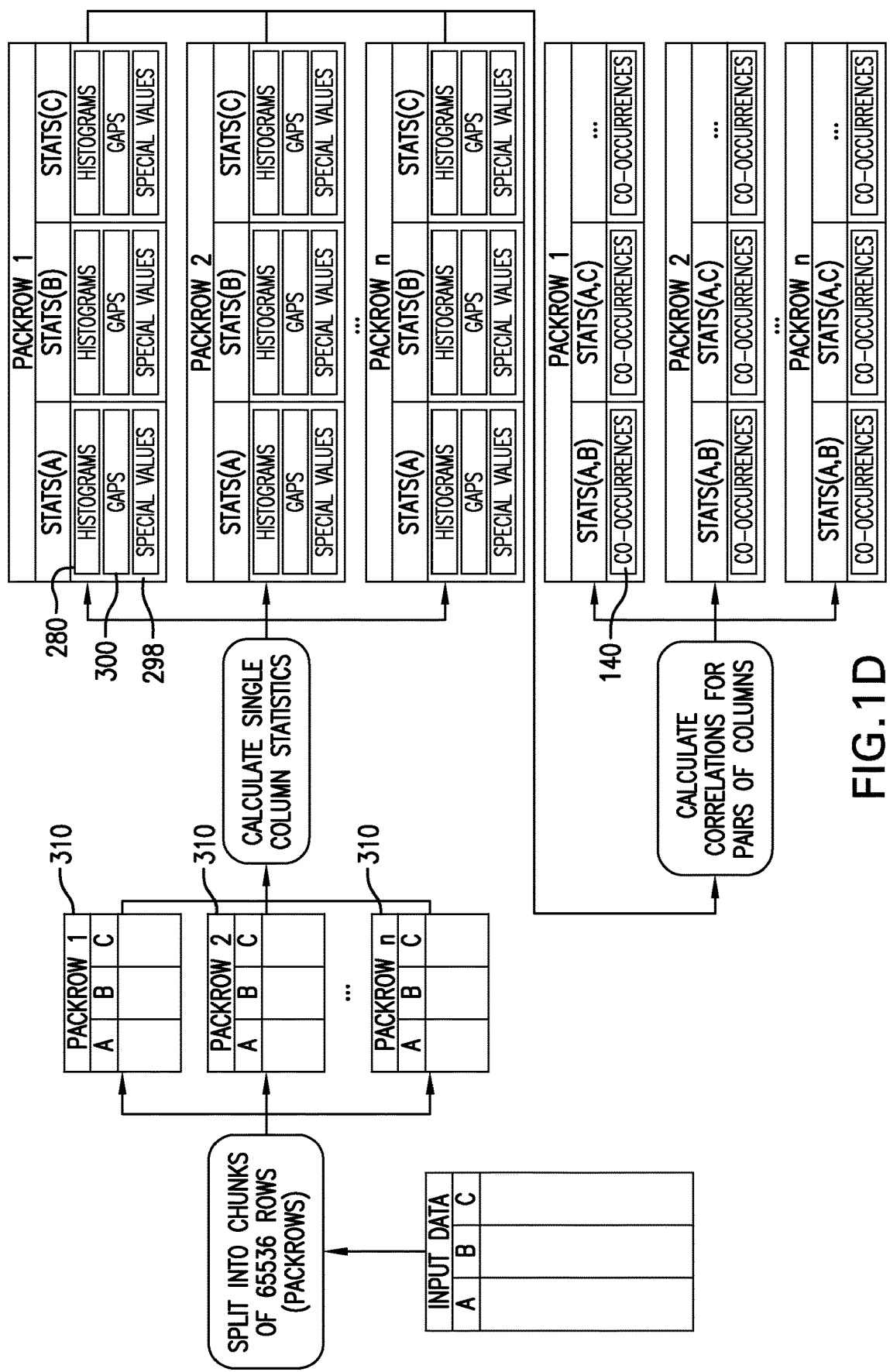
FIG. 1D illustrates an exemplary mechanism for how data summaries are created from input data.

In an embodiment of the present systems and methods, data summaries are created from input data as illustrated in FIG. 1D. The input data may be split into chunks/groups of predetermined size, for example, 65,536 rows each, known as packrows 310. For each packrow 310, single column statistics are calculated which may comprise histograms 280, gaps 300, and special values 295. For pairs of columns, co-occurrences/co-occurrence ratios 140 may be calculated. Histogram 280 contains information about dynamically derived range-based bars and special values 295 that differ from neighboring values of the corresponding column by means of their frequencies 290 in the corresponding packrow 310. Stored structures may include information about the most significant gaps 300, i.e., the areas where there are no values occurring. Finally, packrow-specific co-occurrences of values belonging to bars representing pairs of columns may be summarized.

Approximate query processing is a popular trend in data analytics. Exact results of database computations are not always a must, e.g., for the purposes of reporting, visualization, trend analysis, event detection, or decision making in general. By analogy to modern image processing, approximate outcomes of data operations are acceptable, if they enable the users to validly perceive and deploy data-derived knowledge. One may view the algorithms employed by the present systems and methods also from the perspective of information granulation and granular computing, wherein the major rationales are that: 1) crisp, fine-grained information is often not available, 2) precise information is costly, 3) fine-grained information is not necessary and 4) coarse-grained information reduces cost. Further, approximate query processing corresponds to the area of approximate computing, whereby the primary goal is to determine what aspects and degrees of approximations are feasible so that the produced results are acceptable.

There are several existing ways to develop approximate SQL solutions. In most approaches, the results are estimated by executing queries 200 on collections of intelligently derived data samples. One advantage of such approaches is their ability to adapt statistical apparatus to deliver confidence intervals for approximate outcomes. However, for truly big data sets, good-quality samples will need to be quite large, limiting query acceleration possibilities and presenting other challenges such as sampling challenges related to multi-table joins, handling important outlying values, etc.

The second category of existing approximate query approaches is based on summaries (histograms, sketches, etc.). These two types of data synopses—samples and summaries—are to some extent combinable. However, the solutions developed thus far build summaries for predefined query configurations or, e.g., OLAP-specific scenarios. This limits their usefulness for exploratory analytics, where—by default—it is hard to anticipate queries 200 that will be executed. Because of this, it is important to emphasize that the way data summaries 340 are constructed and utilized according to the present systems and methods make embodiments of the engine introduced herein fully applicable for ad-hoc analytical SQL statements.

Summaries are often expressed by means of histograms, whereby there is a long tradition of their use within standard relational database optimizers. A lot of effort has been spent on addressing a need of updating histogram structures while loading new data. However, this is one aspect where the present systems and methods are different. In an embodiment, separate summaries are built for each subsequently ingested data chunk. Hence, the newly buffered packrows do not interfere with the previously captured knowledge structures.

There is also a significant amount of research related to multi-dimensional summaries, although their derivation and utilization is far more complex than for single columns. Histograms reflecting intensities of co-occurrences of values of different columns are a good starting point in this field. There are also existing examples of utilizing more complex multi-dimensional summaries, e.g., tree-based structures that can be applied in a progressive/iterative framework for approximate querying. Compared to the aforementioned approaches, the present systems and methods operate with relatively simple multi-column representations that are easy to embed into knowledge transformation mechanisms yet contain sufficient information about co-occurrences of values in the original data. The transformations working in a loop over the captured packrow summaries provide a truly valuable opportunity to model a potential drift of occurrence and co-occurrence characteristics with respect to time and origin of the continually ingested data sources.

Approximate and traditional styles of querying can be used within the same application frameworks. For instance, in data exploration tasks, it is quite common to begin an analytical process with approximations and finish with their thorough validation. Embodiments provide methods that support incremental and interactive computations including paradigms and tools related to evolution of complex SQL execution processes and interactive visualization/representation of analytical query results.

In addition to savings in execution time and resource consumption, there are also other motivations for approximate querying. Some of them are related to the fact that in dynamic environments the data may evolve too fast to care about exact answers or—in other cases—some data fragments may be temporarily unavailable. Yet another challenge—analogous to the one encountered by search engines—is that available data items and query conditions often do not perfectly match each other. In such situations, it may be advantageous to retrieve approximately fitting items. However, such approaches usually require modifications of query syntax. This can be problematic in practice, like in the case of changing standard format of query outcomes.

Knowledge Capture

The present disclosure provides methods designed to fill an exemplary engine with meaningful knowledge about the original chunks of data, i.e., packrows which are collections of rows acquired from the original data tables.

The knowledge capture layer 110 needs to assess what aspects of the ingested data will be most useful later for approximate query algorithms. This may be even more important than the ability to store and process the original data, especially given the fact that perfect data access is questionable in many environments. For the knowledge representation purposes, enhanced histogram structures are utilized. For each original data pack, its histogram contains information about dynamically derived range-based bars and special values that differ from neighboring values of the given column by means of their frequencies in the given packrow. Also, information about significant gaps (i.e., the areas where there are no values occurring) is stored. This is further used as a foundation for multi-column summaries capturing packrow-specific co-occurrences of special values or values belonging to histogram ranges of different data columns. The developed methods decide what is worth storing based on a significance ranking of the detected co-occurrences.

Figure 2B:
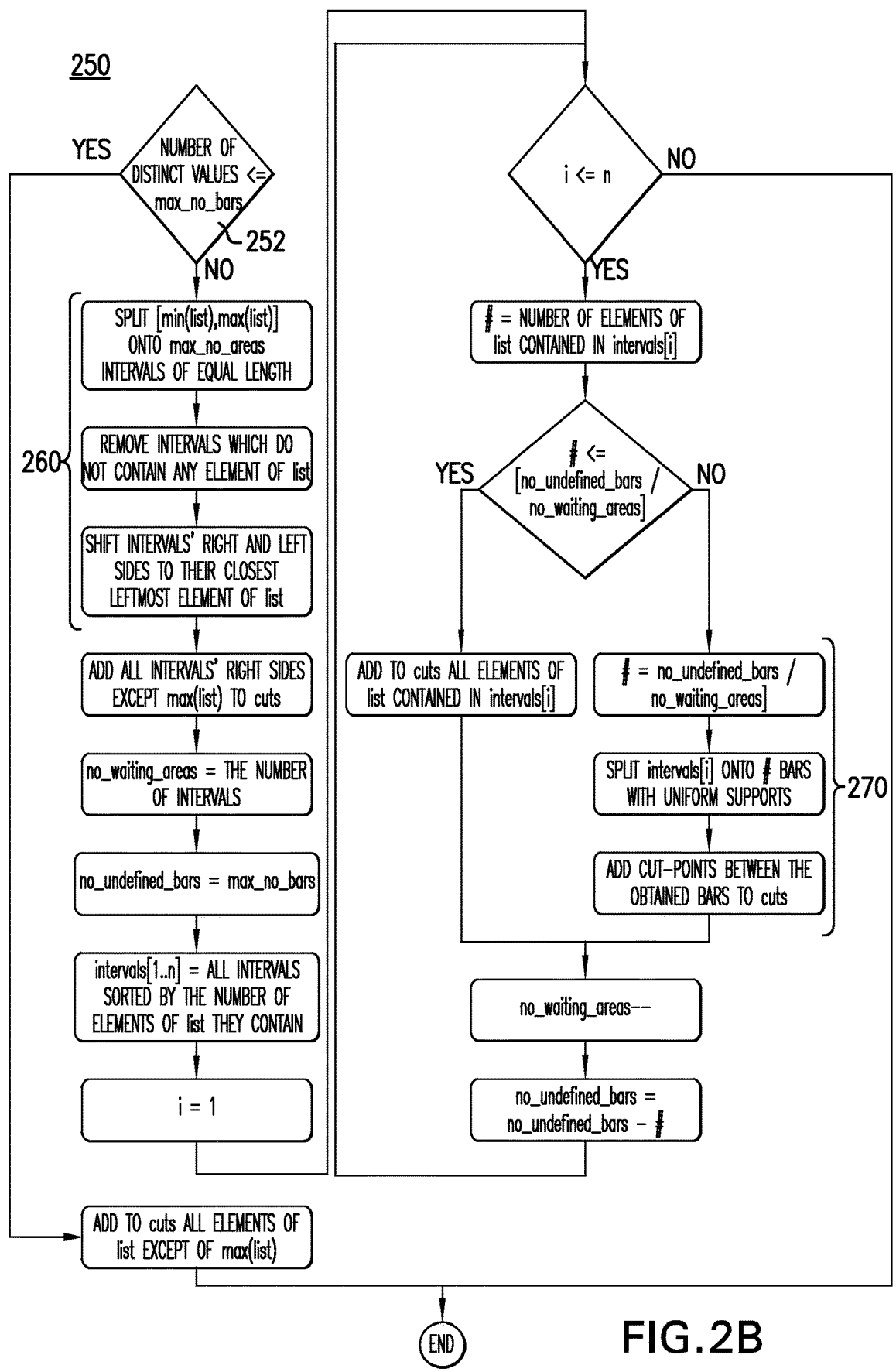
FIG. 2B is an exemplary flow diagram illustrating the method of Algorithm 1.

In an exemplary embodiment shown in FIG. 2A-2B, Algorithm 1, 250, outlines how cut-points between consecutive histogram bars are derived. This is a simple combination of two standard domain quantization techniques that yields the highest accuracies of approximate queries over data sets with complex column characteristics. First, the domain of a data column within a given packrow is decomposed onto a fixed number of intervals of (almost) equal length 252, 260. Then, the algorithm 250 allocates (almost) equal amounts of wanted histogram bars per interval 270 and—for each interval separately—it produces the final bars attempting to equalize frequencies of occurrence of rows with values dropping into particular ranges.

Figure 3:
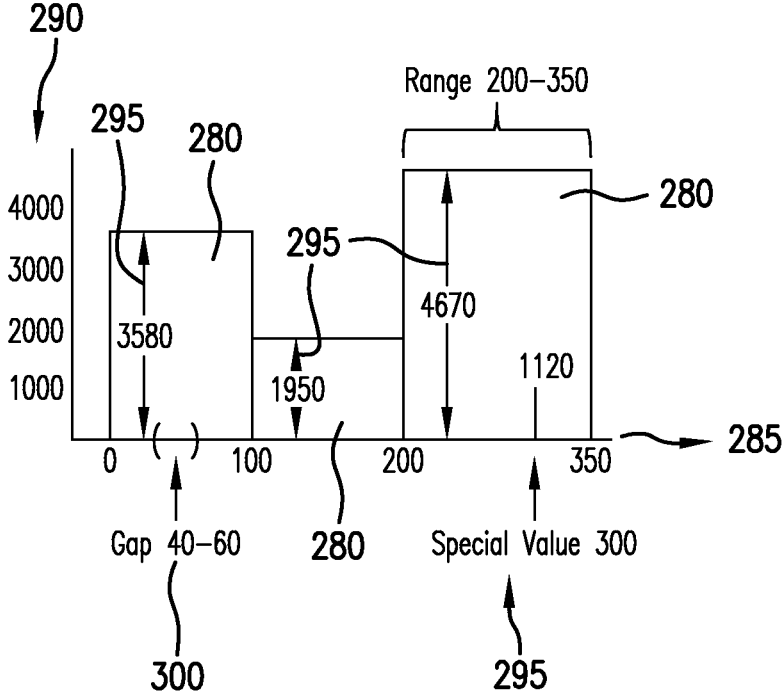
FIG. 3 is an exemplary summary of a data pack corresponding to a single column, over a single packrow.

FIG. 3 illustrates an exemplary representation of a data pack 275 corresponding to "intersection" of a packrow and a column. Histogram bars 280 are composed of ranges 285 and frequencies 290. Frequencies 290 of special values 295 are represented by additional bars within histogram bars 280. Algorithms for deriving ranges 285 and gaps 300 are designed so as to assure that their borders actually occurred in the data. Once cut-points between histogram bars 280 are decided, the knowledge capture algorithms prepare heuristic rankings of candidates for special values 295 and gaps 300. Only a limited number of the highest-ranked special values 295 and gaps 300 per data pack 275 can be stored, to address the need for a reasonable trade-off between summary footprint (translatable to the expected query execution 207 speed, by means of runtime of algorithmic hot loops that transform data summaries 340) and completeness of gathered knowledge (translatable to the expected accuracy of approximate query outputs).

Special values 295 are chosen to minimize an average error related to estimating frequencies of the original values, resembling classical methods of histogram variance minimization, although modifications are required for columns with irregular domains. Similar ranking is created for gaps 300. Any value occurring in a given pack 275 can be a potential special value 295. Any interval between consecutive (along an ordering defined for a given domain) values occurring in a data pack 275 is a candidate for a gap 300. However, only the most significant gaps 300 and values may be explicitly represented. Further discussion about heuristic ranking functions that are worth considering during the process of creation of single-dimensional summaries are discussed below.

Gaps 300 play an important role in estimating local value distributions within histogram ranges 285. As discussed below, such estimations are crucial for proper behavior of data summary transformations and final query result generation. For instance, referring to FIG. 3, in a given packrow 310, over a given data column, there were 3580 rows with values dropping into the range between 0 and 100. It may be assumed that the greatest common divisor stored for the corresponding data pack 275 (denoted as the field gcd in FIG. 5) equals to 2. Thus, if a given query execution 207 requires the estimation of the number of distinct values occurring in the considered range 285, then knowledge about a gap 300 between 40 and 60 may improve that estimation by avoiding counting potential values that did not occur in the original data (gaps 300 are interpreted as open intervals). Knowledge components related to occurrence of distinct values will be further referred to as domain representation.

Co-Occurrences of Histogram Bars and Special Values

A significant differentiator of the present systems and methods when compared to other methodologies of utilizing summaries in approximate query processing is to describe co-occurrences between (ranges 285 of) values of different columns. The key objective is to set up a multi-column representation that is simple enough to operate with at the levels of both knowledge capture and query-specific knowledge transformations. In an embodiment, co-occurrences are modeled only for pairs of columns and such pairwise relationships are represented only in a partial way. The model is applied locally for each of separate packrows allowing the ranking algorithms to focus on different pairs of columns and their corresponding values for different fragments of the ingested data, leading towards ability to express complex trends and patterns.

In an exemplary embodiment, to keep a low footprint of summaries, co-occurrence-related information is stored only for a limited number of important pairs of bars and special values 295. For packrow t and columns a and b (referring to a's and b's histogram bars using iterators i and j, respectively), data-derived probabilities of occurrence of a's values within its i-th bar, b's values within its j-th bar and pairs of a's values within its i-th bar and b's values within its j-th bar, respectively are denoted by $p_t(r_t^a[i])$, $p_t(r_t^b[j])$ and $p_t(r_t^a[i], r_t^b[j])$. The following ranking function is used to express the importance of pairs of histogram bars:

$$bars_t(r_t^a[i], r_t^b[j]) = p_t(r_t^a[i])p_t(r_t^b[j]) \left| \frac{p_t(r_t^a[i], r_t^b[j])}{p_t(r_t^a[i])p_t(r_t^b[j])} - 1 \right| \quad (1)$$

Formula (1) evaluates how much accuracy could be lost by a query execution 207 process based on the product $p_t(r_t^a[i])p_t(r_t^b[j])$ instead of the actual quantity of $p_t^a[i]$, $r_t^b[j])$. For a given packrow t, function $bars_t$ is used to jointly evaluate all pairs of bars for all pairs of columns. This results in devoting relatively more footprint to pairs of columns, which are more interdependent than others. After choosing a fixed amount of the most important pairs of ranges 285, for given columns a and b, two types of information are stored. For the chosen pairs $r_t^a[i]$, $r_t^b[j]$, the following co-occurrence ratios are stored:

$$\tau_t(r_t^a[i], r_t^b[j]) = \frac{p_t(r_t^a[i], r_t^b[j])}{p_t(r_t^a[i])p_t(r_t^b[j])} \quad (2)$$

For not chosen pairs, an approximate average ratio is required for the purposes of, e.g., the WHERE-related version of the belief propagation process (see below). For the pairs of histogram bars, such default ratio (denoted by default_bar_bar_tau in FIG. 5) can be defined as follows:

$$\tau_t(a, b) = \frac{1 - \sum i, j : \tau(r_t^a[i], r_t^b[j]) \in \bar{t}^{p_t(r_t^a[i])p_t(r_t^b[j])\tau_t(r_t^a[i], r_t^b[j])}}{1 - \sum i, j : \tau(r_t^a[i], r_t^b[j]) \in \bar{t}^{p_t(r_t^a[i])p_t(r_t^b[j])}} \quad (3)$$

Writing $\tau_t(r_t^a[i], r_t^b[j]) \in \bar{t}$ indicates that the ratio $\tau_t(r_t^a[i], r_t^b[j])$ is chosen to be stored in the summarized representation of packrow t.

Figure 4:
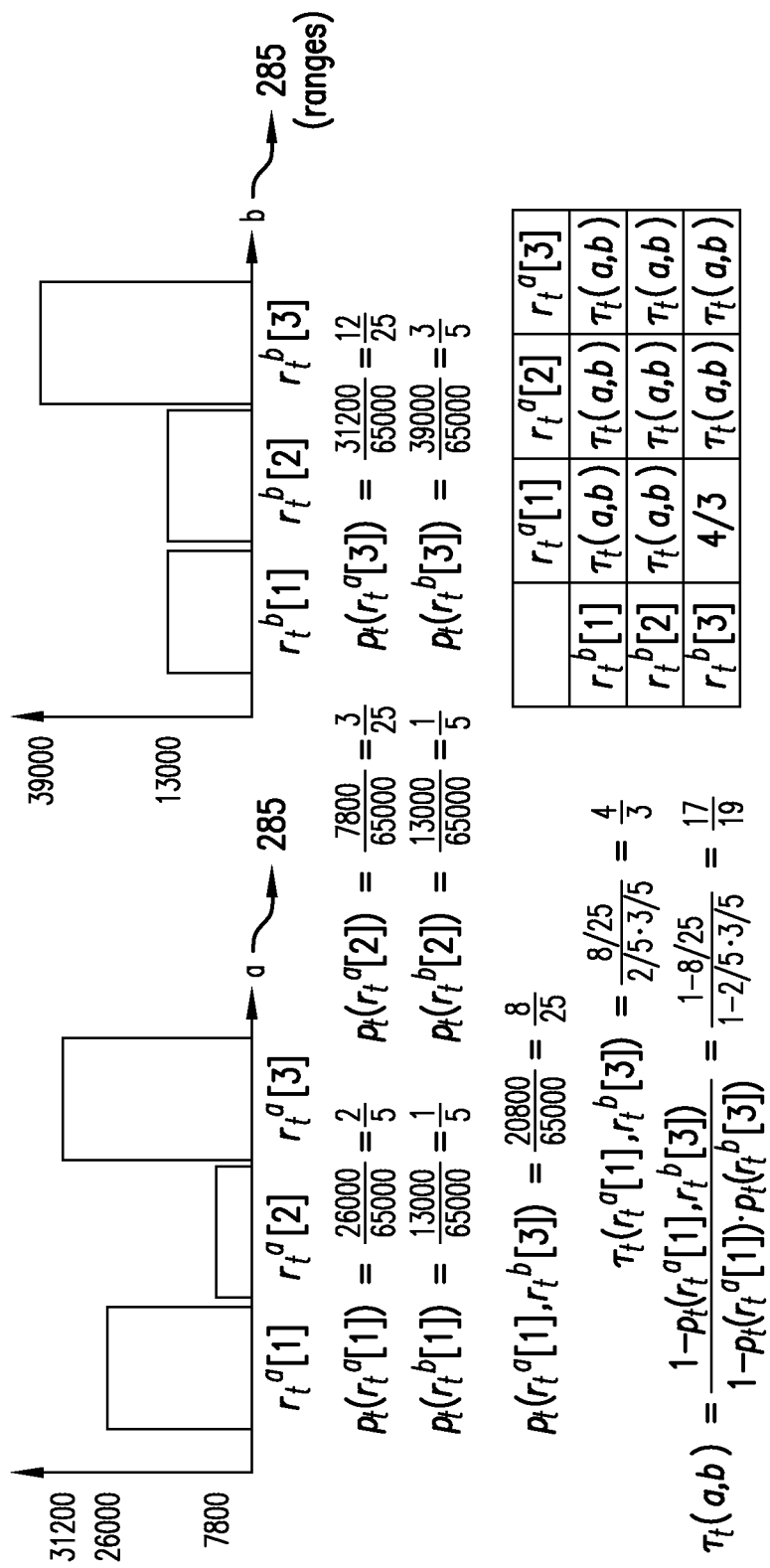
FIG. 4 illustrates quantized probabilities in a packrow t embracing 65000 original rows, for columns a and b, each described using three histogram bars.

FIG. 4 illustrates quantized probabilities in a packrow t embracing 65,000 original rows, for columns a and b, 315/317 each described using three histogram bars and demonstrates how the ratios are calculated. Assuming that the engine stores co-occurrence information about only one pair of a's and b's ranges 285—$\tau_t r_t^a[1]$, $r_t^b[3]=4/3$—the default ratio for other pairs equals to $\tau_t$ (a,b)=17/19. The ratio/formula (3), minimizes a weighted error comprising quantities of the following form $$\tau_t(a, b) = \frac{p_t(r_t^a[i], r_t^b[j])}{p_t(r_t^a[i])p_t(r_t^b[j])}$$

for pairs of ranges 285 whose co-occurrence ratios are not stored.

Formulation of $\tau_t(a, b)$ facilitates the redesign and adaptation of classical probability estimation and revision methods (which have—in their original versions—quadratic complexity with respect to the number of bars/values) that work linearly for the knowledge transformation purposes (see below) and report some interesting mathematical properties with regard to machine learning methods.

In an exemplary embodiment, an analogous approach may be introduced for pairs of special values 295. Denoted by $s_t^a[k]$ and $s_t^b[l]$ the k-th and l-th special values 295 for columns a and b, 315/317 within packrow t, respectively. Let us denote data-derived probabilities of their occurrence and co-occurrence as $p_t(s_t^a[k]), s_t^b[l])$ and $p_t(s_t^a[k], s_t^b[l])$. The ranking used in the knowledge capture layer 110 compares co-occurrence ratios of special values 295 to the ratios for their "parents", i.e., histogram ranges 285 that $s_t^a[k]$ and $s_t^b[l]$ drop into—denoted by $s_t^a[k]^\uparrow$ and $s_t^b[l]^\uparrow$ respectively:

$$specs_t(s_t^a[k], \quad (4)$$
$$s_t^b[l] = p_t(s_t^a[k])p_t(s_t^b[l])\left|\frac{p_t(s_t^a[k], s_t^b[l])}{p_t(s_t^a[k])p_t(s_t^b[l])} - \frac{p_t(s_t^a[k]^\uparrow, s_t^b[l]^\uparrow)}{p_t(s_t^a[k]^\uparrow)p_t(s_t^b[l]^\uparrow)}\right|$$

Figure 5A:
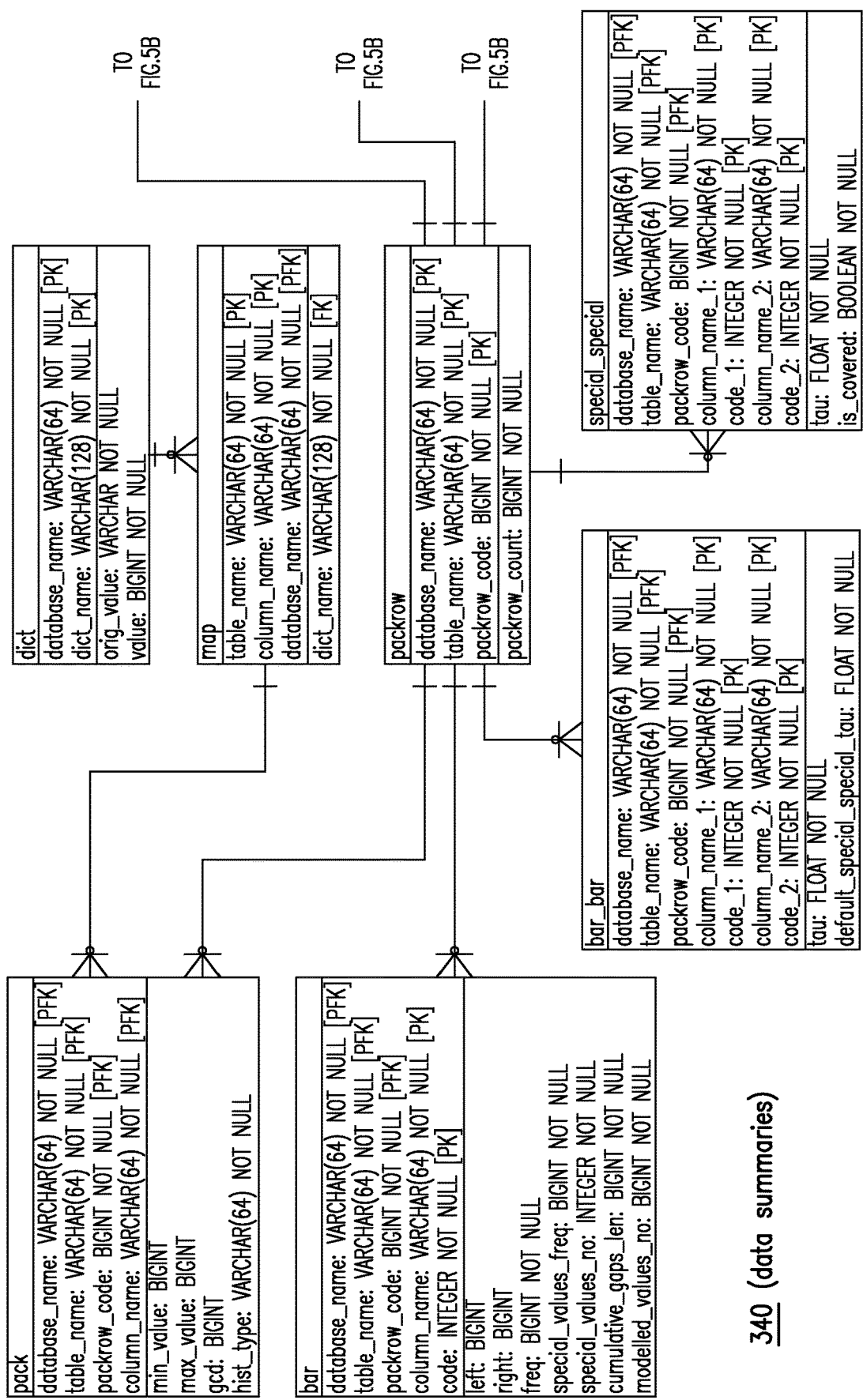
Figure 5B:
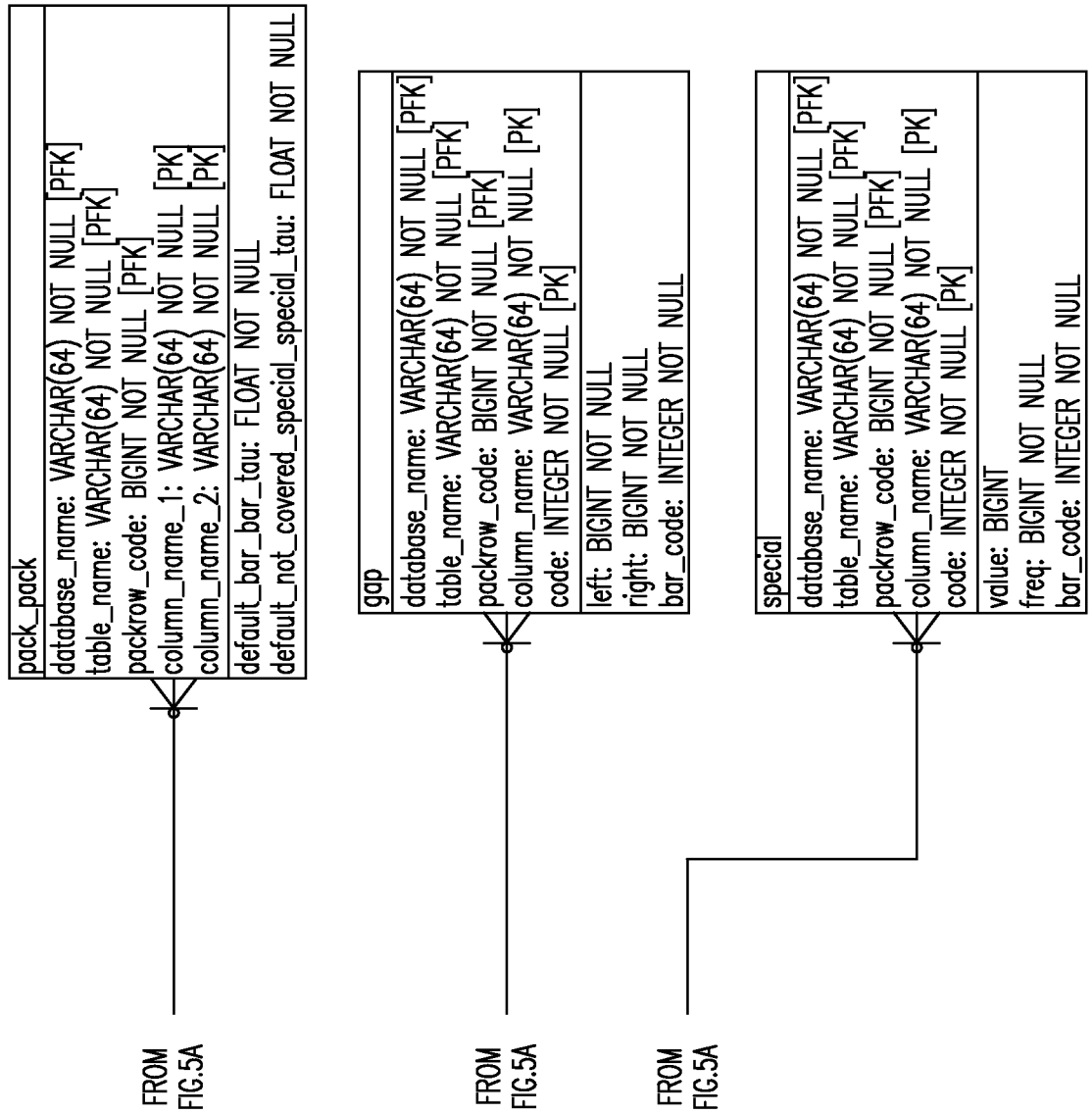

Default co-occurrence ratios analogous to formula (3) are stored for special values 295 as well. FIGS. 5A-5C illustrates exemplary data summary tables available for diagnostic and analytical purposes and shows two types of default ratios—default_special_special_tau and default_not_covered_special_special_tau—corresponding to the cases of "parents" of special values 295 whose ratios are stored and are not stored, respectively. They are utilized by the exemplary engine during the knowledge transformation processes whenever there is a need to refer to pairs of special values 295 that were not chosen to be stored. Chosen pairs of special values 295 are stored, their corresponding ratios $\tau_t(s_t^a[k], s_t^b[l])$ defined similarly to formula (2).

Analytical Testing Environment

In an exemplary embodiment, the engine stores data summaries 340 in binary files accessible by approximate query execution 207 methods via internal interfaces. From a logical viewpoint, the contents of those files can be represented as a collection of data summary tables as illustrated in FIGS. 5A-5C. For diagnostic purposes, a converter that transforms the contents of the binary files into an explicit relational form may be implemented. As a result, standard PostgreSQL may be used to access and analyze the data summary tables that store information about histogram frequencies 290 and ranges 285, special values 295, gaps 300, as well as bar-to-bar and value-to-value co-occurrences, per each database, table, column and packrow, independently from the implemented knowledge transformation mechanisms.

This alternative access to the outcomes of the knowledge capture layer 110 is helpful when developing a quality testing environment. Moreover, the exemplary schema 340 illustrated in FIGS. 5A-5C is a great means for providing elucidation to users. Employing simple SQL, a user can check which pairs of columns are most correlated by means of co-occurrences of their histogram ranges 285 and special values 295 (by querying bar_bar and special_special, respectively), what is the degree of repeatability of special values 295 in different data packs of the same data column (by querying special), whether values of particular data columns evolve from packrow to packrow (by querying pack and gap), etc.

This additional knowledge is helpful for the users to better understand quality and performance characteristics of the query execution 207 processes. Moreover, users may wish to explore data summary tables directly to do basic analytics, e.g., approximately visualize demographics of particular columns. Data summaries 340 in their relational form, visible in FIGS. 5A-5C, may be used while prototyping new algorithms. For instance, feature selection methods may be performed entirely in data summary tables. The obtained empirical results demonstrate that the one-dimensional and two-dimensional structures of the present systems and methods can provide completely new means to scale machine learning algorithms. In an exemplary embodiment, the engine may transform each SELECT statement into available data summaries 340 iteratively to build a summary of the query result. Different transformation mechanisms may be dedicated to different operations such as filtering, joining, aggregating, etc. Each subsequent operation in a query execution 207 chain takes as its input relevant summaries 340 produced by previous operations. Once the summaries 340 corresponding to the final stage of query execution 207 are assembled, they may be utilized to produce the outcome interpretable as a standard SQL result. This is in contrast with existing approximate query techniques based on data sampling, where the whole computational process remains at the original level of atomic data.

Filtering-Related Transformations

In an exemplary embodiment, the operation of filtering, i.e., taking into account SQL clauses such as WHERE (in the case of summaries of the original tables or dynamically derived summaries of the nested SELECT results) or HAVING (in the case of dynamically derived summaries of earlier GROUP BY operations) is considered. For the exemplary engine, this involves revising frequencies for histograms, special values 295 and co-occurrence ratios for columns relevant for further query execution 207 stages, basing on filters specified over other columns.

The filtering process adapts the tree-based belief propagation, which is a popular tool in decision making and modeling. Nevertheless, the present systems and methods introduce the first attempt to embed this idea inside an approximate query engine, where—in a loop over packrows 310—the most interesting co-occurrences of bars and special values 295 of different columns are used as partial knowledge about data-derived conditional probability distributions.

Figure 6A:
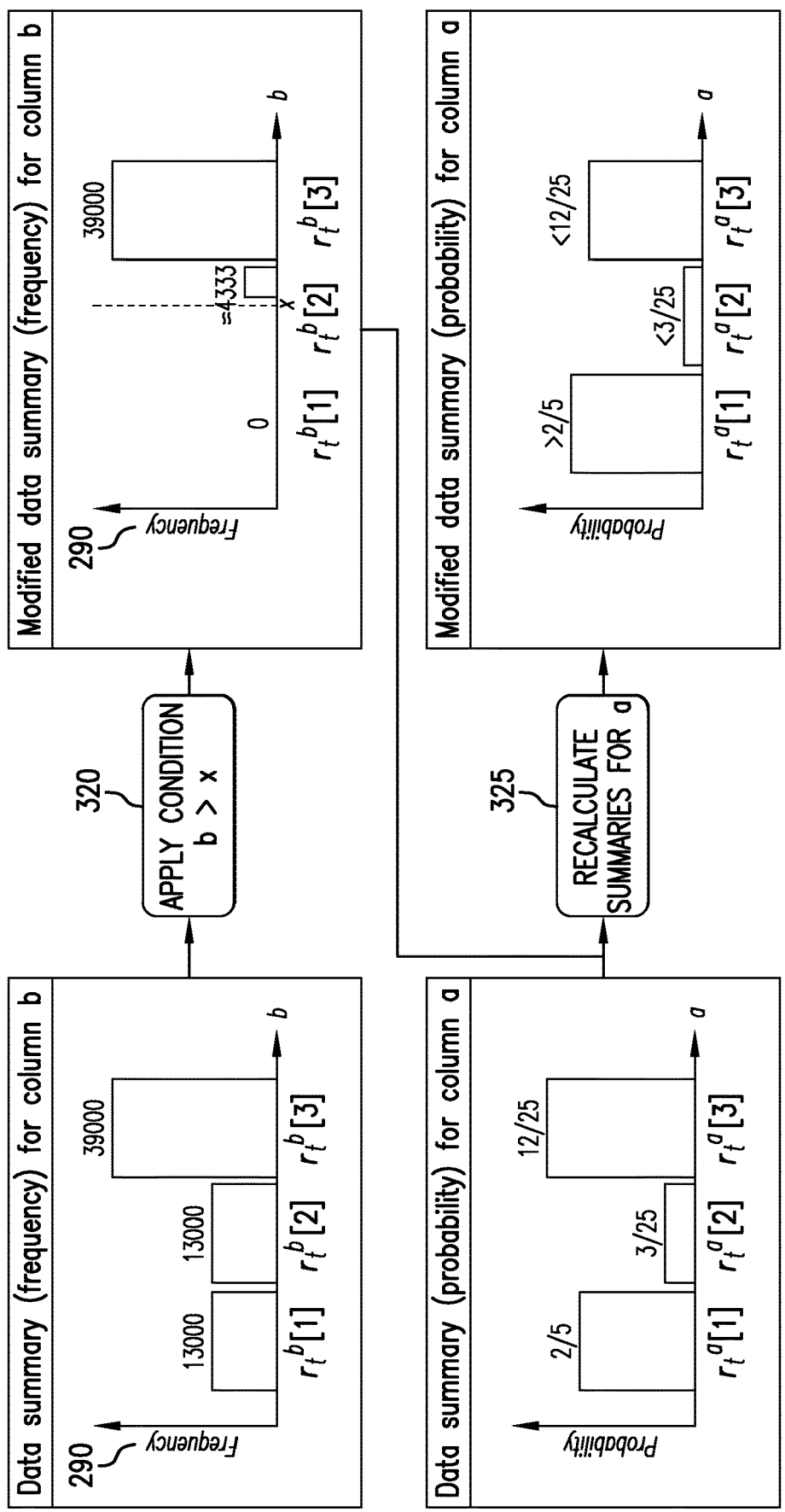
FIG. 6A illustrates revision of probabilities over columns a and b subject to b>x.

In an example, as illustrated in FIG. 6A, a simple query 200 of the form SELECT SUM(a) from T WHERE b>x, which involves columns a and b in data table T is considered. From the perspective of the knowledge transformation layer 115, the process of executing this query is split into two separate phases: 1) the filtering transformation phase: calculating new counts and frequencies of a's histogram bars (and special values 295) subject to the condition b>x, 320, and 2) the result generation phase: assembling SUM(a)/recalculating summaries for a, 325, based on the outcome of filtering, in combination with information about values occurring inside particular ranges 285 of a.

Regarding the filter transformation phase, FIG. 6A illustrates revision of probabilities over columns a and b, subject to b>x, 320, demonstrating how b>x, 320, influences b's and a's representation. For a simpler query, i.e., SELECT COUNT(*) FROM T WHERE b>x, the whole procedure may be finished by revising the heights of b's bars—contribution of an exemplary packrow t into estimation of the amount of the original rows satisfying b>x which is roughly 43333. However, to estimate SUM(a), there is a need to propagate information. Namely, probabilities $p_t(r_t^a[1])$, $p_t(r_t^a[2])$ and $p_t(r_t^a[3])$ are replaced to reflect the input data with revised probabilities $p'_t(r_t^a[1])$, $p'_t(r_t^a[2])$ and $p'_t(r_t^a[3])$ that reflect the filtered data. Contribution of packrow t to overall calculation of SUM(a) can be then derived using estimation of the number of its corresponding rows holding b>x and the revised probabilities of a's bars.

Figure 6B:
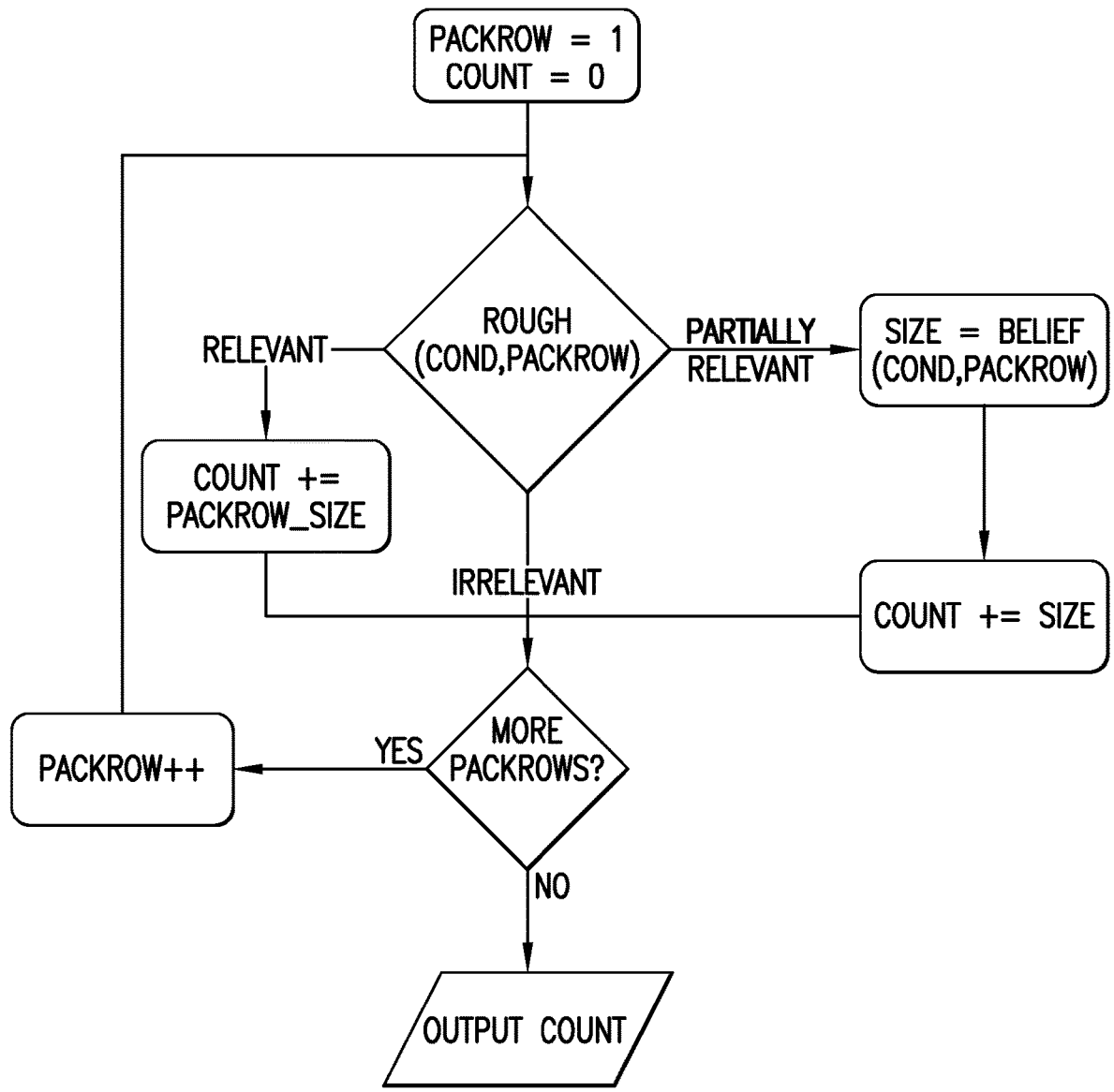
FIG. 6B is an exemplary illustration of how the contribution for a given packrow to the final result of a query may be determined.

FIG. 6B illustrates how a given packrow 310 may contribute to the final result of a given count query of the following form: "SELECT COUNT(*) FROM t WHERE conditions". For a given packrow 310, basic data pack statistics are applied to conditions to determine whether the packrow is relevant (all rows meet the conditions), partially relevant (some rows meet the conditions) or irrelevant (no rows meet the conditions). For a relevant packrow, its cardinality (number of rows in the packrow) is added to the total count. For an irrelevant packrow the total count is unchanged. For a partially irrelevant packrow, the propagation procedure mentioned in the previous paragraph is applied in order to estimate how many rows from this packrow meet the conditions. The estimated size is added to the final count.

Alternatively, instead of bars, other characteristics/combinations of characteristics may be used to model/represent data summaries such as special values and complements 140. For example, for the packrow displayed in FIG. 4, it is estimated (basing on b's domain representation) that b>x holds for 33% of the original rows with b's values dropping into the second range of b's histogram. After recalculation of partial counts, the revised probability $p'_t(r_t^a[3])$ of b's third range becomes higher than the original $p_t(r_t^a[3])$. As this range is known to have positive co-occurrence with the first range on a, the revised $p'_t(r_t^a[1])$ is higher than $p_t(r_t^a[1])$.

Equation $p'_t(r_t^a[1])=p_t(r_t^a[1]|r_t^b[1])p'_t(r_t^b[1])+ \ldots +p_t(r_t^a[1]|r_t^b[3])p'_t(r_t^b[3])$ illustrates a general idea of belief propagation. The revised probability $p'_t(r_t^a[1])$ is calculated using classical total probability that combines previously-revised marginal probabilities over b with fixed conditional probabilities of a subject to b. Using this approach, conditionals $p_t(r_t^a[1]|r_t^b[1])$ can be retrieved as $\tau_t(r_t^a[i], r_t^b[j])p_t(r_t^a[i])$ or, for not stored co-occurrences, approximated by $\tau_t(a, b)p_t(r_t^a[i])$. This leads to the following:

$$\frac{p'_t(r_t^a[i])}{p_t(r_t^a[i])} = \sum_{i,j:\tau_t(r_t^a[i],r_t^b[j])\in \bar{a}} \left[ p'_t(r_t^a[j])\tau_t(r_t^a[i], r_t^b[j]) + \left[1 - \sum_{j:\tau_t(r_t^a[i],r_t^b[j])\in \bar{a} p'_t(r_t^b[j])}\right] \tau_t(a, b)\right] \quad (5)$$

The above proportion is a foundation for the WHERE-related knowledge transformations implemented in an exemplary engine and may be extended towards multi-column scenarios (discussed below). Notably, it can be easily generalized onto the case of operating with both histogram bars 280 and special values 295. Moreover, the mechanism of revising the whole vector of probabilities over a using equation (5) can be implemented in such a way that its computational cost remains linear with respect to the explicitly stored co-occurrences. As briefly outlined above, this is a great performance advantage when compared to a non-optimized quadratic style of working with conditional probability distributions.

Dynamic Construction of Propagation Trees

In an exemplary embodiment, the idea of belief propagation can be adapted to serve for the WHERE-related knowledge transformations. The most basic propagation algorithm operates on a directed tree spanned over variables assigned with finite domains of values. A directed edge in the tree expresses causal relation, whereby a parent makes its child independent from its remaining non-descendants. Such relation is encoded in a form of conditional probability distribution of the child node subject to its parent. For each packrow t, the task is to construct and use a tree spanned over columns involved in a given query, with probabilities defined by means of available histograms and co-occurrence ratios. In the general case, distributions are defined over special values 295 and histogram ranges 285 embracing the remaining "non-special" values. For the sake of clarity, a simplified scenario where one-dimensional column representations correspond only to histogram ranges 285 is considered.

Referring again to FIG. 6A, the corresponding tree can be envisioned as a←b, that is a is the child of b. Single-variable probability distributions are defined over ranges 285 $r_t^a[1]$, $r_t^a[2]$ and $r_t^a[3]$ as well as $r_t^b[1]$, $r_t^b[2]$, $r_t^b[3]$ (this is one of the differences when compared to classical model of belief propagation, where the single-variable distribution is stored only for the root of a tree). Furthermore, conditional distribution $p_t(r_t^a[i]|r_t^b[j])$ can be retrieved as either $\tau_t(r_t^a[i], r_t^b[j])p_t(r_t^a[i])$ in the case of $\tau_t(r_t^a[i], r_t^b[j]) \in \tilde{t}$, or $\tau_t(a,b)p_t(r_t^a[i])$ otherwise.

As another example, considering the statement SELECT b, SUM(a) FROM T GROUP BY b WHERE b>x. In this case, the propagation tree a←b looks like before. However, in addition to single-column distributions, we need to pass further also revised knowledge about co-occurrences involving a's and b's histogram ranges 285. This is because of the specifics of the GROUP BY operation, which—as briefly outlined above—transforms summaries reflecting the filtered data into summaries representing packrows of tuples indexed by the grouping values and their corresponding aggregation coefficients. Thus, if appropriately recalculated ratios between a and b are not provided, then the whole mechanism produces incorrect final summaries. In an embodiment, propagation trees may be used to revise knowledge about co-occurrence ratios (discussed below).

Figure 7A:
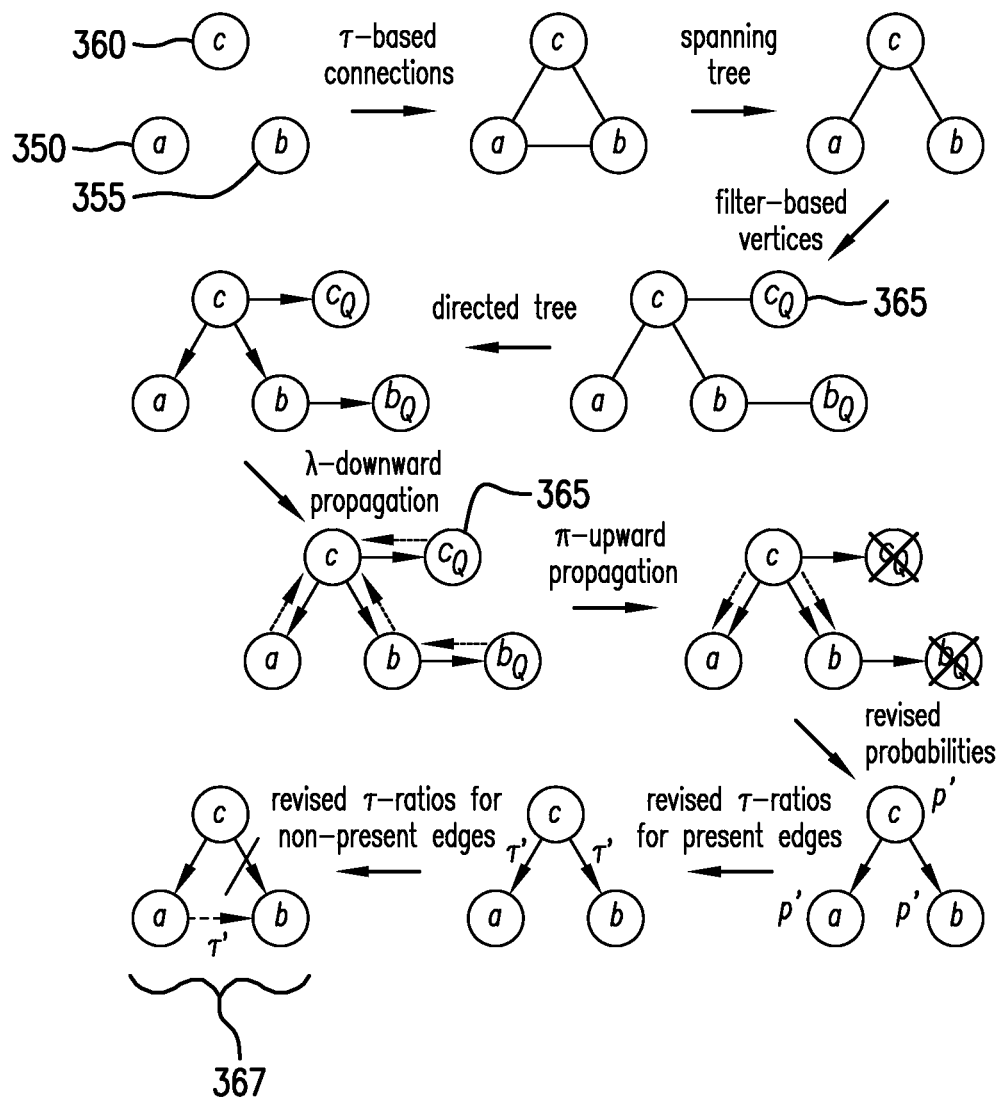
FIG. 7A illustrates construction and usage of a directed tree for the WHERE-related belief propagation corresponding to the query SELECT a, b, c FROM T WHERE b>x AND c<y.

FIG. 7A illustrates an exemplary construction and usage of a directed tree for the WHERE-related belief propagation corresponding to the query SELECT a, b, c FROM T WHERE b>x AND c<y. For packrow t, it is assumed that there are some cases of cooccurrence-ratios stored for each of pairs of the considered columns a, b and c. The approximated mutual information measure linking a and b is assumed to be weaker than in the cases of a and c, as well as b and c. Data summaries 340 must be revised with respect to conjunction of two conditions: b>x and c<y. In this case, in order to follow the idea of tree-based belief propagation, first a tree is constructed over nodes a, b and c 350/355/360. Alternatively, such trees may be derived during the phase of knowledge capture. The tree structures may differ for different packrows but, on the other hand, it may be assumed that—for a given packrow t—it may be reasonable to have a single fixed tree ready for usage in the case of arbitrary queries 200. However, as different queries 200—involving potentially different subsets of columns—may require different trees somewhat optimized with regard to their needs, a query-adaptive method of dynamic tree derivation is preferred.

As shown in FIG. 7B, Algorithm 2, 400, addresses the task of tree construction (in lines 2-3 and 6, 410/415). The first stage is to connect pairs of columns, for which there are corresponding co-occurrence ratios stored in the summary of packrow t. This process is limited to the set of columns B∪C, where B gathers columns that will be required at further query stages and C denotes columns with query conditions specified. The idea of not connecting pairs of columns with no co-occurrence representation is based on the assumption that such pairs are relatively weakly correlated with each other. Indeed, according to function bars$_t$ defined by (1), such complete lack of two-dimensional information means that the given two columns—when treating them as quantized random variables with data-derived probabilities $p_t$—seem to be approximately independent from each other.

If the undirected graph $G_t$ constructed as a result of (lines 2-3, 410) has multiple connected components—further denoted by $G_t^X$ for some column subsets X⊆B∪C—then, as above, it may be assumed that those subsets are approximately independent from each other. This means that further calculations may be conducted for each of such components separately and then merged together. $p_t(Q^{\downarrow X})$ denotes the estimated ratio of rows in packrow t that satisfy filters specified in query Q on columns in C∩X (line 16, 420). Then, the estimated ratio of rows in packrow t that satisfy all conditions of Q—denoted as $p_t(Q)$—can be calculated as the product of coefficients $p_t(Q^{\downarrow X})$ (lines 17-18, 425). Similarly, belief-propagation-based mechanisms aimed at revision of histograms and co-occurrence ratios over particular components $G_t^X$ may be utilized and then readjusted to obtain final summaries 340 representing the filtered data.

In order to perform calculations with respect to a given X⊆B∪C, a tree is constructed based on $G_t^X$. This is initiated in line 6, 415, of Algorithm 2. The measure of mutual information computed for pairs of columns to span an undirected tree $S_t^X$ over $G_t^X$ is employed. A summary-based approximation of that measure, as explained below:

$$I_t(a, b) = \sum_{i,j:\tau_t(r_t^a[i],r_t^b[j])\in\tilde{t}} p_t(r_t^a[i])p_t(r_t^a[j])\tau_t(r_t^a[i], r_t^b[j])\log\tau_t(r_t^a[i], r_t^b[j]) + \left[1 - \sum_{i,j:\tau_t(r_t^a[i],r_t^b[j])\in\tilde{t}} p^t(r_t^a[i])p^t(r_t^b[j])\tau_t(r_t^a[i], r_t^b[j])\right]\log\tau_t(a, b) \quad (6)$$

The usage of mutual information is justified by relationships between the data derived information entropy of a graphical model and the accuracy of conditional independence assumptions that it represents. The usage of spanning trees that maximize mutual information is actually related to the foundations of second-order product approximations of joint probability distributions. Revised probabilities and ratios within each X⊆B∪C may be calculated by transforming an undirected $S_t^X$ into its directed version $\vec{S}_t^X$ as shown in Algorithm 2 (lines 7-8, 417). In order to minimize the amount of further computations, a column that is on average closest to the elements of C∩X is selected as the tree's root. Later, during the belief propagation process, 425 (line 18) is used to check whether complete calculations are really necessary. Namely, if the first phase of propagation provides $p_t(Q^{\downarrow X})=0$ over any of connected components of $G^t$, then packrow t can be skipped as irrelevant.

The approach described above raises a number of questions with regard to the accuracy of estimations represented by transformed data summaries 340. First, quantization of original column domains must be accounted for as previously discussed. Second, only a fraction of co-occurrence ratios representing relationships between quantized/discretized domains of different columns can be stored, which leads, e.g., to potentially inaccurate judgements with respect to data-derived probabilistic independencies. Third, in order to adapt the tree-based belief propagation mechanisms to model the process of filtering, some of two-column relationships that are evaluated as weaker than the others are partially neglected. Still, despite potential inaccuracy factors, the approximate results of analytical queries taught by the present systems and methods are usually close enough to their exact counterparts when tested on large real-world data sets. Due to the diagnostic analysis performed on data summary tables described above, histogram generation, as well as special value/domain gap/co-occurrence ratio ranking functions are able to store the most meaningful aspects of the original data.

Adaptation of Belief Propagation Algorithm

The idea of adapting tree-based belief propagation is motivated by a need to develop an efficient method to model conjunctions of conditions specified over multiple columns. Other logical operations (such as, e.g., disjunctions) and conditions defined over derived columns (such as, e.g., arithmetic or CASE WHEN expressions, as discussed below) may also be incorporated.

In an embodiment, the engine contains some significant extensions when compared to the classical characteristics of propagation mechanisms. In particular, it facilitates work with conjunctions of more complex single-column conditions than the "variable=value" filters that would be supported by standard models.

A two-valued variable characterizing whether a given original row in packrow t could hold the condition specified by query Q over column $c \in C \cap X$ is denoted by $C_Q$. The values of $C_Q$ as $r_Q^c[1]$ and $r_Q^c[2]$ correspond to rows satisfying and not satisfying the considered condition, respectively. (Those values are not indexed with t, as they have the same meaning for all packrows of a given table.) Using such new notation, probabilities can be rewritten as $p_t(Q^{\downarrow X}) = p_t(\hat{\ }_{c \in C \cap X} r_Q^c[1])$ and $p_t(Q) = p_t(\hat{\ }_{c \in C} r_Q^c[1])$. Estimation of new frequencies and co-occurrence ratios for (pairs of) columns in B as conditionals subject to $\hat{\ }_{c \in C} r_Q^c[1]$ can be performed.

As illustrated in FIG. 7A (see also line 11, 418, in Algorithm 2), tree $\vec{S}_t^X$ is extended with nodes corresponding to variables $C_Q$ 365 and specifying their parents as the corresponding columns $c \in C \cap X$. Such new causal relations are equipped with conditional probabilities of the following form (line 12, 419):

$$p_t(r_Q^c[1] \mid r_Q^c[i]) = \frac{\|r_t^c[i] \cap Q\text{'s condition on } c\|_t}{\|r_t^c[i]\|_t} \quad (7)$$

The nominator estimates the number of rows in packrow t whose values on c drop into its i-th range and in the same time satisfy the considered WHERE clause over c, while the denominator simply denotes the height of the i-th bar for c. Referring to FIG. 6, where—for $b_Q$ represents filter b>x, it results in $$p_t(r_Q^b[1] \mid r_t^b[1]) = 0, \; p_t(r_Q^b[1] \mid r_t^b[2]) = \frac{1}{3}$$

and $p_t(r_Q^b[1] \mid r_t^b[3]) = 1$.

For this particular example, Algorithm 2, 400, (see FIG. 7B) would proceed with the tree $a \leftarrow b \rightarrow b_Q$. Additionally, computation of $p_t(r_Q^b[1] \mid r_t^b[2])$ would be the only place referring to more detailed knowledge about the domain of b. Namely, the analysis of gaps 300 would influence estimation of the proportion of values observed in $r_t^b[2]$ that are greater than x. At all the remaining stages, Algorithm 2 would operate entirely with histograms and co-occurrence ratios.

After extensions described in lines 11-12, 418/419, the given tree is ready to perform belief propagation, where query conditions are modeled by setting appropriate coefficients at the leaves corresponding to variables $C_Q$, 365, $c \in C \cap X$. For $a \in X$ and tree $\vec{S}_t^X$, denoted by $D_t^a$ and $N_t^a$, the sets of all descendants and non-descendants of a (including a itself), respectively:

$p_t^{\downarrow}(r_t^a[i])$ denotes the probability that conjunction $\hat{\ }_{c \in C \cap D_t^a} r_Q^c[1]$ holds in packrow t subject to observing values within range if $r_t^a[i]$ on column a, $p_t^{\uparrow}(r_t^a[i])$ denotes the probability that values within range $r_t^a[i]$ are observed on column a subject to satisfaction of conjunction $\hat{\ }_{c \in C \cap N_t^a} r_Q^c[1]$.

Given the independence of $N_t^a$ and $D_t^a$ subject to a in the considered tree-based probability model, the following proportion is assumed (how accurately dynamically derived approximate models reflect the data is a primary analytical scope of the testing):

$$p'_t(r_t^a[i]) \alpha p_t^{\downarrow}(r_t^a[i]) p_t^{\uparrow}(r_t^a[i]) \quad (8)$$

The left-hand side of formula (8) represents the revised probability distribution on the quantized domain of a, so it sums up to 1 for all considered indexes i. This means that it is sufficient to find any value proportional to the above right-hand side. The major advantage of tree-based belief propagation is its ability to recursively determine parameters $\lambda_t r_t^a[i] (r_t^a[i]) \alpha p_t^{\downarrow(r_t^a[i])}$ and $\pi_t(r_t^a[i]) p_t^{\uparrow} \alpha(r_t^a[i])$, in order to replace equation (8) with the following one:

$$p'_t(r_t^a[i]) \alpha \lambda_t(r_t^a[i]) \pi_t(r_t^a[i]) \quad (9)$$

Whereby the symbol a denotes the fact of two quantities indexed by i being proportional to each other in the context of the normalization factors over the whole set of coordinates. The set of all children of column a in $\vec{S}_t^X$ (is denoted by $CH_t^a \subseteq D_t^a$. The standard way of calculating parameters $\lambda_t$ and $\pi_t$ is as follows:

for each node $c_Q$, $\lambda_t(r_Q^c[1]) = 1$, $\lambda_t(r_Q^c[2]) = 0$, for all other leaves in $\vec{S}_t^X$, $\lambda_t = 1$.

For each $b \in X$ which is not a leaf in $\vec{S}_t^X$, $$\lambda_t(r_t^b[j]) = \Pi_{a \in Ch_t^b} \lambda_t^a(r_t^b[j]) \quad (10)$$

Coefficients $\lambda_t^a (r_t^b[j])$ are calculated as $\Sigma_i p_t(r_t^a[i] \mid r_t^b[j]) \lambda_t(r_t^a[i])$. However, in an embodiment, the engine may only store partial knowledge about data-derived probabilities, so the classical computation of $\lambda_t(r_t^b[j])$ is replaced by the following:

$$\lambda_t^a(r_t^b[j]) = \sum_{i: \tau_t(r_t^a[i], r_t^b[j]) \neq \tilde{a}} \tau_t(r_t^a[i], r_t^b[j]) p_t(r_t^a[i]) \lambda_t(r_t^a[i]) + \quad (11)$$

$$\tau_t(a, b) \left[ \alpha_t^a - \sum_{i: \tau_t(r_t^a[i], r_t^b[j]) \neq \tilde{a}} p_t(r_t^a[i]) \lambda_t(r_t^a[i]) \right]$$

where $\alpha_t^a = \Sigma_i p_t(r_t^a[i]) \lambda_t(r_t^a[i])$. In an embodiment, equations (10-11) are the basis for the $\lambda$-downward phase of the developed WHERE-related belief propagation. Equations (12-13) enable running of the $\pi$-upward phase. When compared to the general layout—it is not necessary to initiate $\pi_t$ for nodes $C_Q$, as those are leaves in the extended version of $\vec{S}_t^X$. First, for the root of $\vec{S}_t^X$, $\pi_t(r_t^{root}[i]) = p_t(r_t^{root}[i])$ Then, for each $a \in X$ which is not the root, $\pi_t(r_t^a[i])$ may be specified as equal to $\Sigma_j p_t(r_t^a[i] \mid r_t^{\hat{a}}[j]) \pi_t^a(r_t^{\hat{a}}[j])$ where $\hat{a}$ denotes the parent of a and:

$$\pi_t^a(r_t^{\hat{a}}[j]) = \pi_t(r_t^{\hat{a}}[j]) \Pi_{b \in Ch_t^{\hat{a}} \setminus \{a\}} \lambda_t^b(r_t^{\hat{a}}[j]) \quad (12)$$

However, for the same reason as above, the classical way of deriving $\pi_t^a(r_t^a[i])$ based on coefficients $\pi_t^a(r_t^{\hat{a}}[j])$ is changed to the following:

$$\pi_t(r_t^a[i]) = P_t(r_t^a[i])\left[\sum_{j:\tau_t(r_t^a[i],r_t^b[j])\neq \tilde{a}} \tau_t(r_t^a[i], r_t^{\hat{a}}[j])\pi_t^a(r_t^{\hat{a}}[j]) + \tau_t(a, \hat{a})\left[\beta_t^\alpha - \sum_{j:\tau_t(r_t^a[i],r_t^{\hat{a}}[j])\neq \tilde{a}} \pi_t^a(r_t^{\hat{a}}[j])\right]\right] \quad (13)$$

Where $\beta_t^\alpha = \Sigma_j \pi_t^a(r_t^{\hat{a}}[j])$. Due to the specifics of the tree construction, there is a straightforward way to estimate the ratio of rows in packrow t that satisfy conditions of query Q defined on columns belonging to C∩X:

$$p_t(Q^{\downarrow X}) = \Sigma_i p_t(r_t^{root}[i])\lambda_t(r_t^{root}[i]) \quad (14)$$

Right after the λ-downward phase of belief propagation, $p_t(Q^{\downarrow X})$ can be retrieved. In the case of multiple connected components of graph $G_t$, the final $p_t(Q)$ may be derived according to line 16 (420) in Algorithm 2, 400. This leads towards already discussed potential performance benefits. Namely, if $p_t(Q)=0$, further calculations for packrow t can be skipped and the calculations may proceed directly to line 34 (428).

Another aspect of performance acceleration relates to parameters $\lambda_t^a(r_t^b[j])$ and $\pi_t(r_t^a[i])$. The maximum number of histogram bars is denoted by max_no_of_bars, 252 as in Algorithm 1, 250, (See FIGS. 2A-2B). In their original form, formulas $\lambda_t^a(r_t^b[j]) = \Sigma_i p_t(r_t^a[i]|r_t^b[j])\lambda_t(r_t^a[i])$ and $\pi_t(r_t^a[i]) = p_t(r_t^a[i], r_t^{\hat{a}}[j])\pi_t^a(r_t^{\hat{a}}[j])$ lead toward the quadratic cost $\sigma$ (max(|X|·max_no_of_bars²). On the contrary, equations (11) and (13) provide computational complexity at the level $\sigma$ (max(|X|·max_no_of_bars, |t|)), where |t| denotes the number of co-occurrence ratios stored by the illustrative engine for packrow t.

The last aspect of Algorithm 2, 400, is to use λ/π-coefficients to deliver revised single-column distributions and co-occurrence ratios (denoted in general as $\tilde{t}$) as an input to subsequent query execution 207 steps or the final phase of query result generation. Proportion (9) relates to histograms. As about co-occurrence ratios involving connected columns—for a given a and its parent â—the revised probability $p'_t(r_t^a[i], r_t^{\hat{a}}[j])$ may be resolved by the belief propagation process performed with Q's conditions extended by $\lambda_t^a(r_t^{\hat{a}}[j]) \leftarrow 1$ (and 0 otherwise). Simple recalculations lead then towards the following formula for the revised co-occurrence ratio derived as $p'_t(r_t^a[i], r_t^{\hat{a}}[j])$ divided by $p'_t(r_t^a[i])$:

$$\tau'_t(r_t^a[i], r_t^{\hat{a}}[j]) = \frac{\lambda_t(r_t^a[i])\tau_t(r_t^a[i], r_t^{\hat{a}}[j])p_t(r_t^a[i])}{\lambda_t^a(r_t^{\hat{a}}[j])p'_t(r_t^a[i])} \quad (15)$$

In an example, the above equation may be used to recalculate all co-occurrence ratios stored in t. For pairs of columns that are not connected, the same formula may be utilized for a slightly modified tree as described in lines 23-29 (426) of Algorithm 2, 400. This part of the process is also highlighted as the last step 367 in FIG. 7A. The edge directly connecting the considered columns is temporarily replaced. The entire operation is performed in such a way that a loss of summary-based approximation of mutual information $I_t$—and therefore also a loss of the tree entropy—is minimized. The revised default ratios $\tau'_t(a, b)$ are then obtained by using the formula analogous to equation (3).

Generating Final Query Results

Figure 8:
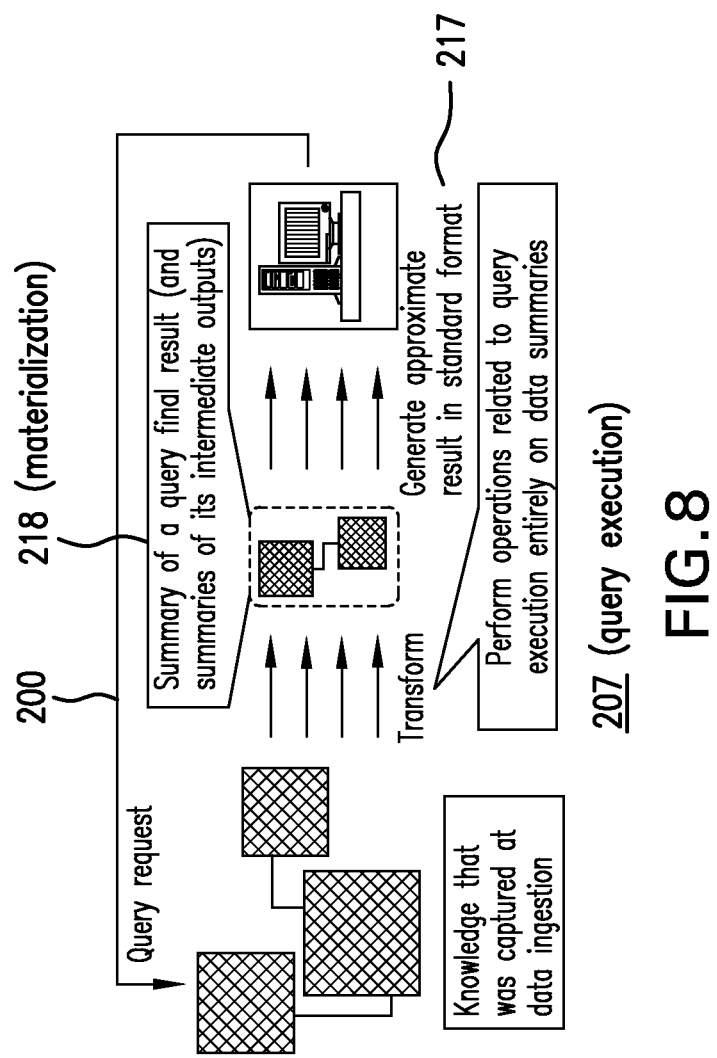
FIG. 8 illustrates a query execution process understood as a sequence of data summary transformations, with the query result generation as its very last step.

In an exemplary embodiment, once the summary of a query output 215 is calculated, the engine may translate it into the standard SQL result format. Prior to this stage, as illustrated in FIG. 8, knowledge being transformed throughout subsequent query execution 207 stages is highly condensed and therefore it requires only a fraction of resources of a traditional database engine to produce the results. However, at the end, results 217 must be delivered in an externally interpretable format. (Unless this is the case of a nested query 200, where the result of subquery can remain in a summarized form.) This phase is referred to as materialization 218 (though it should not be confused with a standard meaning of materialization in columnar databases).

Alternatively, if the knowledge capture layer 110 is regarded as responsible for aforementioned information granulation, then translation of query result/data summaries 340 into final approximate results 217 can be treated as information degranulation. Thus, the overall design of the exemplary engine fits the idea of calculations on information granules, with a special emphasis on their transformation and reorganization.

Query result generation can also be understood as transition from a result summary to a result comprising crisply-valued tuples. For simple queries 200, such as aggregations optionally grouped with respect to low-cardinality data columns, this stage is quite straightforward. As an example, execution of the previously considered SELECT statement consists of transforming information about a subject to the clause b>x and then producing the final outcome SUM(a). In this case, the result can be computed as a total sum of outputs 215 produced by each of packrows 310. For a given packrow 310, the transformed frequencies 290 of a's special values 295 are taken into account and value frequency scores are added to the constructed sum. Finally, contributions of histogram bars 280 are calculated after subtracting frequencies 290 of their special values 295. For this purpose, an estimate of an average "non-special" value within each bar is constructed. Such estimate can be obtained based on domain representation discussed above.

The situation changes if high-cardinality columns are involved. For example, it may be especially beneficial to model all data operations at the level of summaries 340 and switch to the detailed values just prior to shipping the query result 217 outside. Referring to FIG. 7A, the query SELECT a, b, c FROM T WHERE b>x and c<y. In this case, after belief propagation, collections of the resulting a-b-c tuples are generated corresponding to each of (non-zeroed) packrow summaries 340. First, the summaries 340 (both single- and multi-dimensional ones) are used to create collections of tuples labeled with codes of special values 295 and histogram ranges 285 (symbolizing occurrences of "non-special" values). At the end, codes are replaced with final values generated using—again—domain information available for the involved columns.

In conclusion, query result 217 generation relies both on operations presented in previous sections and the domain representation used at the last stage. In addition to knowledge summarized in terms of (co-)occurrences of special values 295 and histogram bars 280, the most significant gaps 300 and the greatest common divisors of values observed in the original data packs are stored. Referring to the theory of rough sets, special values 295 whose frequencies 290 were not pushed down to zero during query execution 207 constitute a kind of domain's positive region, i.e., these are values that should contribute to the query result 217. On the other hand, gaps 300, greatest common divisors, dictionaries (if available) and zeroed frequencies may be used together to define the domain's negative region, i.e., values that should not contribute to the result. Utilization of such regions during result generation eliminates non-existing values in the approximate query outcomes.

Figure 9:
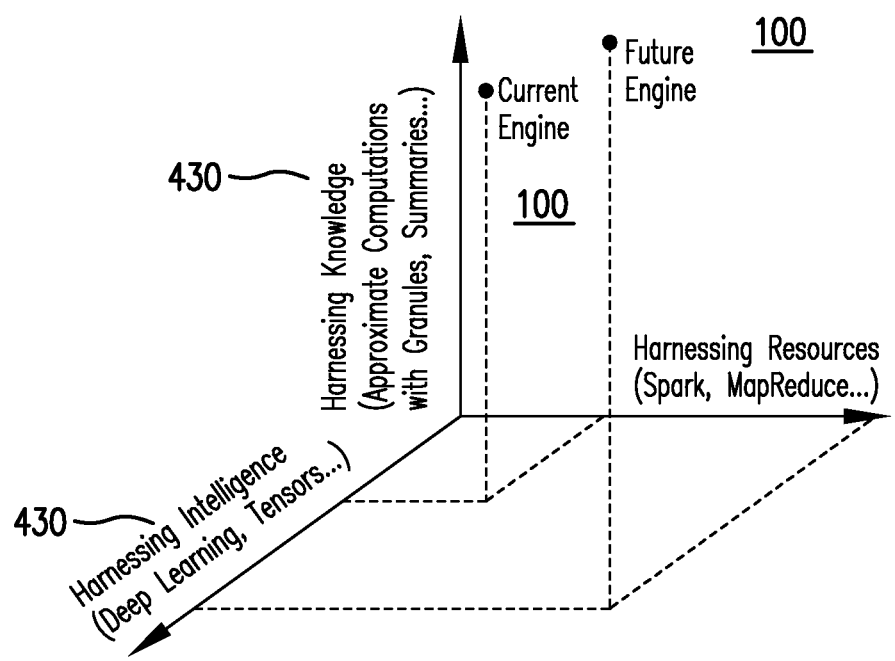
FIG. 9 illustrates a high-level roadmap for combining summary-based calculations with modern trends related to functionality and scalability of data analytics.

From the user perspective, the most important aspect is a balance between speed and accuracy of deriving approximate results, in comparison to both exact and sample-based styles of calculations. From an architectural roadmap standpoint, abilities of the present systems and methods are considered to scale with respect to available computational resources and perform sufficiently well for increasingly complex operations. FIG. 9 illustrates the goal of combining summary-based computations of present embodiments 100 with other paradigms 430.

Figure 10:
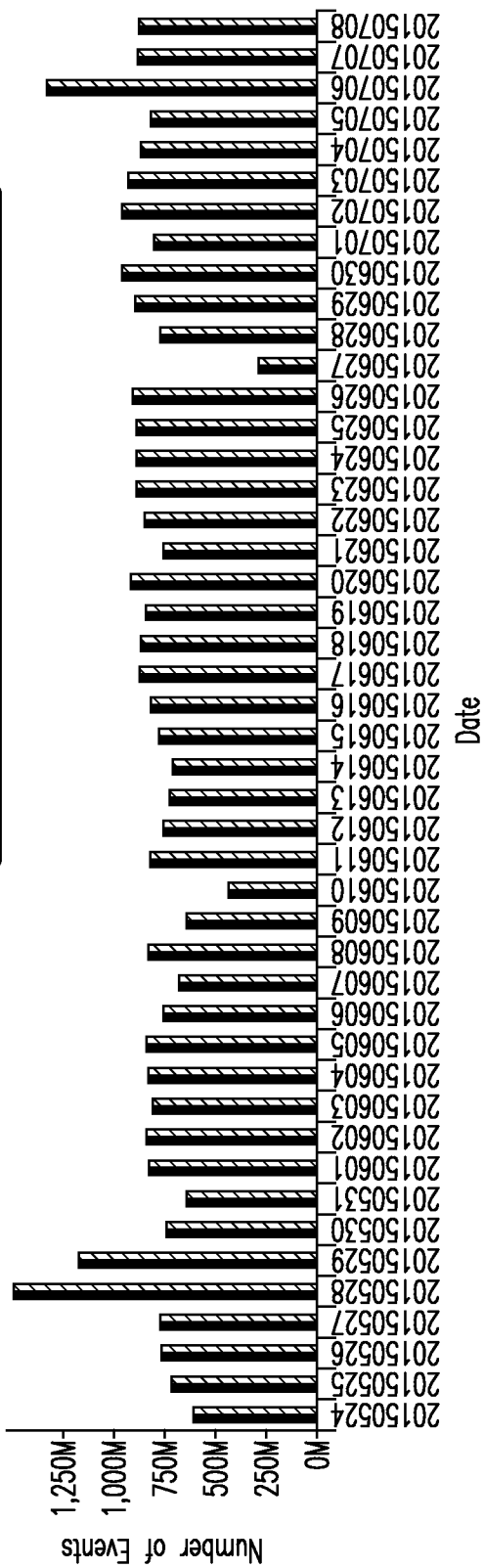
FIG. 10 is an exemplary embodiment of the present systems and methods compared to standard settings of Hive and Spark SQL.

FIG. 10 illustrates a typical scenario of comparing embodiments of the present systems and methods 100 with the other solutions. An increase in performance at the cost of losing accuracy is expected. The aim is to find out the right balance between these two aspects for particular case studies involving expected queries, data characteristics and data owner requirements. To evaluate accuracy, several approximate query engines enrich results with confidence intervals that reflect the output's credibility when comparing it to a hypothetical actual result. A method for expressing similarities between approximate and explicitly computed standard results, so as to confirm the user expectations with respect to the speed-versus-accuracy trade-offs must first be construed.

Preferably, a reasonable measure of similarity between exact and approximate outcome of queries should certainly satisfy some basic mathematical properties. Moreover, it should be coherent with human perception of the meaning of both results in practice. For instance, if an outcome of query Q is supposed to take a form of a single numeric value, then—denoting by $out_Q$ and $\widetilde{out}_Q$ the exact and approximate results, respectively—the following is used:

$$\text{similarity}(out_Q, \widetilde{out}_Q) = 1 - |out_Q - \widetilde{out}_Q| / |out_Q| + |\widetilde{out}_Q|) \quad (16)$$

Queries with GROUP BY deliver tuples labeled by grouping columns and aggregate scores. The formula (16) is then averaged over all groups that occur in either exact or approximate outcomes. In the case of query 200 illustrated in FIG. 10, the groups are induced by column tm_day 440. The same tm_day 440 values occur for both exact and approximate results. Moreover, for each tm_day 440, its corresponding exact and approximate aggregates are very close to each other 450. Therefore, the overall similarity is close to the maximum. However, if an approximate result included a large amount of grouping values that should actually not occur at all, then its overall similarity to the exact result would be significantly lower.

Referring to FIG. 10 again, Hive 455 and Spark SQL 460 are used as a basis of comparison for embodiments of the present systems and methods 100. Queries 200 were executed over a data set provided by a client. In the case of Hive 455 and Spark SQL 460, Hadoop/Parquet 465 were used. For an exemplary query 200, the similarity between its exact and approximate results is equal to 0.98. Further, experiments related to re-implementation of the knowledge transformation operations in native Spark environment have been conducted. Preliminary results allow for the comparison of query acceleration factors corresponding to both summary-based computations and resource-related scalability used, e.g., by Spark SQL 460.

Figure 11:
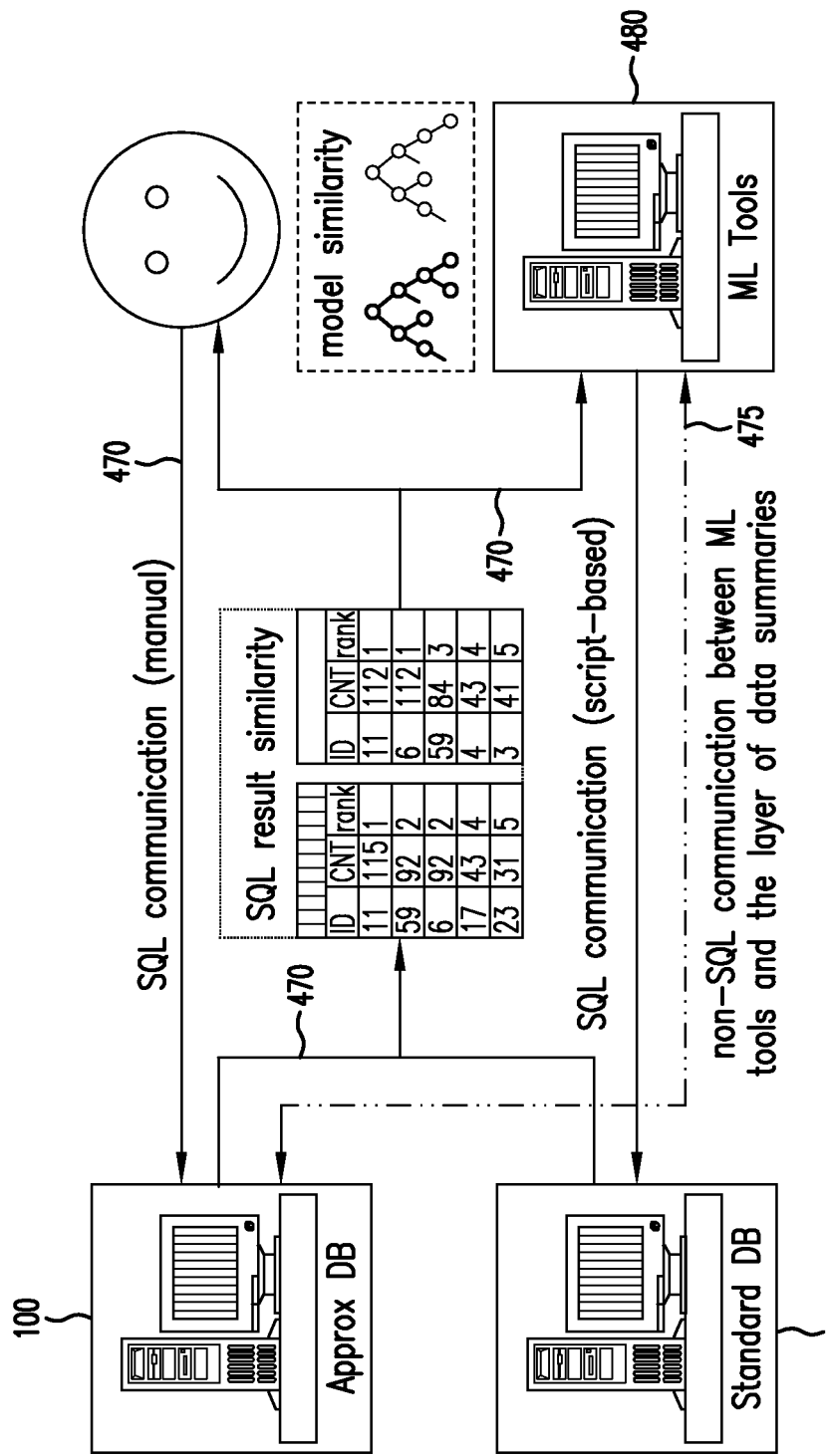
FIG. 11 illustrates different modes of comparative evaluation of accuracy of approximate queries.

FIG. 11 illustrates different modes of comparative evaluation of accuracy of approximate queries and the idea of using query results 217 (not shown) within machine learning algorithms. Solid lines 470 represent analytical processes based on SQL statements executed manually or automatically by, e.g., machine learning (ML) algorithms. Dashed lines 475 represent a more direct style of implementation of ML methods over data summaries 340.

A number of scalable implementations of decision tree induction or data clustering, are based on iterative execution of ad-hoc SQL statements providing an opportunity to evaluate approximate results not only by means of similarity measures but also by means of comparing the final outcomes of SQL-based machine learning algorithms while feeding them with approximate versus exact calculations. This references to the aforementioned analogy between approximate querying and perceptual image processing methods, whereby the main point is to focus on functionally important aspects of managed information. As shown in FIG. 11, one can also run some machine learning tools/methods 480 directly against data summaries 340 (indicated by 475), instead of using classical SQL-based interface. Any steps toward this direction would fit the harnessing knowledge dimension illustrated in FIG. 9. Moreover, from the perspective of evaluation of the engine components, the knowledge capture layer 110 can be evaluated decoupled from SQL-specific knowledge transformation mechanisms. In an example, one of standard minimum redundancy maximum relevance (mRMR) feature selection techniques is executed for some real-world data sets using: 1) mutual information scores computed over the original data, 2) mutual information scores computed over 15%-samples and 3) approximations of mutual information scores derived directly from the stored data summaries 340. The outputs—interpreted as rankings of columns produced by each of the three above runs of the mRMR algorithm—show summary-based approximate calculations are incomparably faster. Additional embodiments may be implemented in accordance with the present methods and systems including the following:

Coverage of SQL Operations: Besides data filtering, other operations are supported, such as JOIN, GROUP BY, etc. While joining two tables, summaries of collections of tuples can be created that belong to a standard output of JOIN operation. This is done by amalgamating the pairs of summarized packrows 310 of input tables. Such amalgamation is analogous to the filtering operations, though it can be preceded by a single-table process of merging similar packrow summaries (the outcomes of Algorithm 2, 400, if any filters were applied prior to joining). As for GROUP BY, its standard output would consist of vectors labeled by aggregate results and the corresponding values of columns used for grouping. Herein, the goal is to produce summaries of such vectors without generating them explicitly.

Data Types and Derived Columns: In general, some components of above mentioned operations are agnostic, while the others depend on semantics of particular columns. For example, in Algorithm 2, 400, almost all calculations are conducted on probabilities of abstracted partition blocks, except line 12, 419. For instance, for some alphanumeric columns, histogram bars 280 labeled by prefixes may be utilized instead of ranges 285. For such new types of histograms, some fundamental knowledge transformation functions—such as equation (7)—would require re-implementation. There is also requirement for dynamic creation of both one-dimensional and two-dimensional summaries reflecting new columns derived as complex expressions. Computations at this level need to rely on the types of original columns also.

Disk and Memory Management: Database mechanisms of the present methods and systems may be adapted to work with granulated summaries. Their contents may be clustered into even bigger chunks—"mega-packs"—and labeled with higher-level descriptions. In an embodiment, the engine may be a step toward the paradigms of multi-level granular data analytics. Yet another aspect refers to vertical data organization, which means an independent access to collections of histograms 280, special values 295, gaps 300, co-occurrence ratios, etc. This way, for every query, these components of stored data summaries 340 that are required to execute particular operations can be grasped. Such components may be cached in memory for the purposes of future queries 200. Moreover, summaries 340 representing intermediate outputs 215 of query execution 207 stages may be managed in memory in a pipeline style like in the case of standard database engines.

Knowledge Capture Improvements: The criteria for choosing ranges 285, special values 295, etc. may be enhanced. More intelligence may be incorporated into the process of assigning the original data rows to buffered packrows 310. Moreover, the knowledge capture layer 110 may be integrated with some components of the Apache ecosystem. Distributed knowledge capture processes may be synchronized with respect to maintenance of global structures, such as dictionaries for low-cardinality columns (see table dict in FIG. 5A). In an embodiment, the present systems and methods serve as a modular architecture (see FIG. 12), where a layer of reconfigurable knowledge capture agents 505 provides a method for connecting to different types of data locations and preparing summaries 340 available within different analytical platforms 510.

Accuracy Trade-offs and Hybrid Scenarios: In an embodiment, the engine may store only a limited fraction of knowledge, specified by means of maximum amounts of histogram bars, special values 295, gaps and co-occurrence ratios. Although all those amounts are constrained by some defaults, it is possible to vary them with respect to particular columns or the whole data tables. For instance, it may be desirable to optionally access some of tables in a classical form and join them with summarized contents of other tables within hybrid query execution 207 schemes. Such flexibility fits real-world scenarios of incremental data analytics, but requires careful maintenance of information that allows the algorithms to extract the original data from remote sources. From the perspective of FIG. 12, this kind of information may be managed by knowledge capture agents 505. Parameters enabling the engine to trace the original data may constitute a kind of analytical knowledge grid, by analogy to the concept of knowledge grid considered in semantic web.

Accuracy Measures and Confidence Intervals: Accuracy may be a measure of similarity between exact and approximate query results, as well as similarity between the outcomes of machine learning algorithms working with detailed and summarized data sets. Quality measures of data summaries 340 may be designed to investigate relationships between the accuracies of input summaries and the expected accuracies of query results 217. Confidence interval calculations may be used to assist users in their everyday work, as is used with some sampling based approximate query engines. To accomplish this, the framework of the present systems and methods may be enhanced with a kind of query explain functionality enabling the users to trace potential inaccuracies emerging at particular stages of query execution 207. Second, a tool for maintaining a sample of original packrows 310 and uses it—in combination with the core engine—to produce confidence intervals that characterize similarities between exact and approximate outcomes of SQL statements may be provided.

Figure 12:
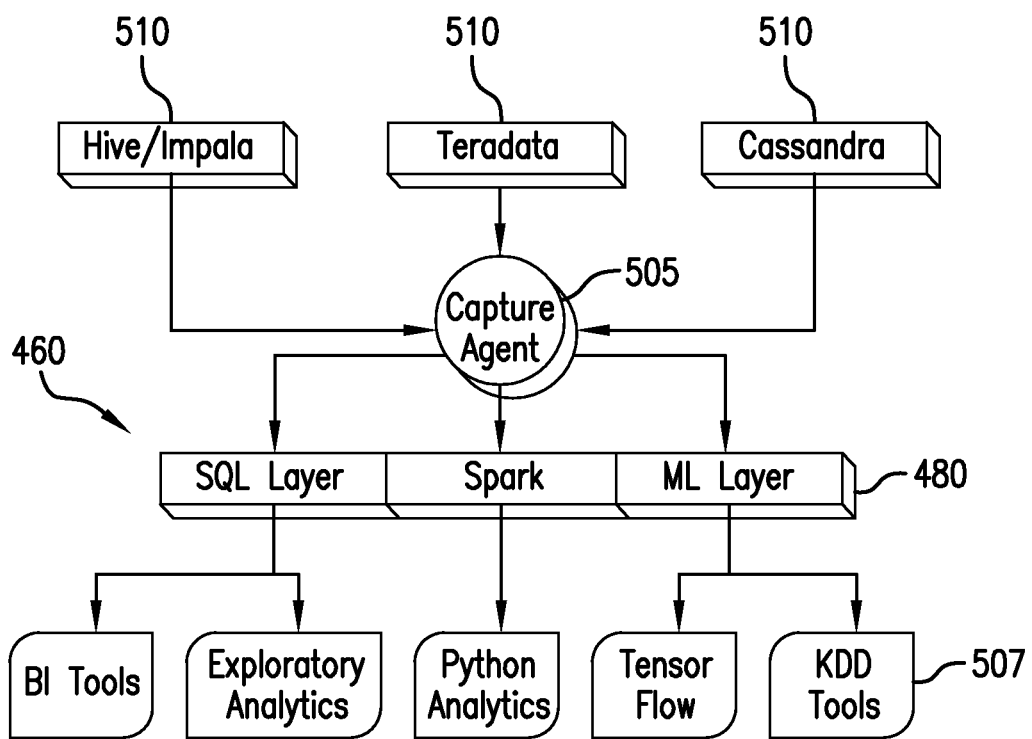
FIG. 12 illustrates the combination of components of embodiments of the present systems and methods with other tools and systems.

Ability to Expand Beyond SQL: FIG. 12 illustrates the extension of embodiments of the present application with a library-style support for machine learning and knowledge discovery (KDD) processes/tools 507. As discussed above, it is possible to use data summaries 340 to conduct processes like mRMR feature selection. Other feature selection approaches may also be incorporated such as elements of deep learning and redesign of some SQL-based decision tree induction algorithms. Notably, most of such algorithms rely on iterative data and model transformations. This constitutes a kind of conceptual equivalence between embodiments of the systems and methods with respect to approximate SQL and intelligent data processing. By analogy, efficient and accurate methods of expressing atomic machine learning operations by means of transforming summaries of their inputs 210 into summaries 340 of their outputs 215 may be provided. Abstracting such operations can lead towards a powerful environment for interactive analytics, wherein the users may work with summaries of intermediate inputs/outputs 210/215 via their favorite interfaces.

Integrating with Other Computational Paradigms: FIG. 12 also summarizes opportunities related to putting architectural strengths together with other trends in the areas of scalable and distributed data processing. SQL Layer 460 denotes the currently existing layer of relational-query-focused transformations that can be successfully embedded into Spark environment (see also the harnessing resources dimension in FIG. 28). ML Layer 480 represents methods discussed above. Capture Agent 505 refers to the distributed knowledge capture layer 110 that can save constructed histograms, etc., in a format uniformly accessible by SQL Layer 460, ML Layer 480 and Spark's generic tools enabling the users to work directly with data summaries 340 (this may be combined with interactive analytics, which—in addition to intermediate inputs/outputs 210/215 of machine learning algorithms—can embrace an access to summaries of simply filtered, joined and grouped data sets).

Deployment in the Area of Cyber-Security Analytics

As data sets are getting larger and hackers increasingly sophisticated, adding more and more computational power to identify breaches is no longer scalable. This is especially visible in situations when modern machine intelligence techniques are not able to assist the users. One of the current trends in decision-making is to configure the utilized classification and prediction models in such a way that they produce final scores only for sufficiently certain cases, leaving the "boundary" for further investigation by humans. This is especially worth considering in the application areas whereby the cost of false-positive/negative mistakes is truly high, like in the world of cybersecurity.

There is a growing need for scalable solutions for both machine learning and interactive analytics in the area of cyber-security. Machine learning aims at segmentation and classification of log events, which leads towards optimization of the threat monitoring processes. The tools for interactive analytics are required to resolve the uncertain cases, whereby machine learning algorithms are not able to provide a convincing outcome and human expertise is necessary. There is a growing importance of statistical modeling and machine learning methods in the field of cyber-security, with well-established specific areas such as adaptive anomaly detection and intrusion type classification. In particular, there are many approaches to analyzing the network log event data sets that are based on the principles of Bayesian modeling and reasoning, in relation to Bayesian-style graphical models and estimation methods. Moreover, new computer security solutions may adapt some ideas taken from computational intelligence including, e.g., the elements of granular computing and rough sets. There are also some works focused on providing the users of cyber-security systems with visually-supported tools for data interaction. Moreover, it is possible to actively search through meaningful information sources and integrate the acquired data with network-security-related knowledge bases. This way the developers of security analytics platforms can take the advantage of both knowledge discovery techniques that enrich the original data with insightful information and visual exploration techniques that let domain experts efficiently investigate the toughest cases.

From the perspective of the exemplary SuperScale Analytics platform, methods supporting incremental data exploration (whereby the users begin their interaction with the system at the level of general trends and then they drill down to examine more detailed aspects of available information) are provided. Such "zooming-in" processes are often empowered by analytical database solutions that resolve queries triggered by visual interfaces. Some of those solutions assume that query results 217 obtained by the users at the beginning of exploration do not need to be fully exact or—in some other scenarios—they do not need to be exact at once.

The query layer empowers the exemplary SuperScale Analytics platform works with intelligently produced data summaries 340. The platform connects with two engines—approximate and standard. The summary-based approaches to data processing are already well-known. However, both engines rely on summaries that are built in a unique way, basing on the ideas of data quantization and granulation. Herein, we refer to the paradigms of approximate computing and already-mentioned granular computing.

In an exemplary case study of a security operations platform, typical layers of information processing are integrated with a database engine dedicated to approximate analytics. The engine makes it possible for the security experts to query massive log event data sets in a standard relational style. The query outputs are received orders of magnitude faster than any of the existing database solutions running with comparable resources and, in addition, they are sufficiently accurate to make the right decisions about suspicious corner cases.

The engine internals are driven by the principles of information granulation and summary-based processing. They also refer to the ideas of data quantization, approximate computing, rough sets and probability propagation. The engine's parameters can influence its performance within the computing environment. In addition to the results of experiments conducted on large data sets, high level design decisions including the choice of an approximate query result accuracy measure that should reflect the specifics of the considered threat monitoring operations are also considered below.

In the presumptive "approximation-prohibitive" field of cybersecurity, where network security monitoring operations are expected rely on detailed analytical processes, the speed of decision-making is sometimes more important than perfect calculations. More precisely, thorough examination is still needed to verify the characteristics of each potential threat, the threats need to be first efficiently identified to narrow down further exploration.

Identification of threats may be conducted in many ways. A number of statistical learning and machine intelligence methods may assist in heuristic classification of threats based on patterns and examples learned from the data. On the other hand, there are security specialists who are able to go beyond the observed data and make thoughtful decisions based on a wider context. These two ways need to be combined to build a modern security operations platform. Human experts who use the platform to provide security services need to have truly efficient access to information comprising both the results of machine learning methods and the atomic data.

In an exemplary embodiment, the online SuperScale Analytics platform provides such efficient access for both analysts and end-users. The platform comprises several data collection, indexation and aggregation layers, with an extra capability of fast ad-hoc interaction with raw network event logs stored in a relational form. Information about event logs may be available in multiple modes. Two illustrative modes are: 1) using standard queries that are advisable for operations on relatively small sets of rows and 2) approximate queries that can perform fast enough for arbitrary data portions.

Approximate query engines may be developed in several ways to assist the organizations specialized in providing their clients with the tools for this kind of online data analytics. Given the requirements of this particular platform, an exemplary engine that conducts approximate data operations based on granulated summaries of the input data may be deployed. The engine comprises the layers responsible for software agent style acquisition of data summaries 340 and utilizing the stored summaries to produce fast approximate answers to ad-hoc queries. Namely, for each SQL SELECT statement, subsequent operations scheduled within its execution plan are performed as transformations of granulated summaries representing their inputs into the summaries representing their outputs.

A query accuracy measure that corresponds to the user needs and expectations—in the particular area of network monitoring—may be provided. The applied measure should expose especially (and exclusively) those differences between exact and approximate results of the SELECT statements that might mislead the decision makers in their threat assessments. The choice of an appropriate measure must accommodate different user groups and different query outcome scenarios. On the other hand, a well-defined accuracy measure to find the right trade-off between the performance and exactness of query-driven analytics at the considered platform is optimal.

As the next step, the correspondence between the accuracy observed for some typical ad-hoc queries and the level of granulation of the acquired data summaries 340 should be accounted for. In the illustrative engine, the incoming data is partitioned into collections of rows described by means of single-column frequencies and some multi-column co-occurrence regularities. Thus, operating with larger clusters leads to acceleration of computations but may also yield less precise data summaries 340 and, consequently, less accurate approximate query results. On the other hand, summaries may be made more thorough e.g. by increasing the amounts of explicitly represented values and co-occurrence coefficients (however, this may also lead toward higher computational cost of the summary transformation operations that the illustrative engine relies on).

SuperScale Analytics Platform

The exemplary SuperScale Analytics platform/interface 520 provides a wide range of tools that annotate and aggregate massive amounts of the event log data. These tools make it possible for the security experts to work with the alert tables, where the rows correspond to sequences of network connections and the columns correspond to different types of potential threat indicators. Reliable decisions can be made quite often at such an aggregated level. However, sometimes it is necessary to interrogate the original atomic data. The platform 520 discussed herein addresses this particular need.

TABLE 1

Data table with atomic network event logs.
Column name: Column description srcipint: integer version of IP V4 address of the source
srcport: source port used for communication by the operating system dstipint: integer version of IP V4 address of the destination dstport: destination port used for communication by the application reportdevice: device that is logging the event devicetypename: vendor device type devicevendor: device vendor that produced the appliance subjectuser: user account conducting an action
clientid: client identification
srccountrycd: country code for the source of communication dstcountrycd: country code for the destination of communication reportdeviceint: integer version of IP V4 address of the reporting device targetuser: user account that an action is performed against timestampday: integer version of YYYYMMDD timestamp timestamphour: integer version of YYYYMMDDHH timestamp timestampminute: integer version of YYYYMMDDHHMM timestamp timestampsecond: integer version of YYYYMMDDHHMMSS timestamp direction: direction of an event
disposition: whether an event was allowed, denied or unknown signatureid: ID representation of a known signature assetid: ID representation of a known asset userid: ID representation of a known user
networkid: ID representation of a known network segment
devid: device specific event identifier eventname: device specific event name protocol: protocol used for network communication
asnid: identifier for the Autonomous System Number Table 1 above describes columns in the relational data table gathering network events collected for each customer. Given the intensity of monitored traffic, the data growth is observed at the level of over 300 billions of new rows per month. The platform 520 provides fast data access to a wide group of end-users, so that customers can conduct ad-hoc analytics by themselves. The expectation for an average query response time may be set at the level of two seconds. As such expectation is impossible to meet by any kind of standard database software using reasonable resources, the platform 520 leverages the summary-based approximate query engine introduced above.

Figure 13:
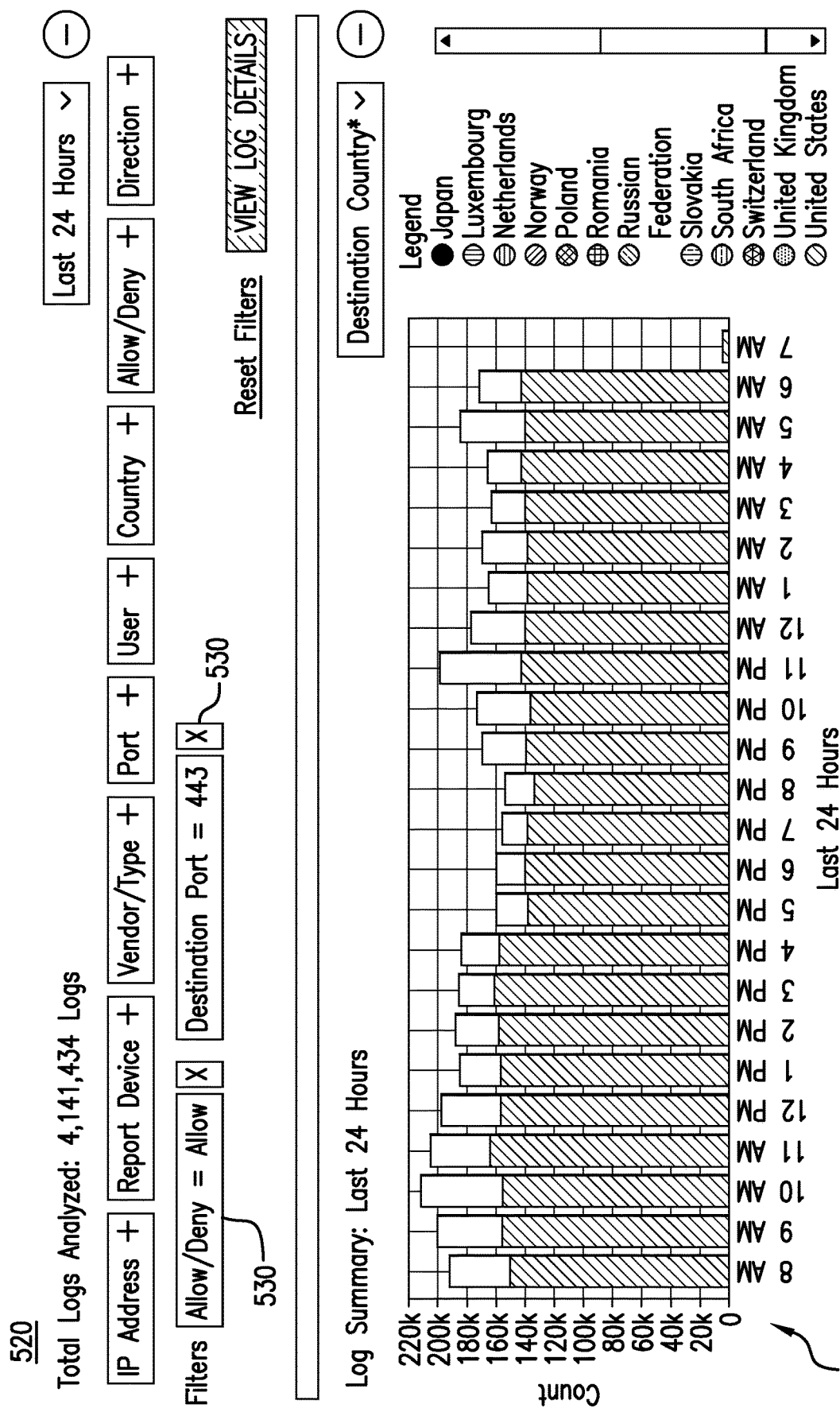
FIG. 13 is a screenshot from an exemplary online interface.

FIG. 13 shows a screenshot from an exemplary Super-Scale Analytics online interface 520. The number of rows in the queried table that satisfy conditions "disposition=Allow" and "dstport=443," 530, is approximately equal to 4,141,434. The bars 540 reflect approximate counts for the groups defined with respect to dstcountrycd and timestamphour for these conditions. Any additional condition or a split with respect to one of data columns yields the corresponding SQL statement. The platform 520 may be configured to connect with the standard database engine to run queries 200 that are expected to be highly selective. Such queries 200 are generated in the end of the "zooming-in" process, when the user wants to derive complete information about specific cases observed in the data. The illustrative approximate database engine is employed for queries 200 that need to scan through larger data portions, as it would take too long to wait for their exact results. These are rather exploratory queries 200 triggered at the stage of "looking around", so their outputs do not need to be perfectly precise. Nevertheless, some reasonable accuracy criteria need to be met. In particular, the approximate engine should not produce too many false absence outcomes, i.e., the zeroed COUNT(*) results that would be highly positive in "the reality".

The illustrative engine may capture information in a form of single and two column summaries 340. It may comprise groups of the newly loaded data rows and constructs summaries 340 for each group separately. Its query execution 207 mechanisms do not assume any access to the original groups. Those groups may be available in a broader framework, but the goal of this particular embodiment is to work with summaries 340. For a query 200 received from the platform 520, each consecutive data operation (such as filtering, grouping, etc.) scheduled in the query execution 207 plan is performed as transformation of summaries 340 representing its input 210 into summaries 340 representing its output 215. Thus, summaries 340 can be described as information granules, while the process of their transformation can be treated as an example of industry realization of the paradigms of granular computing.

The platform 520 allows for the performance of all heavy-duty calculations entirely at the level of summaries 340. This is achieved by harnessing several methods known from other fields, e.g., the mechanism of tree-based belief propagation to populate the WHERE-related changes in summaries 340 and the principles of rough set approximations to compose granulated outcomes of GROUP BY. Moreover, to support the trade-off between performance and accuracy of query results 217, a parameterized framework for quantized data summarization is provided.

Figure 14B:
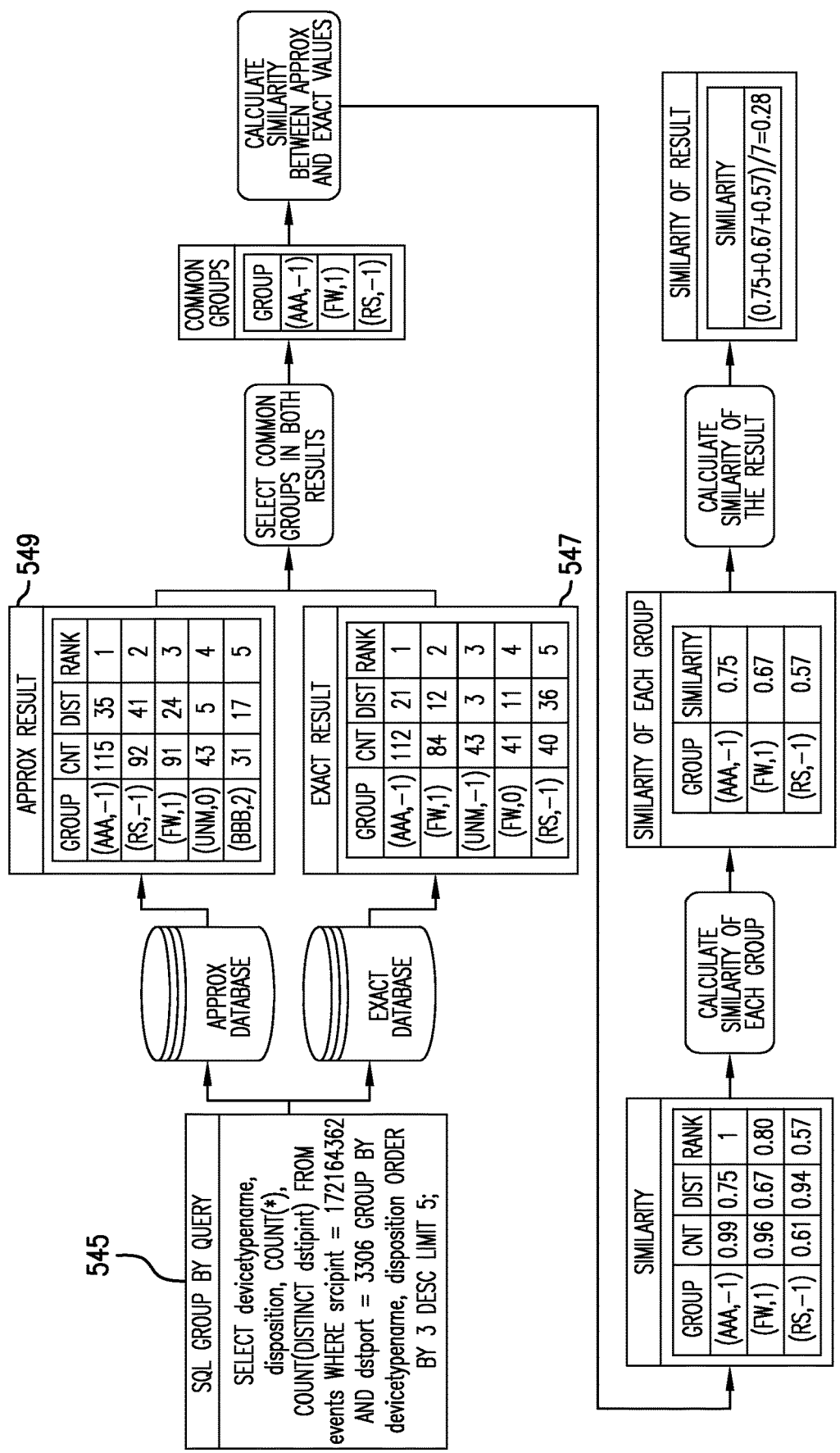

FIG. 14A-14B illustrate an exemplary calculation of the query result similarity. It shows a comparison of the exact query results 547 and approximate query results 549 for the case of GROUP BY statement 545. The results are interpreted as information systems with the objects uniquely defined by combinations of values of columns devicetypename and disposition. The attributes correspond to aggregates COUNT(*) and COUNT(DISTINCT dstipint), with the additional attribute RANK that reflects the aspect of ORDER BY. It refers to so-called "top n" queries that group the data with respect to some dimensions and report only a certain number of groups with the highest aggregation scores. More generally, the result 547 of every SELECT statement takes a tabular form, herein denoted as R=(U, A), where U and A are the sets of its tuples and attributes. U can refer to original rows, groups, etc., while A can refer to data columns (for SELECT a, b, c . . . without GROUP BY) or aggregate functions occurring after SELECT (for an aggregate query without the GROUP BY clause U contains a single element). For the statements including joins, subqueries, expressions, window functions, etc., the meanings of U and A can be introduced in quite a straightforward way as well. Let $\tilde{R}=(\tilde{U}, A)$ denote the approximate result of a given query. For GROUP BY, the elements of U and $\tilde{U}$ belong to the same domain of vectors of values of the grouping columns. To compute the similarity between R and $\tilde{R}$ just by means of occurrences of groups, the corresponding formula may take a form of the ratio $$\frac{|U \cap \tilde{U}|}{|U \cup \tilde{U}|}.$$

However, to assess also the similarity of R's and $\tilde{R}$'s attribute values over the matched groups, for any $u \in U \cap \tilde{U}$, the similarity score $sim(A(u), \widetilde{A(u)})$, where $A(u)$ and $\widetilde{A(u)}$ are the vectors of u's values in R and $\tilde{R}$, respectively, may be investigated. Such score can be calculated as a t-norm of atomic similarities $sim(a(u), \widetilde{a(u)})$, $\alpha \in A$, considered for the corresponding pairs of attribute values in R and $\tilde{R}$. In FIG. 14A, the Zadeh's t-norm is applied. Finally, the overall similarity $Sim(R, \tilde{R})$ is obtained by replacing $|U \cap \tilde{U}|$ by the aggregate score $\Sigma_{u \in U \cap \tilde{U}} sim(A(u), \widetilde{A(u)})$ in the above ratio.

Referring to FIG. 14B, once approximate results 549 and exact results 547 for a SELECT statement are obtained (see FIG. 14A), common groups in both sets of results may be selected from both sets of results 547, 549 and used to calculate the similarity between the approximate and exact values, the similarity of each group and the similarity of the results.

Alternatively, approximate queries may be run by means of histogram transformations. Similarity measures for probability distributions may also be represented using histograms.

FIG. 14A also displays the atomic similarity function employed to compare the exact and approximate query outputs at the level of single values (note that sim=0 if one of results is NULL and the other is not):

$$sim(a(u), \widetilde{a(u)}) = \begin{cases} 1 & \text{for } a(u) = \widetilde{a(u)} \\ 1 - \frac{|a(u) - \widetilde{a(u)}|}{|a(u) + \widetilde{a(u)}|} & \text{otherwise} \end{cases} \quad (17)$$

This measure corresponds to a single-dimensional version of the Canberra distance, which was considered in some approaches to intrusion detection, as well as in other areas, e.g., to express similarities between partial rankings.

A task of choosing the appropriate measure at this level is not easy, as it needs to meet the user expectations in the given application area. Such expectations can be expressed as explicit requirements related to similarity properties or implicit intuitions related to a kind of perceptual closeness of the exact and approximate results 547, 549. With this respect, surveys involving business analysts, network security experts and database practitioners were conducted to establish the simplest form of analytical ad-hoc queries—the SELECT COUNT(*) FROM t WHERE conditions statements.

The first survey concentrated on the preferred mathematical properties. Assuming that all eligible similarity scores f (exact count, approximate count) should satisfy $0 \leq f(x, y) \leq 1$ and $f(x, x) = 1$. Survey participants were asked about the following properties, among others:

1. $f(x, y) = 1 \Leftrightarrow x = y$
2. $f(x, y) = f(y, x)$
3. $\lim_{y \to +\infty} f(x, y) = 0$
4. $x > 0 \Rightarrow f(x, 0) = f(0, x) = 0$ Properties 1 and 2 were evaluated as "neutral". Property 3 was commonly wanted as reflecting the increasing approximation error. Property 4 led to diverse opinions among the database experts. (Some of them could not accept the same evaluation of the cases such as f(0,1) and f(0,100). However, it was considered as valid by the security analysts, given their strong aversion to the false absence/presence results.

A second survey was conducted to ascertain how the users of an approximate query engine might perceive the concept of closeness i.e. whether exact and approximate counts x and y are regarded as more similar to each other or whether they are closer with respect to the difference |x−y| and/or have a higher proportion score min $$\left\{ \frac{x}{y}, \frac{y}{x} \right\}.$$

The study was conducted over three groups of participants who were fed with 25 pairs of the exact/approximate hypothetical COUNT(*) results. Sets of pairs of 25 small, 25 medium and 25 large results were prepared to verify whether human perception depends on the scale of query outcomes. For different sets, the considered pairs were rescaled linearly with respect to their differences while keeping their proportion scores unchanged.

Table 2 below illustrates the gathered feedback. The participants in each group were requested to order the given 25 pairs by means of their dissimilarity. The obtained orderings were then tested against the baseline orderings corresponding to differences and disproportions. The reported results seem to indicate that the groups of people perceiving dissimilarities as having something in common with differences and disproportions are roughly equal to each other. Therefore, similarity scores that refer to both of those aspects of perception are contemplated.

TABLE 2

Outcomes of the "differences versus disproportions" survey according to their own intuitions

| | sizes of query results in a survey | | |
|---|---|---|---|
| | small | medium | large |
| number of participants in three groups | 22 | 24 | 20 |
| orderings correlated with differences | 8 | 8 | 8 |

TABLE 2-continued

Outcomes of the "differences versus disproportions" survey according to their own intuitions

| | sizes of query results in a survey | | |
|---|---|---|---|
| | small | medium | large |
| orderings correlated with disproportions | 9 | 7 | 6 |
| orderings insufficiently correlated | 5 | 9 | 6 |

The above findings confirm that the similarity function (17) is worth considering. First, it has some relevant background. Second, it satisfies properties 1-4. Third, it is related to both differences and proportions, by means of the following equality, for x>0, y>0:

$$1 - \frac{|x-y|}{x+y} = \frac{2}{1 + \frac{1}{\min\left\{\frac{x}{y}, \frac{y}{x}\right\}}}$$

Analogous surveys were prepared for other similarity functions and modifications of the procedure visible in FIG. 14A, e.g., with regard to a choice of t-norm were examined. The approach based on the Zadeh's t-norm and the formula (17) makes sense from both theoretical and empirical perspectives. In particular, property 4 is compatible with the formula for Sim(R, R̂). Namely, for the false presence and false absence groups represented by the sets Û\U and U\Û respectively, the atomic similarity scores are expected to be equal to 0. Thus, there is no need to include them into the aggregate score defined over U∩Û.

On the other hand, investigations showed that there is no single similarity function that reflects all expectations. For example, returning to the exemplary SuperScale Analytics framework outlined above, it is crucial to tune the approximate query framework to limit the occurrences of false presence/absence results. However, these two categories of mistakes are of different importance for different user groups. For example, false absences are harmful for security analysts who attempt to detect the emerging patterns that did not occur in the past, while false presences are misleading for the end-users who narrow down their search by basing on approximate queries and then switch to the exact mode to analyze more details.

There are many aspects that influence the speed and accuracy of calculations in the exemplary engine. To minimize the summary footprint and accelerate the approximate query execution 207, granulation algorithms create quantized histograms that do not provide complete representation of all distinct values occurring in the original data. They rather focus on values that look like most interesting (so-called special values 295) and summarize the remainders of locally observed column domains in a range-based fashion. Similarly, full information about the ratios of co-occurrence of values (and ranges 285) on different columns is not stored. Instead, a limited number of ratios that seem to be most meaningful are registered. For instance, if two frequent values—v on column a and w on column b—co-occur relatively rarely (or do not co-occur at all) in a given collection of rows, then this information may be added to the collection's granulated summary.

This kind of imperfect representation requires the redesign of all data operations involved in the process of SQL execution. It is also necessary to adjust heuristic methods for choosing the most important special values 295 and co-occurrences that should be stored to increase the expected accuracy of approximate data analytics. Tuning the illustrative engine—a balance between the expected accuracy and the budgets specified as the maximum amounts of special values 295 and co-occurrence ratios that can be stored for each collection of the ingested original rows—is necessary. Moreover, the levels of granulation resolution, i.e., the number of rows in each of the summarized data collections are examined.

A common approach in database benchmarking is to use randomly generated data sets and artificial SQL statements reflecting typical analytical query workloads. Such frameworks are usually designed to investigate tradeoffs between the applied computational resources and the obtained query performance. However, they can be easily extended towards a new dimension related to the query result accuracy with the assumption that less accurate calculations should be faster, requiring relatively less resources.

Figure 15:
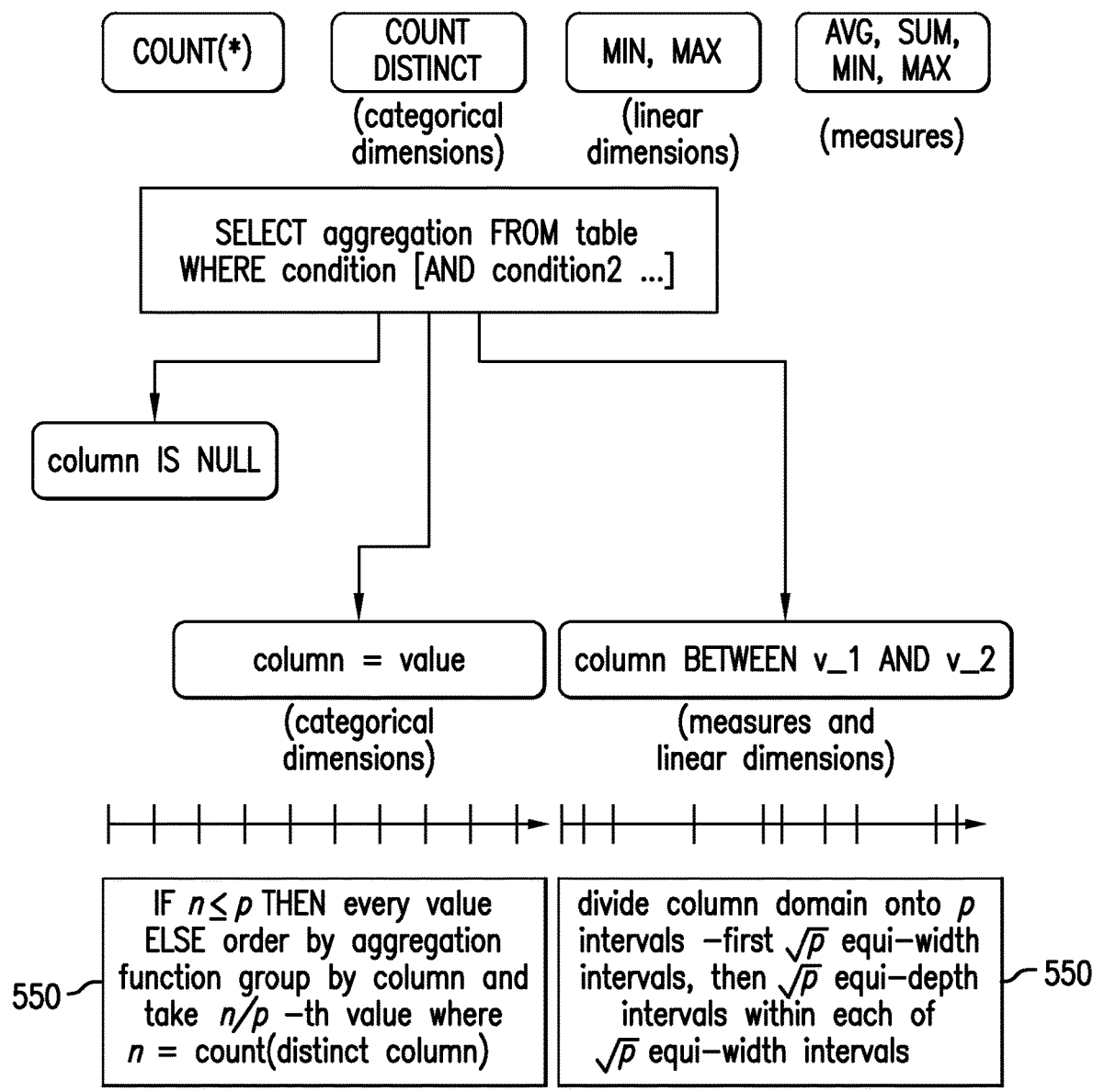
FIG. 15 illustrates an exemplary general mechanism for producing simple analytical statements that can be used to assess the expected accuracy of an approximate query engine for a given real-world data set.

A more dedicated approach is to conduct the performance versus accuracy tests on real-world data sets representative for a given application domain. FIG. 15 illustrates an exemplary general mechanism for producing a family of simple diagnostic/analytical statements 550 that can be used to assess the expected accuracy of an approximate query engine for a given real-world data set in order to assess the accuracy that it can deliver.

Basic knowledge about the input data set with respect to categories of its particular columns is assumed:
1. Measures that are typically aggregated and/or quantized in the analytical queries
2. Categorical dimensions that include foreign keys and their corresponding hierarchies
3. Linear dimensions for which it is more natural to operate with the ranges 285 rather than equalities The most reliable strategy is however to work with both real-world data tables and representative real queries. Therefore, although the illustrative engine is a fully universal solution for SQL-based approximate analytics, it is indeed profitable to focus on its specific use cases in specific application fields, like the exemplary one discussed herein. Table 3 below includes several examples of the SELECT COUNT(*) statements triggered by analysts within the illustrative SuperScale Analytics framework. For testing purposes, 100 such queries were chosen and the accuracy of their approximate outcomes over a relatively small network event data set of the original size of roughly 100 gigabytes were measured.

TABLE 3

Examples of real-world queries used in the experiments

SELECT COUNT(*) FROM events WHERE
timestampday = 20170410 AND srcport = 0 AND dstport =
443 AND devicetypename = 'FW';
SELECT COUNT(*) FROM events WHERE timestampday =
20170410 AND devicevendor = 'MICROSOFT' AND dstipint =
1116652493 AND devicetypename = 'AAA';
SELECT COUNT(*) FROM events WHERE
timestampday = 20170410 AND dstipint = 134744072 AND
srcport = '443' AND devicetypename = 'FW';
SELECT COUNT(*) FROM events WHERE timestampday =

TABLE 3-continued

Examples of real-world queries used in the experiments

```
20170410 AND devicevendor = 'MICROSOFT' AND srcipint =
172164362 AND dstipint = 1116652493;
SELECT COUNT(*) FROM events WHERE
timestampday = 20170410 AND srcipint = 172164362 AND
dstipint = 134744072 AND dstport = '3306';
SELECT COUNT(*) FROM events WHERE timestampday =
20170410 AND devicevendor = 'Security On-Demand'
AND srcipint = 172164362 AND dstipint = 134744072;
SELECT COUNT(*) FROM events WHERE
timestampday = 20170410 AND srcipint = 171834990
AND dstipint = 134744072 AND srcport = 875;
SELECT COUNT(*) FROM events WHERE
timestampday = 20170410 AND srcipint = 171863829;
SELECT COUNT(*) FROM events WHERE timestampday =
20170410 AND srcipint = 171863829 AND dstcountrycd =
'CH';
SELECT COUNT(*) FROM events WHERE
timestampday = 20170410 AND srcipint = 171863829
AND dstcountrycd = 'CH' AND dstport = 80;
```

Figure 16:
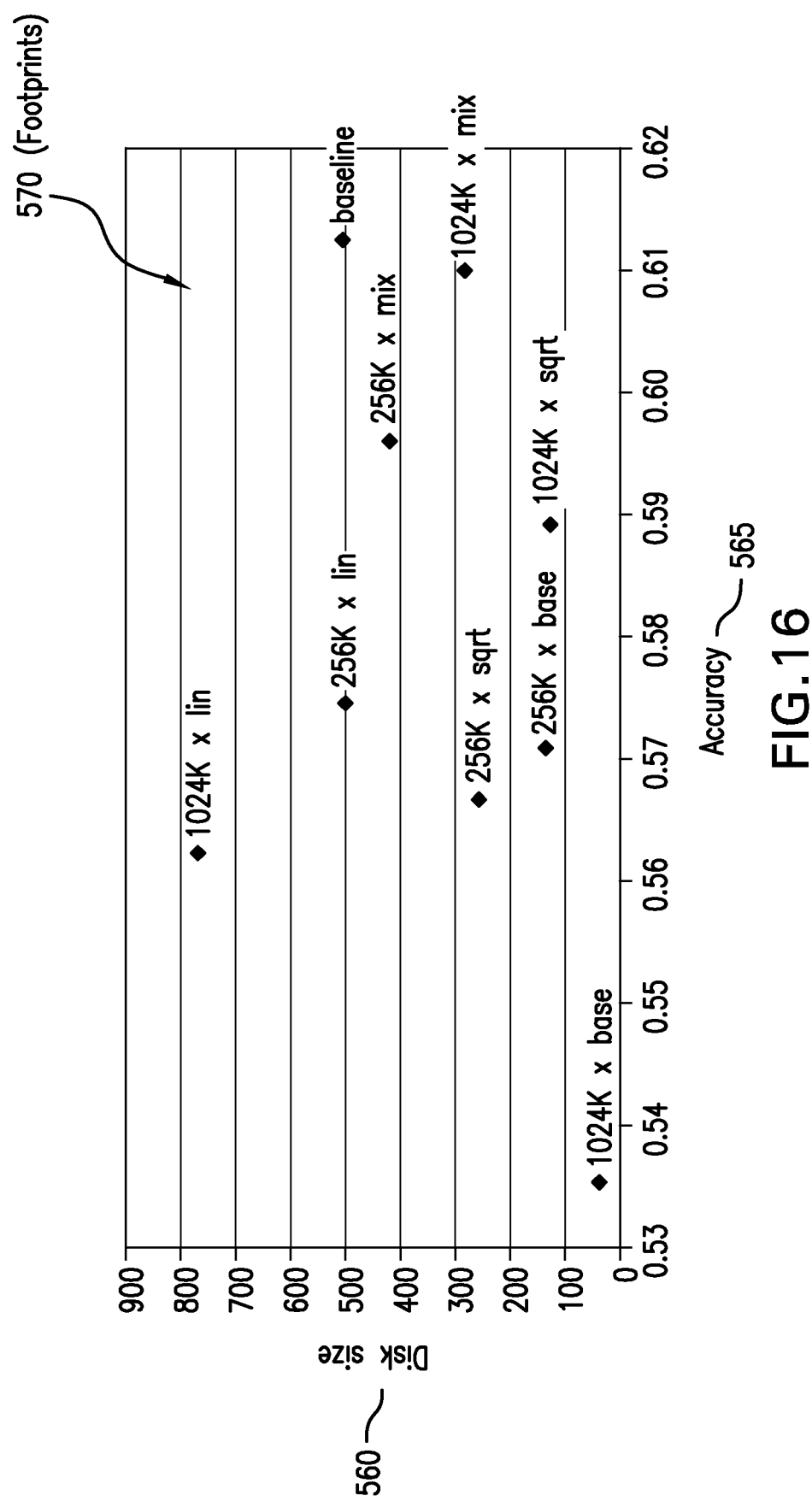
FIG. 16 illustrates the total size of data summaries obtained according to embodiments of the present systems and methods versus the average query accuracy

FIG. 16 summarizes the experimental findings. The "baseline" refers to the results obtained for the following default settings of the granulation/representation parameters:

1. Every consecutive data collection that needs to be summarized has $2^{16}$ rows (abbreviated as "64K")
2. For each collection and each column, its quantized representation can include explicit information about up to 100 special values 295 (refer to other sections for other parameters of the single-column descriptions, such as the already-mentioned range-based summarizations of the frequencies of "non-special" values and the rough-set-style approximations of column domains)
3. For each collection of rows, the maximum number of co-occurrence ratios that can be stored is equal to 150 times the number of columns in the given table.

As shown in FIG. 16, the total disk size 560 of summaries produced with such parameters is roughly 500 megabytes while the average accuracy 565 (See formula 17) of approximate results of the above-mentioned 100 queries is slightly higher than 0.61. For comparison, consider the configuration "256K×base" (meaning that the original data set was partitioned into four times larger collections of rows but each of those collections was summarized using the unchanged limits for special values 295 as well as other components of the single-column representations) and co-occurrence ratios. Such settings yield a lower data summary footprint (as they provide four times less collections with the sizes of summaries that are comparable to the previous ones) but also a poorer accuracy as they attempt to describe larger data portions by using the similar budgets as before.

Table 4 below outlines all parameter configurations, for which the experiments were run as shown in FIG. 16, whereby "256K" and "1024K" denote the number of rows in each single collection while "base", "sqrt", "lin" and "mix" correspond to a growth of the allowed amounts of special values 295 and co-occurrence ratios along with the increase in the size of the ingested collections. As before, "base" indicates no budget changes. The meaning of other abbreviations is as follows:

"sqrt"—the budgets grow with a square-root-proportion comparing to the sizes of collections "lin"—the budgets grow linearly, so there are practically no savings related to operating with larger collections (unless some columns have truly simple domains that do not require to reach the budget limits)

"mix"—the budgets for special values 295 and co-occurrences grow like "sqrt" and "lin", respectively

TABLE 4

Maximum per-column × collection budgets for storing special values 295 and co-occurrence ratios used in the experiments.

|       | base          | sqrt          | mix           | lin           |
|-------|---------------|---------------|---------------|---------------|
| 256K  | special: 100  | special: 200  | special: 200  | special: 400  |
|       | co-oc: 150    | co-oc: 300    | co-oc: 600    | co-oc: 600    |
| 1024K | special: 100  | special: 400  | special: 400  | special: 1600 |
|       | co-oc: 150    | co-oc: 600    | co-oc: 2400   | co-oc: 2400   |

TABLE 5

Detailed accuracy results for experiments in FIG. 16.

| | | Exact Query Results | | | | | |
|---|---|---|---|---|---|---|---|
| | | Abs | Prs | Abs | Prs | Abs | Prs |
| | | 256K × sqrt | | 256K × base | | 1024K × sqrt | |
| ApproximateResults | Abs | 35 | 3 | 37 | 3 | 38 | 2 |
| | Prs | 32 | 30 (0.72) | 30 | 30 (0.67) | 29 | 31 (0.67) |
| | | 256K × mix | | baseline | | 1024K × mix | |
| | Abs | 38 | 3 | 41 | 5 | 39 | 3 |
| | Prs | 29 | 30 (0.72) | 26 | 28 (0.72) | 28 | 30 (0.73) |
| | | 256K × lin | | 1024K × base | | 1024K × lin | |
| | Abs | 35 | 3 | 37 | 7 | 34 | 3 |
| | Prs | 32 | 30 (0.75) | 30 | 26 (0.64) | 33 | 30 (0.74) |

The above cases are just a few exemplary configurations that the illustrative summary based query engine/SuperScale Analytics platform 520 can handle at the production-ready level.

Footprints 570 displayed in FIG. 16 provide intuitions about the expected speed of approximate query execution 207. This is because they correspond directly to the lengths of so-called hot loops that are performed during the designed approximate computations. Indeed, as explained before, the cost of all heavy-duty transformations of the input summaries into the output summaries depends linearly on their level of representation detail (e.g., the number of special values 295) and, obviously, the number of summary instances (i.e., the number of the considered collections of rows).

From this perspective, the exemplary case of "mix" deserves attention, whereby the footprint 570/performance savings are expected practically only for the single-column summaries while the computational effort related to operating with the co-occurrence ratios remains the same as for the default settings. This strategy is justified as follows: Consider columns a and b represented by 200 special values 295 each, for a single collection of 256K rows. Then the number of pairs of special values 295 equals to 200×200—four times higher than 100×100 in the default engine configuration. Hence, a proportional coverage of the most meaningful co-occurrence ratios seems to require a budget that grows linearly with the square-root-increase of the resolution of the single-column representations.

Accuracies 565 in the examples of FIG. 16 are quite low. However, the formula (17) employed is quite restrictive and, in particular, assigns 0 for any false absence or false presence. More detailed statistics are reported in Table 5. For the "baseline" 41 true absences (which means that both approximate and exact results of the corresponding SELECT COUNT(*) statements were equal to 0), five false absences and 26 false presences were observed. Generally, a low number of false absences were observed which, as previously discussed, is the preferred embodiment for the security analysts (especially when comparing to the sampling-based approximate query solutions).

Additionally, two exemplary settings, "1024K x sqrt" and "1024K×mix", yield 16 times less summaries than the "baseline", although each of summaries has a relatively richer structure. For "1024K x sqrt" the allowed amounts of special values 295 and co-occurrences per summary 340 are four times larger. Still, the overall number of stored information pieces is four times lower than the "baseline", which means four times shorter hot loops and lower footprint 570. On the other hand, the accuracy 565 drops down. It can be seen particularly in the true presence cases, whose average accuracies 565 are put into brackets in Table 5.

For "1024K×mix" the average accuracy 565 is almost the same as the "baseline", with a significantly lower footprint (although not as low as "sqrt"). This suggests that information about co-occurrences of values on different columns is slightly more important than information about the domains of particular single columns. As previously mentioned, embodiments of the engine execute the multidimensional filtering operations by using an approximate version of the tree-based probabilistic propagation. Hence, richer information about the joint probability distributions (approximated by a limited number of the most meaningful co-occurrence ratios) yield a higher accuracy 565 of the whole process.

The above illustrative examples show that the implemented parameters can be used to seek for a balance between the accuracy 565 and the expected speed of resolving analytical queries, approximated using the summary footprint 570. The analysis of disk sizes is not the only available tool with this respect. For instance, a metadata framework that provides the complete information about— among the others—special values 295 and co-occurrence ratios in a convenient relational format may be utilized. Thus, the specifics of hot loops responsible for the query performance can be investigated using SQL.

Preferably, the final tuning of such parameters should be adjusted for specific application fields. The needs of different user groups may vary. This may trigger further changes in the accuracy formulas or even in the ranking functions utilized at the stage of extracting the most meaningful pieces of information from the original data. Indeed, for a given application framework, the ultimate challenge is to find a "correlation" between the heuristic measures employed to construct data summaries 340 and the user preferences when it comes to query accuracies.

For example, consider the false presences and false absences in Table 5, Although the formula (17) treats all such cases equally, in some practical scenarios it may be worth distinguishing between "large" and "small" mistakes of this kind (see also the discussion about f (0,1) versus f (0,100) above). Such an additional analysis does not mean that the considered similarity function is wrong. Rather, it may be useful to look at the engine's accuracy from multiple perspectives.

Figure 17:
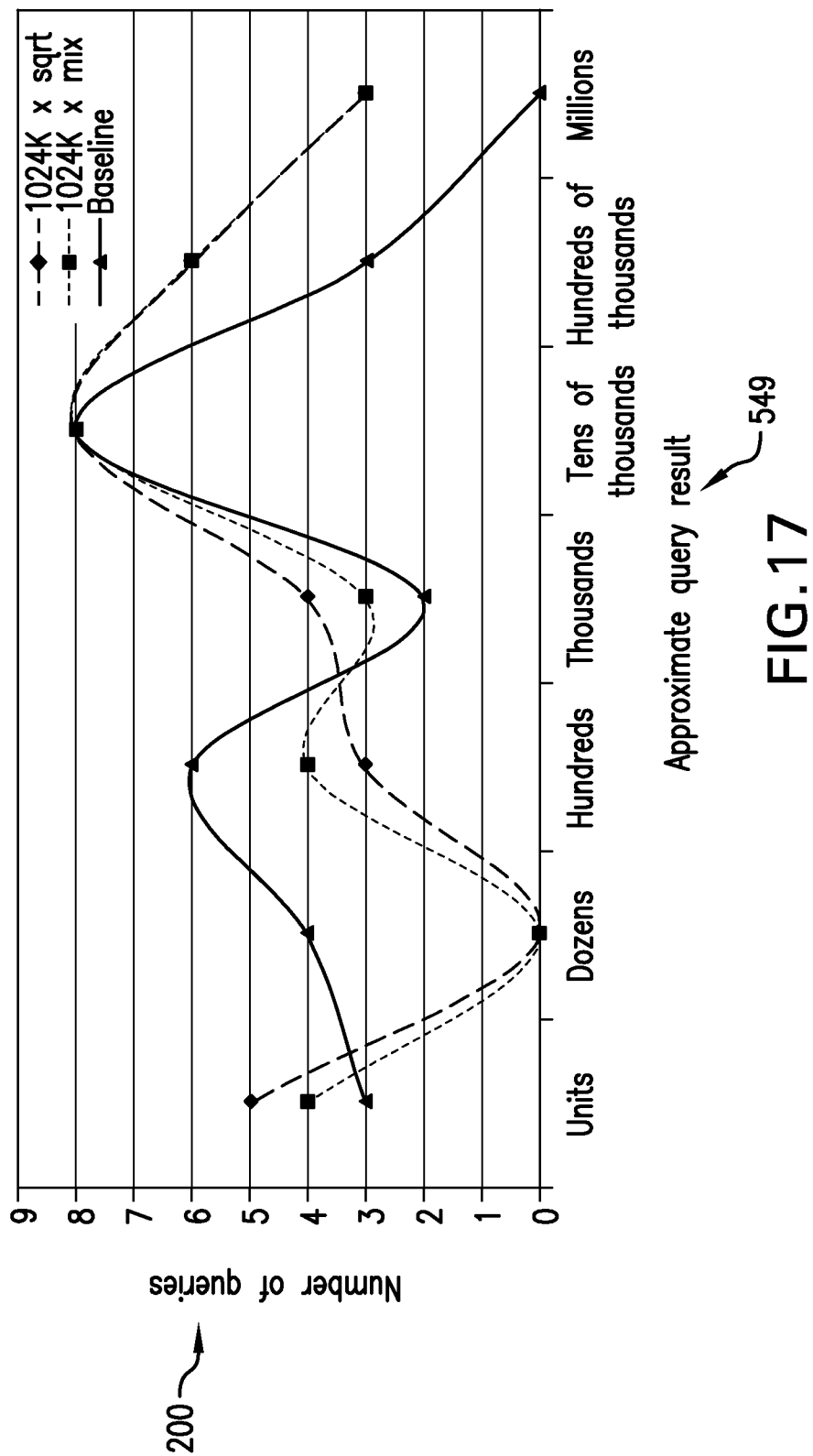
FIG. 17 illustrates the approximate counts for the false presence cases.
Figure 18:
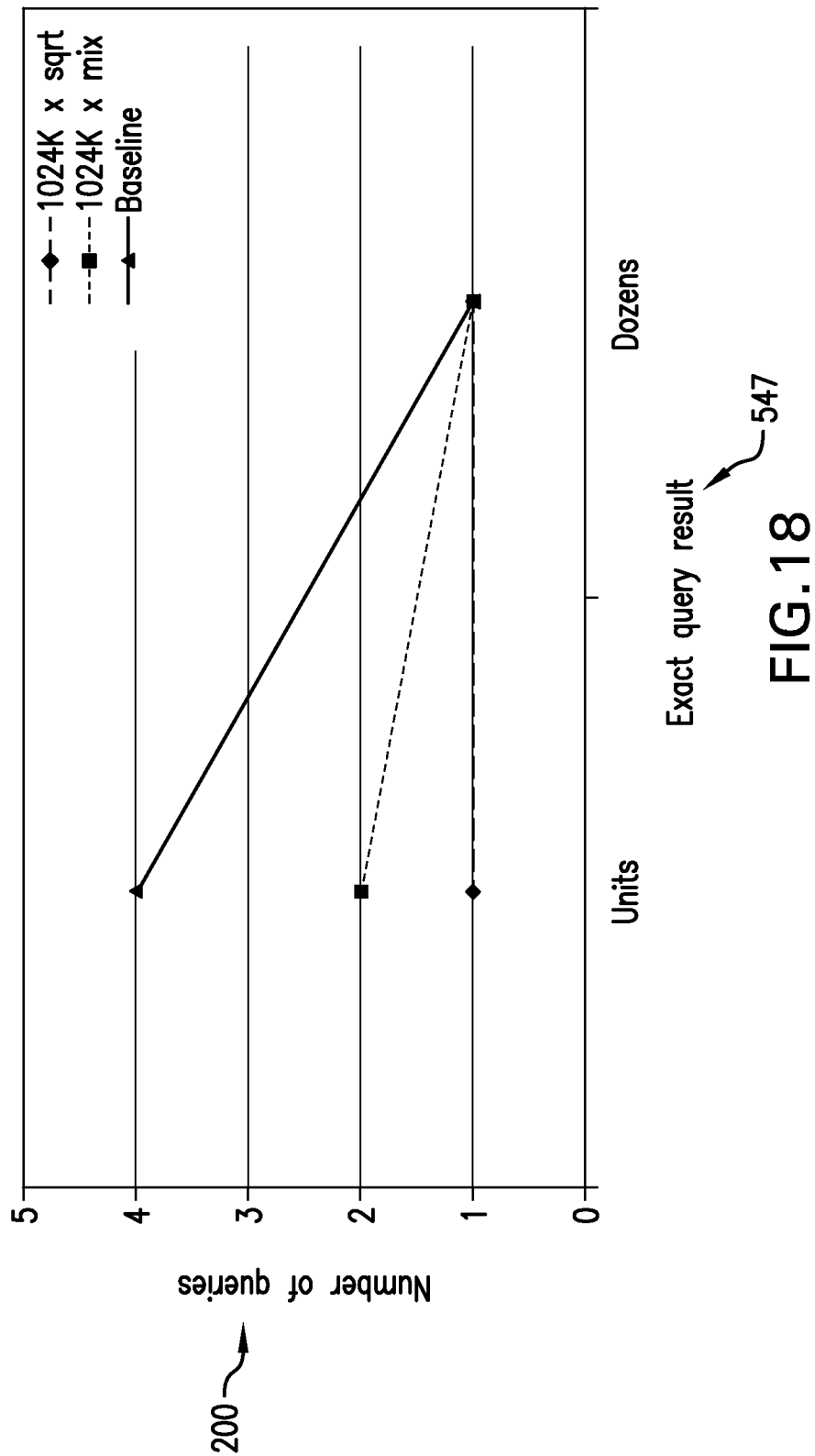
FIG. 18 illustrates the exact counts for the false absence cases.

FIGS. 17 and 18 display the ranges 285 of, respectively, approximate COUNT(*) results that should be equal to 0 and exact COUNT(*) results that are mistakenly computed as equal to 0, for the settings "1024K x sqrt" and "1024K× mix" versus the "baseline". There are generally no issues with false absences—the largest exact query result 547 in this category does not exceed the level of 100. However, the other case is more problematic. In particular, for "1024K× mix" there are three queries 200 with approximate results/ outcomes 549 counted wrongly in millions. Thus, although this configuration seemed to be quite reasonable basing FIG. 16, it requires further analysis because of the occurrence of "very large" false presences.

There are many approaches devoted to the confidence of approximate query results 549. So-called confidence intervals are reported by the data-sampling-based engines during the approximate query execution 207, without referring to the knowledge about the exact query results 547 treated as a baseline. Nevertheless, some mechanisms producing analogous confidence intervals with respect to the expected accuracy of approximate query outcomes, i.e., intervals estimating the degrees of similarity between the observed approximate results 549 and the "hypothetical" (not observed) exact results are provided.

Confidence intervals might also support decisions about switching between the approximate and exact modes within the platforms such as the exemplary SuperScale Analytics. The illustrative framework may comprise two engines triggered for different types of queries. The "switch" between the engines may be based on the expected cardinality of data rows satisfying query conditions. Alternatively, one may rely on the assessment of a trust in an approximate query result. For instance, for a query that includes the a=v condition, the trust should be rather low if v does not occur as a special value in the summaries representing column a and, on the other hand, those summaries do not provide enough insight to deny the occurrence of v on a in the corresponding collections of original rows.

Further, the approach to the data summary processing according to the present systems and methods reach beyond SQL. Granulated data summaries 340 may be used for machine learning purposes. As discussed earlier, an adoption of the machine learning methods becomes crucial also in cyber-security. In an embodiment, SuperScale Analytics may assume that the machine learning and approximate query routines are kept apart. In another embodiment, machine learning algorithms may be executed over the detailed data to train better anomaly/threat detection models, while the approximate query layer is useful for human experts to assess situations that those models could not handle. Given the observed growth of the data, there is an emerging requirement for new machine learning tools that can work directly on summaries. Visual analytics may be used in connection with cyber-security application or treated as a broader topic within the realm of log analytics or data analytics in general. Data visualization and interaction libraries connecting directly to a layer of granulated summary structures may be provided.

A Metadata Diagnostic Framework

An exemplary database engine may be utilized to create a relational metadata repository enabling the engine developers and users to investigate the collected data summaries 340 independently from the engine itself. The design of the considered repository addresses the challenges of conversion and accessibility of the internal engine contents that can represent hundreds of terabytes of the original data. Some illustrative scenarios of a usage of the obtained metadata repository for both diagnostic and analytical purposes are considered paying particular attention to the relationships of the discussed scenarios with the principles of rough sets—one of the theories that hugely influenced development of the present systems and methods. Illustrative empirical results obtained for relatively small fragments ($100 \times 2^{16}$ rows each) of data sets from two sample organizations are considered below.

An embodiment of the present systems and methods provides an analytical diagnostic framework that lets the engine users and developers understand its behavior and set up expectations with respect to its efficiency in practical usage scenarios. The fundamental assumption is that these goals can be achieved by providing the analysts with a sufficiently convenient way to work with the contents of data summary structures captured by the engine. Thus, the task of creation of a relational metadata repository makes it possible to easily access and investigate the collected data summaries 340 independently from the engine itself.

In an embodiment, the layout of the designed repository reflects two important aspects: 1) modularity of the captured knowledge structures with respect to their particular focuses (e.g.: modeling domains of single columns, modeling frequencies of column values and ranges 285, modeling data-driven dependencies and co-occurrences of values of different columns, etc.) and 2) modularity of the captured knowledge structures with respect to granularity of ingestion of the original data (i.e.: making sure that the contents of knowledge structures collected independently for different chunks of data can be flexibly queried together).

The illustrative relational metadata schema satisfies the above requirements and provides a great means for elucidation to potential customers within complex applications. It can be helpful for the users to better understand the quality and performance characteristics of query execution 207 processes. Moreover, one may wish to explore the metadata tables directly to do basic analytics, e.g., approximately visualize demographics of particular data columns. Finally, one may also work with data summaries 340 in their relational form while prototyping new algorithms, before implementing them within the engine.

There are several ways to develop approximate SQL solutions. In most approaches, the results are estimated by executing queries 200 on data samples. One of advantages of such approaches is their ability to adapt statistical apparatus to deliver confidence intervals for approximate outcomes of simple queries.

However, for truly big data sets, good-quality samples need to be large too which limits query acceleration possibilities. Moreover, the complexity of producing reliable confidence intervals grows quite quickly for more complicated select statements. The second category of approximate query methods is based on summaries (histograms, sketches, etc.). The exemplary approach considered herein drops into the latter category, as it forms granulated data summaries 340 expressed by means of enhanced histograms. There is a long tradition of using histograms within standard database optimizers. A lot of effort has been also spent on the task of updating histogram structures while loading new data. This is one of the differentiating factors of the present systems and methods. In an embodiment, it builds separate summaries for each subsequently collected chunks of table rows—so called packrows 310. Therefore, summaries 340 of the newly buffered packrows 310 do not interfere with the previously captured knowledge structures.

As previously mentioned, the foundations of the illustrative engine considered herein partially relate to some earlier relational database solutions, whereby loaded data sets are clustered into $2^{16}$—row packrows 310, additionally decomposing each packrow 310 onto data packs 275 gathering values of particular columns. When compared to that idea, the solution considered herein operates with the data at the same level of packrow 310/data pack granulation but it captures their slightly richer summaries and—what is the fundamental difference—it does not need to access the actual data at all during the query execution 207. For each original data pack 275, its histogram 280 contains information about dynamically derived range-based bars and special values 295 that differ from neighboring values of the corresponding column by means of their frequencies 290 in the corresponding packrow 310. Stored structures may include information about the most significant gaps 300, i.e., the areas where there are no values occurring. Finally, the engine summarizes packrow-specific co-occurrences of values belonging to bars representing pairs of columns. The engine decides what to store based on the algorithms that rank the significance of detected co-occurrences.

Figure 19:
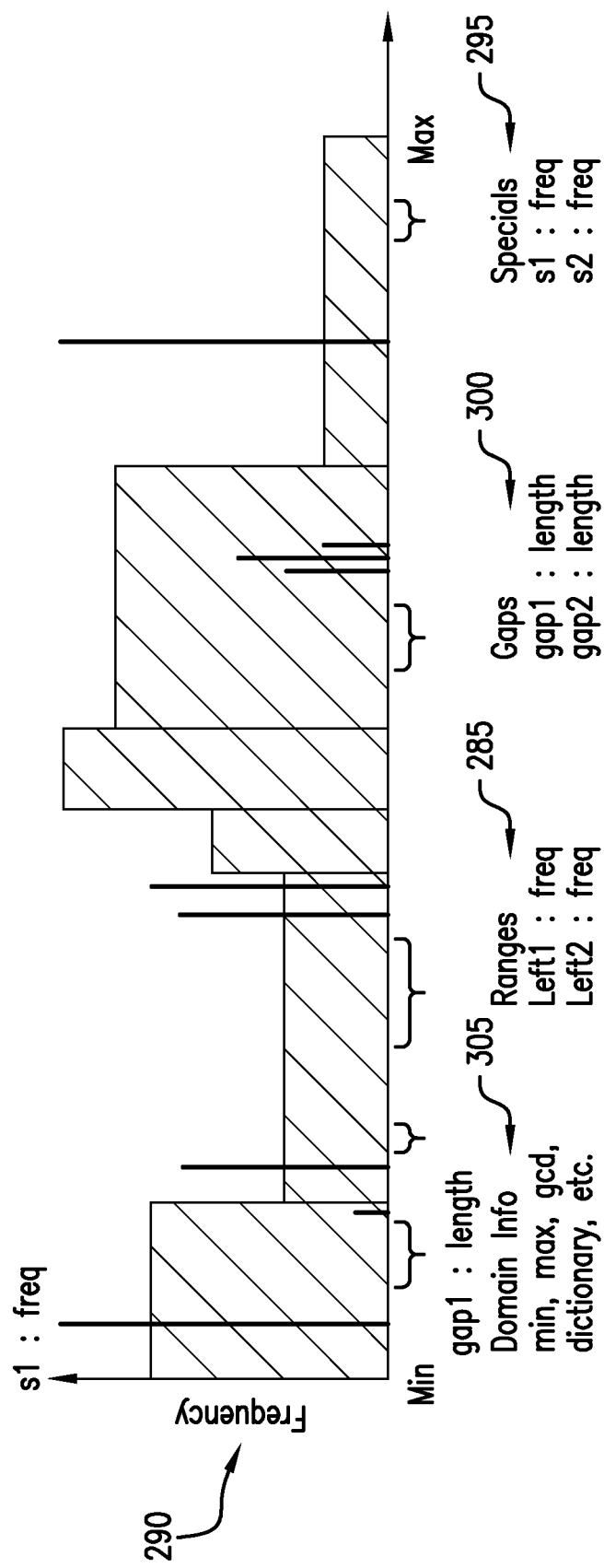
FIG. 19 illustrates types of knowledge captured by the engine for a single original data pack.

FIG. 19 illustrates the components of one-dimensional representation of the ingested data chunks. Besides histogram ranges 285, special values 295 and gaps 300, there is also stored basic domain 305 including the greatest common divisor (gcd) and the dictionary with distinct values occurring for a given column within a given packrow (stored only if the number of distinct values is low enough). The way of deriving ranges 285 has a lot in common with the task of data discretization/quantization. As the captured granular representations should be as compact as possible to achieve fast query execution 207, the number of ranges 285 needs to be significantly lower than the number of original distinct values. Algorithm 1, 250 (See FIGS. 2A-2B) combines two standard discretization approaches that, up to now, yield the best quality of approximate query results 549 executed in the exemplary engine.

In some embodiments, the engine may store information only about a limited number of special values 295, gaps 300 and co-occurrence ratios (also referred to as tau-ratios) which reflect local column interdependencies. Every ratio $\tau_t(x, y)$ is defined as the data-derived probability $p_t(x, y)$ of the occurrence of a pair of values or ranges 285 x and y over two columns in a packrow t, divided by the product of marginal probabilities $p_t(x)$ and $p_t(y)$. The ranking functions identify the pairs of values/ranges 285 with tau-ratios that maximally differ from the unity. The tau-ratios are used in approximate data operations such as, e.g., the where-related filtering which is implemented by following the methods of belief propagation in graphical models. However, those methods need to refer also to tau-ratios that were not selected to be stored. Such ratios are represented as the averaged defaults calculated at the three hierarchy levels (one level for not stored pairs of ranges 285 and two specific levels for not stored pairs of special values 295).

As previously mentioned, the exemplary approximate query mechanisms do not access the original packrows 310. For a given query 200, each consecutive operation scheduled within the execution plan (such as filtering, joining, grouping, etc.) is performed as a transformation of histograms 280/special values 295/gaps 300/*tau*-ratios representing its input into the analogous structures that are estimated to represent its output 215. Once this kind of representation of the final query outcome is reached, the engine translates it into the standard SQL statement result format. Prior to that stage, information being transformed throughout query execution 207 stages is highly condensed and therefore it requires only a fraction of resources of traditional database solutions to produce the results.

In an embodiment, the accuracy of captured knowledge structures and the accuracy of SQL query results that can be produced using those structures may be investigated. Yet another source of inspiration refers to the area of granular computing. If one interprets data ingestion as information granulation, then the final stage of translating the query result summaries into the final approximate results can be interpreted as a kind of information degranulation. There are a number of useful approaches that may be adapted within the exemplary engine for both granulation and degranulation purposes.

Users may be provided with a possibility to work directly with granulated data summaries 340 captured by the exemplary approximate query engine. An illustrative tool—called metaviewer—was developed in order to visualize descriptions of particular packrows 310 basing on their XML versions.

The exemplary engine stores granulated data summaries 340 in files accessible by approximate query execution 207 methods via internal interfaces. In order to follow the modularity design principles, different aspects of the captured knowledge are collected within their dedicated structures and stored separately. Histogram ranges 285 and special values 295 that approximate the actual data distributions are stored in separation from gaps 300 that model the domain itself. Co-occurrence ratios are stored in yet another unit(s), as they are potentially used in different parts of query execution 207 processes. This modularity makes it possible to use, replace or disable each of summary types without affecting the other ones.

The I/O operations are always an important issue in the high-performance systems and may influence the execution speed significantly. Thus, the discussed granulated data summaries 340 are stored in concise binary formats. Unit and functional Q&A tests were prepared to check the correctness of each data summary type. However, one may not completely avoid situations when the access to the stored structures is required to debug or trace their influence to the other parts of the approximate query execution 207 path. Therefore, it is necessary to prepare a kind of diagnostic tool facilitating the access to the stored structures independently from the engine operations. In an embodiment, the tool may be aimed at translating a single data summary structure from its binary format to a more readable CSV-like format. Examples of such translation are presented in Table 6 below.

TABLE 6

A fragment of raw information captured for a single original chunk of rows (packrow). Each table refers to its different aspect stored as a separate unit, i.e.: a) bars and special values 295, b) gaps, c) tau-ratios a) ranges 285 and special values 295 representation pack min: 1 - minimal value in the pack pack_max: 15861 - maximal value in the pack
pack_gcd: 1 - greatest common divisor for values in the pack

|   | left border | right border | count | width | frequency | list of special values 295 × their frequencies within each range |
|---|---|---|---|---|---|---|
| 0 | l: 1 | r: 204 | cnt: 2989 | w: 204 | avg_cnt: 14.652 | sv: 151 × 2, 142 × 4, 299 × 7, ( . . . ) |
| 1 | l: 205 | r: 432 | cnt: 3010 | w: 228 | avg_cnt: 13.2018 | sv: 73 × 266, 113 × 306, 134 × 367, ( . . . ) |
| 2 | l: 433 | r: 963 | cnt: 12666 | w: 531 | avg_cnt: 23.8531 | sv: 105 × 462, 83 × 568, 157 × 613, ( . . . ) |
| 3 | l: 964 | r: 967 | cnt: 1 | w: 4 | avg_cnt: 0.25 | sv: none |
| 4 | l: 968 | r: 981 | cnt: 3 | w: 14 | avg_cnt: 0.214286 | sv: none |
| 5 | l: 982 | r: 984 | cnt: 2 | w: 3 | avg_cnt: 0.666667 | sv: none |
| 6 | l: 985 | r: 1082 | cnt: 2100 | w: 98 | avg_cnt: 21.4286 | sv: 144 × 1055, 765 × 1056, ( . . . ) |
| ( . . . ) | ( . . . ) | ( . . . ) | ( . . . ) | ( . . . ) | ( . . . ) | ( . . . ) | b) gaps representation c) tau-ratio representation

|   | left border | right border | size | | | |
|---|---|---|---|---|---|---|
| | | | | Default tau: 0.69003 | | |
| 0 | l: 72 | r: 81 | size: 10 | Default tau minus: 0.692418 | | |
| 1 | l: 119 | r: 141 | size: 23 | first | second | tau values (with |
| 2 | l: 189 | r: 199 | size: 11 | entity | entity | additional defaults |
| 3 | l: 209 | r: 218 | size: 10 | code | code | in the case of pairs of bars) |

TABLE 6-continued

A fragment of raw information captured for a single original chunk of rows (packrow). Each table refers to its different aspect stored as a separate unit, i.e.: a) bars and special values 295, b) gaps, c) tau-ratios

| | | | | | | |
|---|---|---|---|---|---|---|
| 4 | l: 223 | r: 228 | size: 6 | 6 | 3 | 1.90752, 0.613704 |
| 5 | l: 235 | r: 260 | size: 26 | 13 | 7 | 12.096, 8.69155 |
| 6 | l: 381 | r: 387 | size: 7 | 19 | 3 | 0.0550151, 0.0550151 |
| 7 | l: 421 | r: 427 | size: 7 | 2 | 3 | 2.76967, 1.0241 |
| 8 | l: 434 | r: 435 | size: 2 | 8 | 22 | 6.9184, 6.9184 |
| 9 | l: 438 | r: 439 | size: 2 | 19 | 10 | 7.56932, 7.56932 |
| 10 | l: 446 | r: 448 | size: 3 | 19 | 16 | 7.07605, 7.07605 |
| 11 | l: 450 | r: 451 | size: 2 | ( . . . ) | ( . . . ) | ( . . . ) |
| 12 | l: 457 | r: 461 | size: 5 | 103 | 89 | 19.6471 |
| 13 | l: 463 | r: 465 | size: 3 | 96 | 87 | 0.254706 |
| 14 | l: 477 | r: 478 | size: 2 | 65 | 87 | 3.25763 |
| 15 | l: 487 | r: 490 | size: 4 | 90 | 101 | 9.69591 |
| 16 | l: 502 | r: 503 | size: 2 | 78 | 87 | 0.00171537 |
| 17 | l: 508 | r: 509 | size: 2 | 81 | 87 | 2.28507 |
| 18 | l: 520 | r: 521 | size: 2 | 61 | 146 | 48.2593 |
| ( . . . ) | ( . . . ) | ( . . . ) | ( . . . ) | ( . . . ) | ( . . . ) | ( . . . ) |

Figure 20:
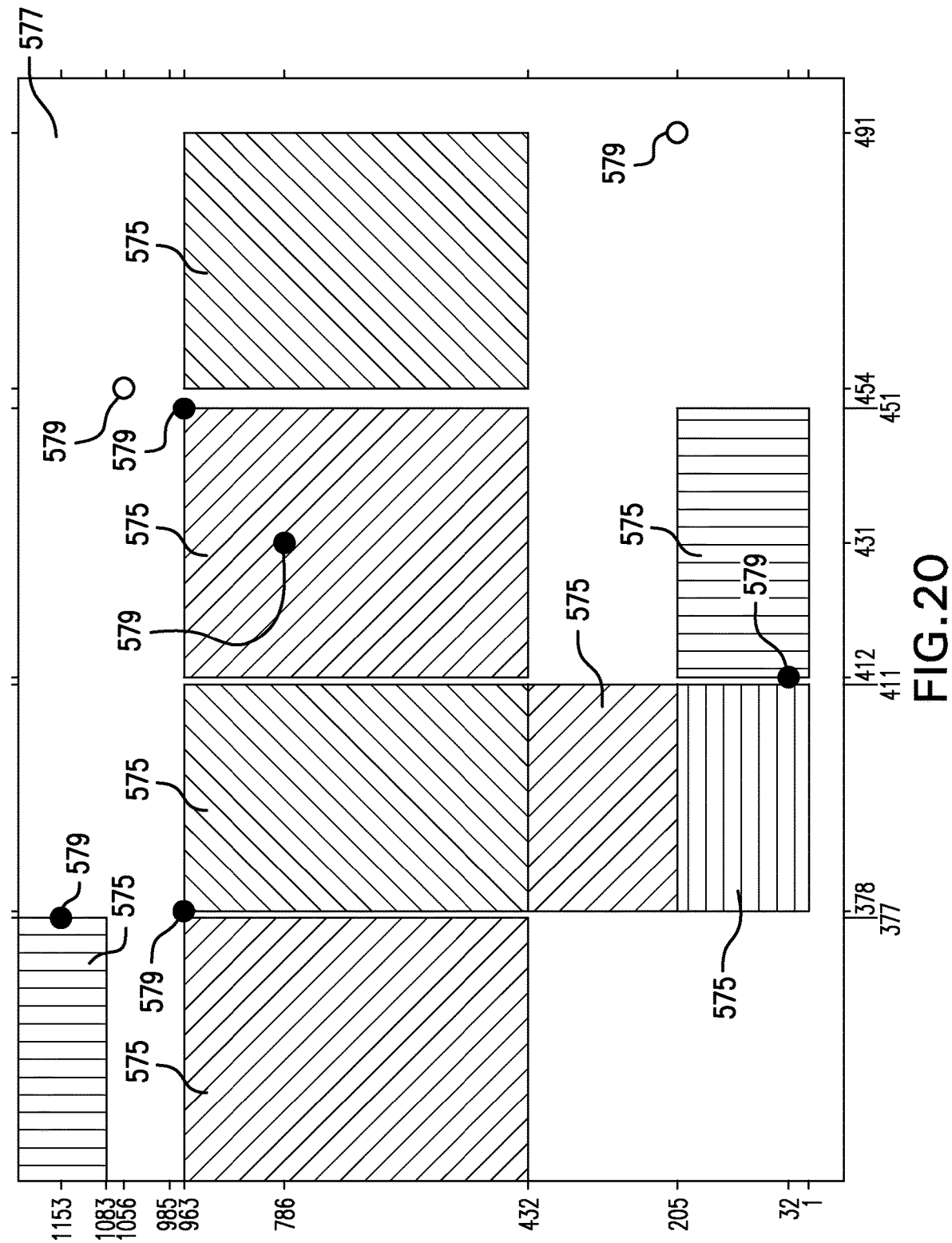
FIG. 20 is an exemplary output from metaviewer for two columns over a single packrow. Each of the axis corresponds to a single column.

Conversion of binary contents to CSV significantly simplifies the tasks of accessing summaries stored on disk for debugging purposes. However, to examine the issues reported during the new engine production tests, a more general view is required, e.g., to combine the actual data distributions (histogram ranges 285 and special values 295) with information about the column domains (gaps 300). To meet such needs, a higher-level diagnostic tool was prepared. First, the set of available output formats was extended with XML to allow portability and flexibility in using data summary structures by external visualization tools. Examples of translation of the binary format to XML, are shown in Table 7 below. Second, the XML summary representations were used as an input to a new metaviewer tool in order to support visualization of FIG. 20. The areas marked with rectangles 575 of different brightness represent strengths of stored co-occurrences of values dropping into pairs of histogram ranges 285. (In particular, white rectangles denote tau-ratios equal to 0 which means that the corresponding combinations of values did not occur together in the considered packrow.) The background area 577 corresponds to pairs for which tau-ratios are not captured. The stored co-occurrences of pairs of special values 295 are marked with circles 579. This kind of visualization can help users to understand the collected knowledge and, to some extent, simulate the specifics of query execution 207.

In an illustrative example, the visualization layer may be implemented in Python, with a use of package matplotlib allowing to explore and save the plots using a mouse or keyboard.

TABLE 7

The same information as in Table 6, now transformed into XML

| a) XML for ranges and special values | b) XML for gaps | c) XML for tau-ratios |
|---|---|---|
| <packkn> | <packkn> | <packkn> |
| <pack_meta> | <gaps> | <default_tau> |
| <min>1</min> | <gap> | 0.69003 |
| <max>15861</max> | <left>72</left> | </default_tau> |
| <gcd>1</gcd> | <right>81</right> | <default_tau_minus> |
| </pack_meta> | <size>10</size> | 0.692418 |
| <bars> | </gap> | </default_tau_minus> |
| <bar> | <gap> | <bar_taus> |
| <left>1</left> | <left>119</left> | <bar_tau> |
| <right>204</right> | <right>141</right> | <code1>6</code1> |
| <width>204</width> | <size>23</size> | <code2>3</code2> |
| <count>2989</count> | </gap> | <tau_value> |
| <avg_count> | <gap> | 1.90752 |
| 14.652 | <left>189</left> | </tau_value> |
| </avg_count> | <right>199</right> | <tau_wave_value> |
| </bar> | <size>11</size> | 0.613704 |
| <bar> | </gap> | </tau_wave_value> |
| <left>205</left> | <gap> | </bar_tau> |
| <right>432</right> | <left>209</left> | (...) |
| <width>228</width> | <right>218</right> | </bar_taus> |
| <count>3010</count> | <size>10</size> | <sv_taus> |
| <avg_count> | </gap> | <sv_tau> |
| 13.2018 | <gap> | <code1>103</code1> |
| </avg_count> | <left>223</left> | <code2>89</code2> |
| </bar> | <right>228</right> | <tau_value> |
| ( . . . ) | <size>6</size> | 19.6471 |
| </bars> | </gap> | </tau_value> |
| <special_values> | <gap> | <from_kn_minus> |
| <special_value> | <left>235</left> | 0 |
| <value>2</value> | <right>260</right> | </from_kn_minus> |
| <count>151</count> | <size>26</size> | </sv_tau> |
| | </gap> | (...) |

TABLE 7-continued

The same information as in Table 6, now transformed into XML

| </special_value> | ( . . . ) | </sv_taus> |
| ( . . . ) | </gaps> | </packkn> |
| </special_values> | </packkn> | |
| </packkn> | | |

The illustrative metaviewer tool described above was intended to visualize the combined data from low level summary chunks for one-dimensional and two-dimensional dependencies inferred during the load process. However, its focus was limited only to single packrows 310. In order to enable the developers and analysts a more flexible access to the gathered knowledge structures, a relational metadata repository that stores particular aspects of granulated summaries in separate—but well-integrated—tables may be provided. FIG. 5 illustrates a complete layout of an illustrative proposed metadata model/schema 330. The descriptions of the most important tables in the proposed metadata schema 330 can be found in Table 8. Table 9 shows examples of the metadata table contents.

The illustrative metaviewer tool simplifies the access to the exemplary engine's data summaries 340 that correspond to a single packrow 310. A single storage unit contains a summary 340 that can be further successfully represented in a relational form. Metaviewer provides a choice between CSV and XML formats. XML is more flexible in converting the contents of relational metadata tables because of its structure and description of the contained information.

As previously mentioned, in an embodiment, metaviewer may be created using Python. Python may also be used to populate the proposed metadata tables. Many Python implementations contain a read-eval-print loop (REPL) which facilitate its use as a command interpreter making it easier to prepare final solutions for a given task. In an example, for the purpose of XML parsing lxml—a feature-rich binding for C libraries libxml2 and libxslt—may be used. ElementTree API may be utilized to access summaries in their form prepared by metaviewer and transform them to a kind of preliminary relational form. Pandas, which supports expressive data structures designed to work with tabular/relational data, may also be employed. Separate metaviewer-specific summary units corresponding to different columns and packrows may be parsed from XML and loaded to table-like structures. The features of Pandas, including SQL-like filtering operations, facilitate the overall process of combining and joining information from single storage units to produce the final form of CSV files containing an integrated metadata representation of the whole original data, ready to be loaded into the proposed metadata tables.

Thus, the granular summary-related metadata of a relational database in a relational form itself is provided. This approach is particularly well suited in the area of data warehousing, where metadata information is maintained at every step of system management, including conceptual models, ETL parameters, OLAP cube specifications, etc. In practice, every new solution aimed at enhancing standard database methodology implies a need of collecting new aspects of metadata.

Embodiments of the present systems and methods relate to usage of a developed metadata repository. From a logical viewpoint, the contents of the original binary files, as well as their CSV, XML and relational metadata formats are equivalent to each other. The binary files are the best input to automatized approximate query processes. On the other hand, the metadata tables provide the users with the most flexible means for accessing and analyzing granulated representations of the original data independently from the illustrative engine. One may use, e.g., standard PostgreSQL environment to work with histogram frequencies 290 and ranges 285, special values 295, gaps 300, as well as bar-to-bar and value-to-value co-occurrences, per each database, table, column and packrow 310. Using simple SQL, one can check which pairs of columns are most correlated by means of their tau-ratios (by querying tables bar_bar and special_special), what is the degree of repeatability of special values 295 in different data packs 275 of the same column (by querying table special), whether values of particular data columns evolve from packrow 310 to packrow 310 (by querying tables pack and gap), etc.

Outcomes of simple operations in a summarized form can be used both by the approximate query engine users and developers—as an independent diagnostic/verification methodology—or by data analysts who want to explore the data fully independently from the engine.

Table 8 below provides a more detailed (in comparison to FIG. 5) description of the contents of the proposed metadata tables and their columns. Columns in the category all tables are included into all considered metadata tables in order to easily specify particular packrows 310.

TABLE 8

| All tables | Columns identifying specific packrows in all considered metadata tables |
|---|---|
| database_name | Database name |
| table_name | Table name |
| packrow_code | Packrow identifier |
| table packrow | Basic information about specific packrows |
| packrow_count | The number of original rows collected within the packrow ($2^{16}$ by default) |
| table pack | Information about values in data packs |
| column_name | Column name |
| Ecmin_value | Minimum value occurring in the data pack |
| max_value | Maximum value occurring in the data pack |
| gcd | Greatest common divisor for all values in the data pack |
| hist_type | Histogram type |
| table bar | Information about particular bars |

TABLE 8-continued

| All tables | Columns identifying specific packrows in all considered metadata tables |
|---|---|
| column_name | Column name |
| code | Bar identifier (unique in the data pack) |
| left | Minimum value in the bar |
| right | Maximum value in the bar |
| freq | Number of rows with values contained within the bar's range |
| special_values_freq | Number of rows with special values 295 in the bar |
| special_values_no | Number of special values 295 in the bar |
| cumulative_gaps_len | Cumulative length of gaps in the bar |
| modeled_values_no | Number of unique values which can be generated |
| table special | Information about special values 295 |
| column_name | Column name |
| code | Special value identifier (unique in the data pack) |
| value | Value |
| freq | Number of rows with the special value |
| bar_code | Identifier of the bar containing the special value |
| table gap | Information about gaps |
| column_name | Column name |
| code | Gap identifier (unique in the data pack) |
| left | Left border of the gap |
| right | Right border of the gap |
| bar_code | Identifier of the bar which contains the gap |
| table pack_pack | Co-occurrence ratios not present in tables bar_bar and special_special |
| column_name_1 | The first column in the pair |
| column_name_2 | The second column in the pair |
| default_bar_bar_tau | Default ratio for pairs of bars not present in table bar_bar |
| default_not_covered_special_special_tau | Default ratio for pairs of special values 295 not present in table special_special and whose "parents" (bars they belong to) are not present in table bar_bar |
| table bar_bar | Information about co-occurrence ratios at the level of pairs of bars |
| column_name_1 | The first column in the pair |
| code_1 | First column's bar identifier |
| column_name_2 | The second column in the pair |
| code_2 | Second column's bar identifier |
| tau | Ratio for the pair of bars |
| default_special_special_tau | Default ratio for pairs of special values 295 belonging to the considered pair of bars that are not present in table special_special |
| table special_special | Information about co-occurrence ratios for pairs of special values 295 |
| column_name_1 | The first column in the pair |
| code_1 | First column's special value identifier |
| column_name_2 | The second column in the pair |
| code_2 | Second column's special value identifier |
| tau | Ratio for the pair of special values 295 |
| is_covered | Does the pair of special values 295 belong to a pair of bars in table bar_bar |

Table 9 below shows examples of the contents loaded into the relational metadata repository.

TABLE 9

| pack relational table | | | | | | | |
|---|---|---|---|---|---|---|---|
| database_name | table_name | packrow_code | column_name | min_value | max_value | gcd | hist_type |
| dbname | tabname | 0 | col1 | 7 | 11093 | 1 | Ranges |
| dbname | tabname | 0 | col2 | 1 | 15861 | 1 | Ranges |
| (...) | (...) | (...) | (...) | (...) | (...) | (...) | (...) |

| bar relational table | | | | | |
|---|---|---|---|---|---|
| database_name | table_name | packrow_code | column_name | code | left |
| dbname | tabname | 0 | col1 | 0 | NULL |
| dbname | tabname | 0 | col1 | 1 | 7 |
| dbname | tabname | 0 | col1 | 2 | 60 |
| dbname | tabname | 0 | col1 | 3 | 109 |
| dbname | tabname | 0 | col1 | 4 | 231 |

TABLE 9-continued

| dbname | tabname | 0 | col2 | 0 | NULL |
| dbname | tabname | 0 | col2 | 1 | 1 |
| dbname | tabname | 0 | col2 | 2 | 205 |
| ( . . . ) | ( . . . ) | ( . . . ) | ( . . . ) | ( . . . ) | ( . . . ) | bar relational table

| right | freq | special_values_freq | special_values_no | cumulative_gaps_len | modeled_values_no |
|---|---|---|---|---|---|
| NULL | 0 | 0 | 1 | 0 | 1 |
| 59 | 3661 | 3661 | 2 | 51 | 2 |
| 108 | 4024 | 4024 | 4 | 45 | 4 |
| 230 | 5287 | 5274 | 5 | 116 | 6 |
| 377 | 3652 | 3608 | 4 | 136 | 11 |
| NULL | 0 | 0 | 1 | 0 | 1 |
| 204 | 2989 | 2308 | 8 | 44 | 160 |
| 432 | 3010 | 2031 | 9 | 56 | 172 |
| ( . . . ) | ( . . . ) | ( . . . ) | ( . . . ) | ( . . . ) | ( . . . ) | gap relational table

| database_name | table_name | packrow_code | column_name | code | left | right | bar_code |
|---|---|---|---|---|---|---|---|
| dbname | tabname | 0 | col1 | 0 | 8 | 58 | 1 |
| dbname | tabname | 0 | col1 | 1 | 60 | 65 | 2 |
| dbname | tabname | 0 | col1 | 2 | 67 | 77 | 2 |
| dbname | tabname | 0 | col1 | 3 | 79 | 104 | 2 |
| dbname | tabname | 0 | col1 | 4 | 106 | 107 | 2 |
| dbname | tabname | 0 | col2 | 0 | 72 | 81 | 1 |
| dbname | tabname | 0 | col2 | 1 | 119 | 141 | 1 |
| dbname | tabname | 0 | col2 | 2 | 189 | 199 | 1 |
| ( . . . ) | ( . . . ) | ( . . . ) | ( . . . ) | ( . . . ) | ( . . . ) | ( . . . ) | ( . . . ) | bar_bar relational table

| database_name | table_name | packrow_code | column_name_1 | code_1 | column_name_2 | code_2 | tau | default_special_special_tau |
|---|---|---|---|---|---|---|---|---|
| dbname | tabname | 0 | col1 | 8 | col2 | 13 | 1.69969988 | 1.69969988 |
| dbname | tabname | 0 | col1 | 36 | col2 | 16 | 5.00550365 | 5.00550365 |
| dbname | tabname | 0 | col1 | 1 | col2 | 2 | 2.75356102 | 2.75356102 |
| dbname | tabname | 0 | col1 | 19 | col2 | 12 | 0 | 0 |
| ( . . . ) | ( . . . ) | ( . . . ) | ( . . . ) | ( . . . ) | ( . . . ) | ( . . . ) | ( . . . ) | ( . . . ) |

The following exemplary SQL statements contain sections that allow for focusing on metadata contents corresponding to a given column (over its all data pack granular summaries aggregated together):

```
[condition identifying a single column]
database_name = 'database_name' and
table_name = 'table_name' and column_name = 'column_name'
```

For instance, the following query sums frequencies of special values 295:

```
select value, sum(freq) sum_freq, count(*) pack_cnt
from special
where [condition identifying a single column]
group by value
order by value;
```

Figure 21:
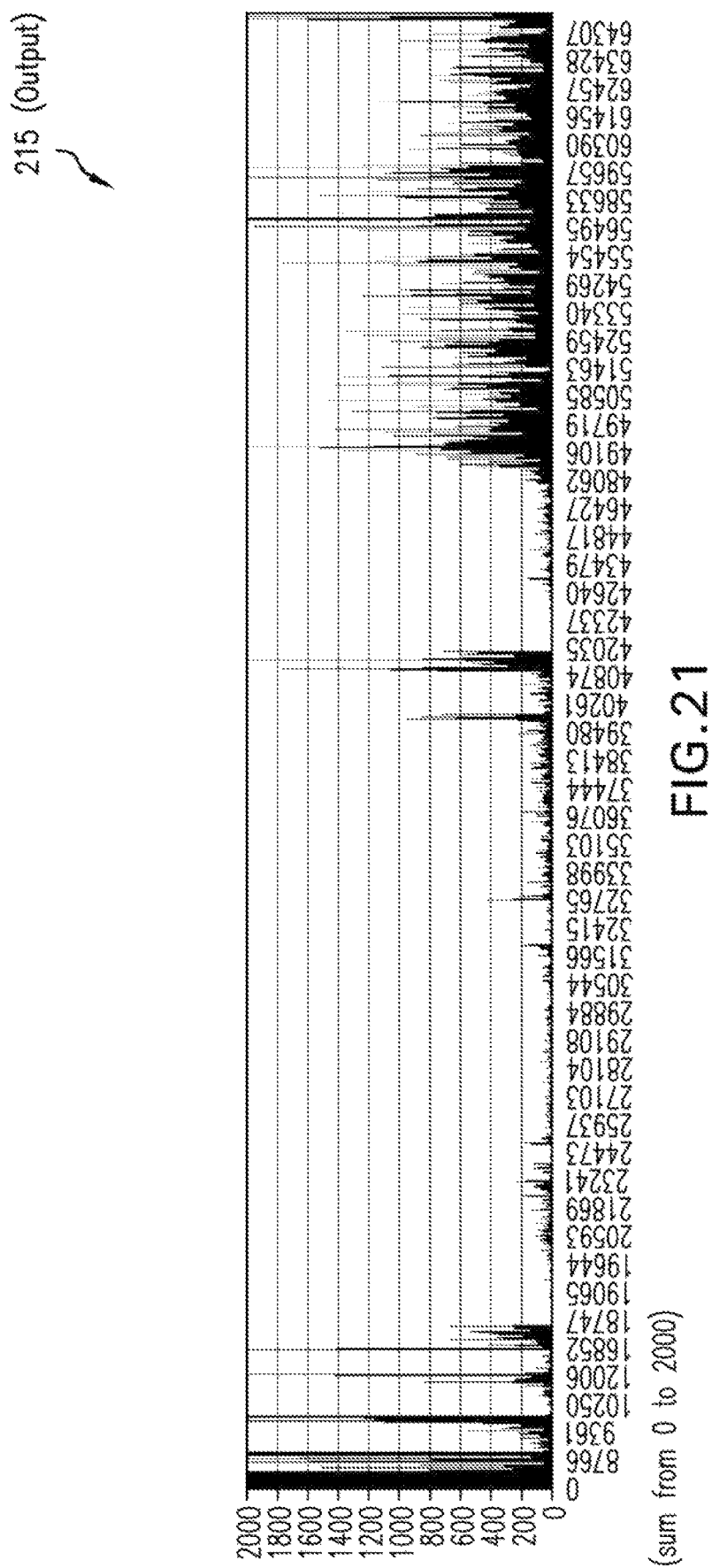
FIG. 21 illustrates column characteristics obtained using SQL over metadata tables.
Figure 22A:
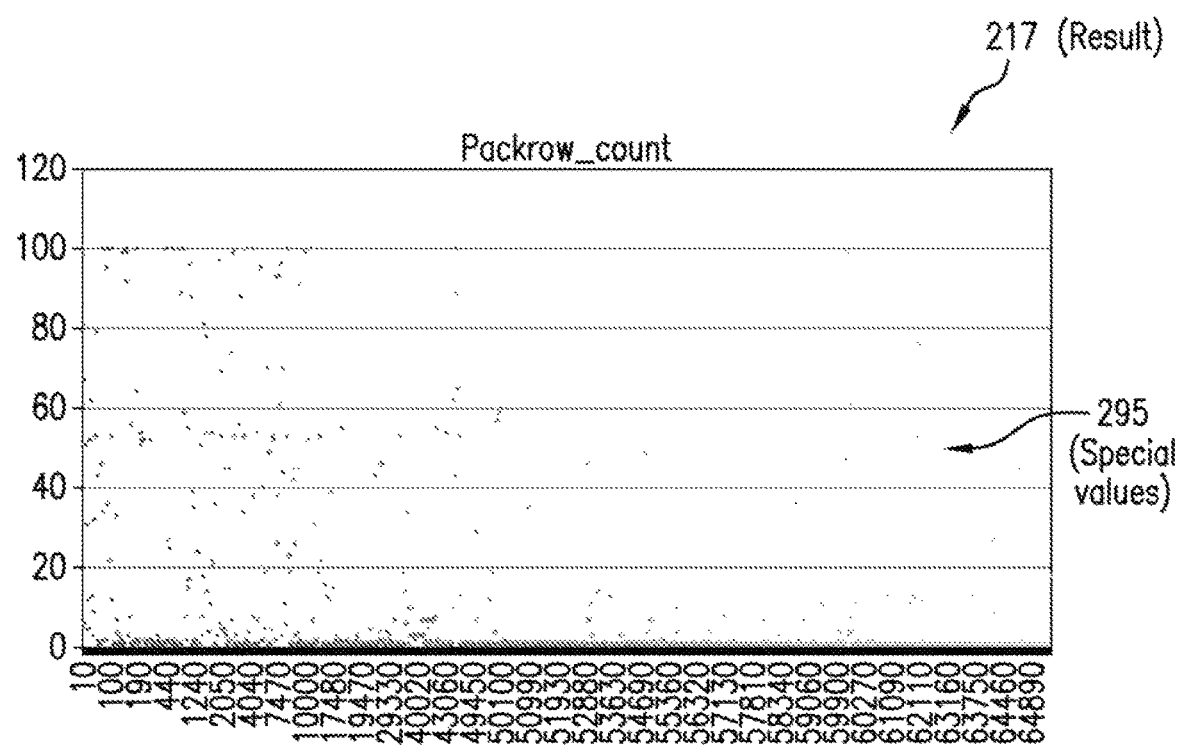
FIG. 22A illustrates re-occurrence of the same special values in different data packs.
Figure 22B:
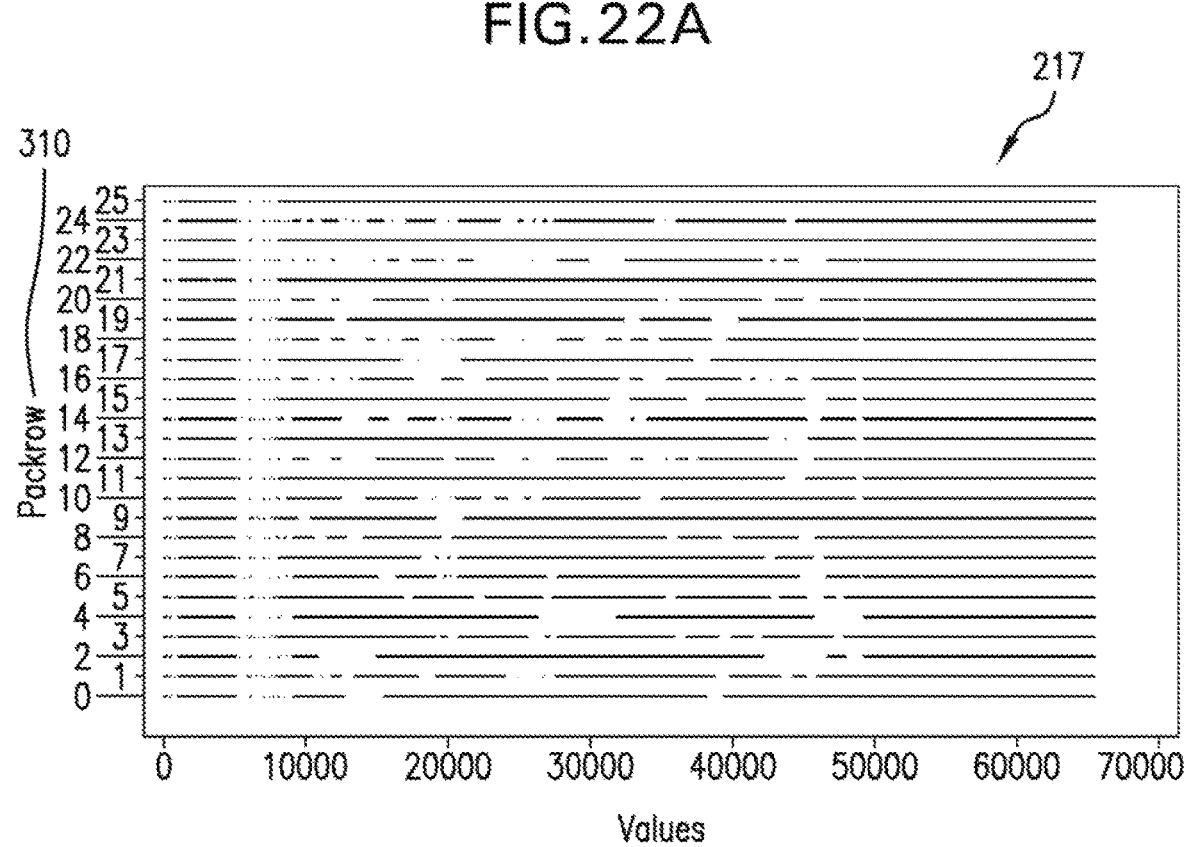
FIG. 22B illustrates the evolution of column values occurring in subsequent data packs.

When combined with a similar query 200 over histograms, this provides a high-level visualization of the overall domain of a given column. FIGS. 21 and 22A-B illustrate exemplary analytical reports about data content derived from data summaries 340 and/or metadata tables. FIG. 21 illustrates a plot of the tabular output 215 from an appropriate select statement where frequencies 290 of histogram bars 280 are presented in a graphically quantized way. Such output 215 may be produced hundreds times faster than in the case of analogous queries 200 executed over the original data table.

The next two examples refer to use cases mentioned previously. The following query 200 verifies how often the ranking algorithms identify the same special values 295 within different chunks of the ingested data. FIG. 22A shows a typical result 217 for a foreign key column, over a small data subset ($100 \times 2^{16}$ rows) obtained from one customer using the exemplary engine. FIG. 22A displays, for the given data column in the original data set, information on how often particular values of that column occur as special values 295 in histograms 280 describing the column in packrows 310.

```
select value, count(*) packrow_count
from special
where [condition identifying a single column]
group by value
order by value;
```

FIG. 22B illustrates the result 217 of the following query 200 for the same column showing the gaps 300. The vertical axis are the ordinal numbers of packrows 310 ingested by the system where the oldest data is indicated by 0 and the newest is indicated by 25. The horizontal axis shows a range of values from 0 to 65,000. For each packrow 310, the ranges of values that did not occur in the data i.e. gaps 300 can be visualized with ease.

```
select right_value + 1, left_bound, coalesce(lead(left_value, 1)
over (partition by packrow_code order by code) - 1,
(select max(max_value) from pack where [condition identifying a single
column]
and packrow_code = gap.packrow_code)) right_bound, packrow_code
from gap
where union [condition identifying a single column]
select
from
     min_value, left_value, gap.packrow_code
(select min_value, packrow_code from pack
where [condition identifying a single column)) pack
inner join
(selectmin(left_value) -1 left_value, packrow_code
from gap
where [condition identifying a single column] group by packrow_code)
gap
on      gap.packrow_code = pack.packrow_code
order by packrow_code, left_bound;
```

From the perspective of data analysts, the above illustrative metadata queries 200 reflect the repeatability of particular column values for data rows ingested by the illustrative engine over time. From the perspective of the engine developers and administrators, the outcomes of such "meta-queries" provide useful hints with regard to the credibility of the results of potential approximate SQL statements over the most meaningful values (represented as special values 295 in FIG. 22A), as well as, e.g., potential selectivity of approximate statements with filters over particular columns (whereby selectivity grows proportionally with the growth of empty areas visible in FIG. 22B). New queries 200 that can quickly derive completely new kinds of insights from the proposed metadata repository may be employed.

In experiments, SQL was used over metadata tables to prototype an approximate approach to the minimum redundancy maximum relevance (mRMR) feature selection. This was done for two reasons: 1) to extend the current functionality of the considered approximate query engine with some elements of scalable granular-style machine learning and 2) to extend the exemplary engine's testing environment by comparing the outputs of standard and granular versions of machine learning algorithms.

Feature selection is one of the most well-known areas of rough set applications. Thus, the development of granular versions of rough set feature selection techniques is desirable. Further, analogous re-implementations of rough-set-based machine learning approaches, e.g., in the field of decision tree induction, as well as many other methods of knowledge discovery and representation are possible. An mRMR is provided as an example embodiment of the present systems and methods.

The illustrative feature selection algorithm is based on the measure of mutual information. For packrow t and data columns a and b, such measure may be defined as, $$I_t(a, b) = \sum_{x,y} p_t(x, y) \log \frac{p_t(x, y)}{p_t(x) p_t(y)},$$

for x and y denoting the ranges 285/values occurring on a and b, respectively. However, as the engine stores only a limited number of tau-ratios of the form $$\tau_t(x, y) = \frac{p_t(x, y)}{p_t(x) p_t(y)},$$

for some combinations of x and y we may rely on default ratios available in metadata tables. There are three possibilities with this respect: 1) default ratios gathered in column default_bar_bar_tau (table pack_pack) for the case of pairs of histogram ranges 285 whose ratios are not stored by the engine, 2) default ratios in column default_not_covered_special_special_tau (table pack_pack) for the case of pairs of special values 295 whose tau-ratios are not stored neither for themselves nor for their "parents" (histogram ranges 285 that they belong to) and 3) default ratios in column default_special_special_tau (table bar_bar) for the case of pairs of special values 295 whose tau-ratios are not stored but the corresponding ratios for their "parents" are stored by the exemplary engine. Further, the overall mutual information is approximated as the average of the quantities $l_t$ (a, b) derived over particular packrows 310 of the given data table. Certainly, such approximations are not guaranteed to be equal to the actual values of mutual information that would be computed from the original data. However, experiments were conducted to ascertain whether such quickly approximated measures could drive the feature selection process similarly to thorough computations.

In mRMR, attributes are added to the resulting set iteratively by examining their mutual information relationships with both the decision attribute and conditional attributes that were added in previous steps. Table 10 shows the results of an experiment conducted over the already-mentioned data set of $100 \times 2^{16}$ network events, wherein the decision attribute corresponds to the number of bytes transmitted in every event and the stopping criterion is turned off, so all attributes are added step by step. The first column reports an order of selecting attributes according to the exact computations over the original data. The second column corresponds to calculations over a random sample consisting of 15% of data rows. The third column shows how mRMR behaves when fed with mutual information approximations derived from metadata tables. In this case, the sample-based approach seems to yield an order that is slightly closer to that obtained over the original data. However, the differences are minor and—most importantly—granular calculations have a huge advantage with regard to their speed when compared to both standard and sampled runs. Table 10 below shows mRMR attribute rankings for a data table describing network events.

TABLE 10

| rank | standard | sampled | approximated |
|---|---|---|---|
| 1. | p_element | p_element | p_element |
| 2. | trans_type | trans_type | service |
| 3. | s_address | s_address | trans_type |
| 4. | service | d_class | d_address |
| 5. | d_address | service | s_vrf |
| 6. | s_port | s_port | s_port |
| 7. | server | d_port | s_address |
| 8. | d_port | server | d_port |
| 9. | protocol | s_class | protocol |
| 10. | s_class | d_address | monitor |
| 11. | d_class | protocol | d_class |
| 12. | s_vrf | s_vrf | s_class |
| 13. | monitor | d_interface | d_interface |
| 14. | d_interface | monitor | s_interface |
| 15. | s_interface | s_interface | m_address |
| 16. | m_address | m_address | server |

The exemplary engine conducts query execution 207 as a chain of transformations of granulated data summaries 340 that aim at modeling characteristics of intermediate results corresponding to subsequent execution stages. Once the summary of a query output 215 is calculated, the engine translates it into the standard SQL result format which—as already discussed—could be interpreted as a stage of degranulation. This stage is particularly difficult for high-cardinality columns, e.g., in the case of involving them into group by operations. Then, at the end, the engine needs to replace the codes of histogram ranges 285 with their actual values. This is quite problematic because information about the actual values is only partial, so there is a risk that the final result will include non-existing values or will omit some values that should be included.

The engine stores the most significant gaps 300 and the greatest common divisors of values observed in the original data packs 275. Referring again to the theory of rough sets again, special values 295 whose frequencies 290 were not pushed down to zero during query execution 207 constitute a kind of domain's positive region, i.e., these are values that should contribute to the query result 217. On the other hand, gaps 300, greatest common divisors, dictionaries (if available) and zeroed frequencies 290 may be used to define the domain's negative region, i.e., values that should not contribute to the result 217. For every data pack 275, our metadata repository actually encodes one more type of information—the cardinality of upper approximation (derivable as the sum of values of column modeled_values_no over all histogram bars 280 describing a given data pack 275), i.e., the number of column values (including those potentially not existing) that might be potentially generated from the given data pack 275 during the degranulation process.

The illustrative metadata-related case study refers to a slightly modified interpretation of lower approximation of the column domains. Due the analysis of approximate query results 549, two kinds of values do not need to be included: 1) values existing in the original data that do not satisfy the query conditions and 2) values that did not exist in the original data at all but were produced from histogram ranges 285 under the assumption of locally uniform distributions. As the first category is less harmful for the user perception of final query results 217, the diagnostic task is to compute lower approximations as the sets of column values—gathered from all data packs 275—which occurred with certainty in the original data and, then, compare them with the actual sets of all distinct column values.

The following example query 200 shows how to derive the above-discussed cardinality of lower approximation of the column domain from the metadata tables. It is based on observation that, besides special values 295, the original data must have included also the borders of histogram ranges 285 and gaps. (This is how the knowledge capture algorithms work during the phase of original data ingestion.)

```
select count(distinct v) cnt from
(select database_name, table_name, column_name, min_value v
from pack
where [condition identifying a single column] union
select database_name, table_name, column_name, right_value v from
bar where
[condition identifying a single column] union
select database_name, table_name, column_name, left_value − 1 v
from gap
where [condition identifying a single column]
union
select database_name, table_name, column_name, right_value + 1 v
from gap
where [condition identifying a single column]
union
```

```
select database_name, table_name, column_name, value v
from special
where [condition identifying a single column]);
```

Table 11, which illustrates cardinalities of lower and upper approximations of column domains, shows the results obtained for the $100\times2^{16}$ fragments of data sets coming from two companies (labeled as database 1 and database 2), whereby columns lower approximation and real count distinct report the results of the above query 200 and the actual number of distinct values in the original data, respectively. Evidently, for many cases these outcomes are quite similar to each other (e.g.: 1026 versus 1050 for data column monitor in database 1), or at least of the same order of magnitude (e.g.: 2091 versus 5747 for data column d_class in database 2). This means that if the engine—during query processing—dynamically gathers together the borders of gaps 300 and histogram ranges 285 corresponding to all data packs 275 (of course excluding those data fragments which are filtered out during the previous query execution 207 stages) and then pick the elements of such constructed sets while generating the final outcomes, then the overall approximate query accuracy may be significantly improved.

TABLE 11

| database | column | lower approximation | upper approximation | real count distinct |
|---|---|---|---|---|
| database 1 | s_port | 13121 | 62648 | 40945 |
| database 1 | d_port | 9298 | 64184 | 43001 |
| database 1 | s_address | 5205 | ~4000000000 | 19035 |
| database 1 | d_address | 3409 | ~4000000000 | 17072 |
| database 1 | load_time | 15989 | 36277 | 17568 |
| database 1 | real_time | 14199 | ~1400000000 | 20376 |
| database 1 | monitor | 1026 | 1050 | 1050 |
| database 1 | d_name | 883 | 1788 | 1788 |
| database 2 | d_port | 8622 | 65270 | 64844 |
| database 2 | s_port | 9273 | 65356 | 64855 |
| database 2 | s_address | 6461 | ~4000000000 | 173989 |
| database 2 | d_address | 6158 | ~4000000000 | 191293 |
| database 2 | p_element | 1016 | 11093 | 1214 |
| database 2 | packets | 6772 | 191208 | 7166 |
| database 2 | d_class | 2091 | 9212 | 5747 |
| database 2 | s_class | 1990 | 9267 | 5524 |

Further, for those of data columns for which the differences between real count distinct scores and their lower approximations are bigger, it is important to estimate the real scores, so at least the cardinalities of distinct values (though not necessarily particular values) are produced in a correct way. This is because otherwise those cardinalities might be over-generated, potentially at the level reported in column upper approximation in Table 11.

Scalable Machine Intelligence: A Case Study of Feature Selection

Histogram-based data summaries 340 that are created and stored by one of the approximate database engines available in the market are examined for the purposes of redesigning and accelerating machine learning algorithms. As an example, one of popular minimum redundancy maximum relevance (mRMR) feature selection methods based on mutual information is considered. Granulated data summaries 340 are used to approximately calculate the entropy-based mutual information scores and observe the mRMR results compared to the case of working with the actual scores derived from the original data.

Granulated data summaries 340 may serve as an efficient input for machine learning methods. This idea follows a popular trend of mining massive data streams based on precalculated data cluster descriptions. Approximate database engines are a perfect match for implementations, which construct decision models heuristically based on aggregated information derived using SQL. Yet another approach is to derive required information directly from data summaries 340 without a need of going through SQL-level interfaces. In both cases, it is expected that approximate and exact calculations of heuristic functions provide comparable basis for the decision model optimization because heuristic decisions may be based on approximate information.

As an example, the problem of feature selection is considered. We focus on the minimum redundancy maximum relevance (mRMR) approach, where features are added to the resulting set iteratively by examining their relationships with both the dependent variable and features that were added in previous steps. Relationships are modeled by means of the entropy-based mutual information measure that can be computed from the original data or, alternatively, approximated using the illustrative data summaries 340. In an experiment, a data set including several millions of network transmissions was considered. This is actually a fragment of the data obtained from a company that develops the tools for early detection of viruses and worms in the network. In this particular case/example, the goal is to identify features characterizing suspiciously big data transfers.

The feature selection approach may be implemented as a simple PL/pgSQL script working directly on summary tables. Once information about original data has been captured, then—for each incoming SQL select statement—the engine transforms data summaries 340 iteratively to build a summary of the query result 217. Different transformation mechanisms may be dedicated to different operations. For example, the operation of filtering requires updating frequencies 290 of histogram bars 280 and special values 295 for columns relevant for further query execution 207 stages basing on the WHERE conditions specified over other columns. This is done by adapting the methods of belief propagation, where—for each packrow 310 separately—the stored most significant co-occurrences of bars 280 and special values 295 of different columns are used as partial information about data-driven joint probability distributions.

Once the query outcome summary is created, the engine translates it into the standard SQL select statement result format. If one interprets data ingestion as a step of information granulation, then the final stage of translating query result 217 summaries into actual approximate results 549 can be interpreted as information degranulation. Prior to that, information transformed through query execution 207 stages is highly condensed, requiring only a fraction of resources of a traditional database to produce the results. This is especially interesting to compare with approximate query techniques based on data sampling, whereby—even though samples may contain a low percentage of original rows—the whole computational process remains at the original atomic data level.

The construction of histograms 280 representing particular columns within particular packrows 310 can be compared to the problem of data discretization. In an exemplary embodiment, two standard discretization approaches may be combined that yield a superior quality of approximate queries executed against granulated data sets with truly complex column domains. An equal-length discretization is applied in order to create 8 (by default) roughly equal-length buckets, and each of them is split onto shorter intervals such that the amounts of rows with a given column's values belonging to particular intervals are approximately uniform, finally resulting in a total number of 64 (by default) buckets.

In another embodiment, histogram ranges 285 may be split, e.g., onto shorter intervals containing roughly uniform amount of distinct values of a given column occurring in a given packrow 310. Two exemplary methods of splitting will be referred to as support and distinct, respectively.

Another aspect is how to automatically choose a set of special values 295, which are somehow outlying. Previously, outliers were identified and in some sense 'neglected' in order to produce more compact summaries. Quite oppositely, in this embodiment of the engine, a specified number of interesting values per data pack 275 (100 by default) is represented explicitly. Currently, such special values 295 may be chosen so as to minimize a variance related to summarizing other values by histogram bars 280. Another method may be, e.g., to weight rows in order to equalize the importance of values in different equal-length intervals. These two methods of extracting special values 295 will be referred to as standard and weighted, respectively.

The remaining stage of data ingestion is to describe co-occurrences between values of different columns. To keep low footprint 570 of data summaries 340, co-occurrence-related information is stored only for a limited amount (by default 128×the number of columns) of pairs of histogram bars 280 and special values 295. For packrow t and columns a and b, 315/317 a's and b's histogram bars 280 using iterators i and j, respectively, are referenced. The normalized frequencies 290 of occurrence of a's values within its i-th bar, occurrence of b's values within its j-th bar, and joint occurrence of pairs of a's values within its i-th bar and b's values within its j-th bar are denoted by $p_t(i)$, $p_t(j)$, and $p_t(i,j)$ respectively. In an embodiment, the engine may use the following function for expressing the importance of pairs of bars, presented herein using a simplified notation comparing to equation (1):

$$rank_t^{|\cdot|}(i,j) = p_t(i)p_t(j)\left|\frac{p_t(i,j)}{p_t(i)p_t(j)} - 1\right| \quad (18)$$

Formula (18) measures how much accuracy 565 may be lost when basing on $p_t(i)$ $p_t(j)$ instead of $p_t(i,j)$. For a given packrow t, $rank_t^{|\cdot|}$ is used to jointly evaluate all pairs of bars for all pairs of columns. This way, more footprint can be devoted to column pairs which seem to be more correlated than others. After selecting a fixed number of the most important pairs of bars, for given columns a and b, two types of information are stored. For the selected pairs of bars (i,j), ratios $\tau_t(i,j)=c$ are stored. For not selected pairs of bars, the default ratio is stored (denoted by default_bar_bar_tau in FIG. 1) defined as $\tau_t(i,j) \in \bar{t}$ means that information about $\tau_t(i,j)$ is stored by the exemplary engine:

$$\tau_t(a,b) = \frac{1 - \sum_{i,j:\tau_t(i,j)\in\bar{t}} p_t(i)p_t(j)p_t(i,j)}{1 - \sum_{i,j:\tau_t(i,j)\in\bar{t}} p_t(i)p_t(j)} \quad (19)$$

Analogous default ratios are stored for not selected pairs of special values 295 (fields default_special_special_tau and default_not_covered_special_special_tau, for the cases of stored/not stored pairs of special values' 295 parent bars).

The mRMR method is presented in its simplified form in FIG. 23 as Algorithm 3, 590. As in the comparative experiments, an ordering of additions of features into the resulting feature set is investigated; Algorithm 3, 590, does not include any stopping condition. As function ∅: A×A∪{d}→ [0, +∞) evaluating relationships between features, well-known mutual information is employed. The aim is to study: 1) how to utilize data summaries 340 to approximate mutual information and 2) how different outcomes may be expected when feeding Algorithm 3, 590, with approximations instead of thorough calculations.

In an example, referring to columns a and b, it is assumed for simplicity that they do not have special values 295. (The case with special values 295 is quite analogous.)

As the mutual information approximation, $$\tilde{I}(a,b) = \frac{1}{N}\sum_{t=1}^{N} I_t(a,b)$$

where N denotes the amount of packrows 310 and $I_t(a, b)$ is defined as follows ($\tau_t(i,j) \in \tilde{t}^+$ means that $\tau_t(i,j)$ is stored by the engine and there is $\tau_t(i,j) > 0$):

$$I_t(a,b) = \sum_{i,j:\tau_t(i,j) \in \tilde{t}^+} p_t(i)p_t(j)\tau_t(i,j)\log \tau_t(i,j) + \alpha_t(a,b)\log \tau_t(a,b) \quad (20)$$

where $$\alpha_t(a,b) = 1 - \sum_{i,j:\tau_t(i,j) \in \tilde{t}^+} p_t(i)p_t(j)\tau_t(i,j) \quad (21)$$

For a pair of i-th and j-th bars such that $\tau_t(i,j) \in \tilde{t}$, the quantity $p_t(i)p_t(j)\tau_t(i,j) \log \tau_t(i,j)$ can be rewritten as $$p_t(i,j)\log\frac{p_t(i,j)}{p_t(i)p_t(j)},$$

which is identical to the standard way of computing mutual information. For all other pairs of a's and b's bars, the ratio under the logarithm can be approximated by $\tau_t(a, b)$. The total normalized frequency of such cases equals to $\alpha_t(a, b)$. The only remaining corner case is $\tau_t(a, b) = 0$. However, this would imply equality $\alpha_t(a, b) = 0$. In such situations, it may be assumed that $\alpha_t(a, b) \log \tau_t(a, b) = 0$.

The following result shows that $\tilde{I}$ has analogous properties when comparing it to standard mutual information. A simplified proof is included below in order to better illustrate the meaning of the considered data summaries 340:

Proposition 1 For any columns a and b of a data table T, there is $\tilde{I}(a, b) \geq 0$, where equality holds, if and only if the considered approximate query engine does not store information about any co-occurrences involving a and b.

Proof: Show—$I_t(a, b) \leq 0$ for every packrow t. For simplicity, assume that columns a and b do not have special values 295. (For the case with special values 295 the proof is analogous). For x>0 there is log(x)≤x−1 where equality holds, if and only if x=1. Hence, $$-I_t(a,b) = \sum_{i,j:\tau_t(i,j) \in \tilde{t}^+} p_t(i,j)\log\frac{1}{\tau_t(i,j)} + \alpha_t(a,b)\log\frac{1}{\tau_t(a,b)} \leq$$

$$\sum_{i,j:\tau_t(i,j) \in \tilde{t}^+} p_t(i,j)\left(\frac{1}{\tau_t(i,j)}-1\right) + \alpha_t(a,b)\left(\frac{1}{\tau_t(a,b)}-1\right) =$$

$$\sum_{i,j:\tau_t(i,j) \in \tilde{t}^+} p_t(i)p_t(j) - \sum_{i,j:\tau_t(i,j) \in \tilde{t}^+} p_t(i,j) + \frac{\alpha_t(a,b)}{\tau_t(a,b)} - \alpha_t(a,b) \leq$$

$$\sum_{i,j:\tau_t(i,j) \in \tilde{t}^+} p_t(i)p_t(j) - \sum_{i,j:\tau_t(i,j) \in \tilde{t}^+} p_t(i,j) + \frac{\alpha_t(a,b)}{\tau_t(a,b)} - \alpha_t(a,b)$$

By definition of $\alpha_t(a, b)$, $\alpha_t(a,b) + \sum_{i,j:\tau_t(i,j) \in \tilde{t}^+} p_t(i,j) =$ $$1 \text{ and } \frac{\alpha_t(a,b)}{\tau_t(a,b)} + \sum_{i,j:\tau_t(i,j) \in \tilde{t}^+} p_t(i)p_t(j) = 1.$$

Thus, $-I_t(a, b) \leq 0$ and equality holds, if and only if:

$\sum_{i,j:\tau_t(i,j) \in \tilde{t}^+} p_t(i)p_t(j) = \sum_{i,j:\tau_t(i,j) \in \tilde{t}^+} p_t(i)p_t(j)$ and  1)

for each case of $\tau_t(i,j) \in \tilde{t}^+$, there is $\tau_t(i,j) = 1$. 2)

The first condition means that there are no cases of $\tau_t(i,j) = 0$. When combining with the second condition, it means that for each $\tau_t(i,j) \in \tilde{t}$, there is $\tau_t(i,j) = 1$. Given the way of ranking pairs of histogram bars 280, this means that there is no need to store information about any pairs of a's and b's bars in the summary of packrow t.

The data set used in experiments for the illustrative case study includes $100 \times 2^{16}$ rows (split onto 100 packrows) and 17 columns reflecting the network traffic. The columns represent typical information about transmissions, protocols, services, servers, as well as the source, destination and monitor characteristics. (Column abbreviations are visible in Table 13). Column transferred bytes served as the dependent variable. This was inspired by observation that a network monitoring tool developed by this particular data provider—one of the companies used to test the engine—is generating a number of queries 200 attempting to characterize the largest-in-size transmissions using other columns.

Table 12 shows distances between mRMR rankings obtained using the whole data versus mRMR rankings obtained based on a data sample and mRMR rankings based on data summaries 340 captured using various settings within the illustrative engine. Table 12 below reports a summary of the results. Its first column describes the way of deriving histograms 280 and special values 295, as well as—analogously—discretizing the original data set as a prerequisite for standard mutual information calculations. Settings support versus distinct indicate two alternative methods of constructing histogram bars. Settings standard versus weighted indicate two methods of identifying special values 295. These settings can be applied both to particular packrows 310 ingested by the engine and to the original data set as a whole.

TABLE 12

| discretization | sampled | |·|/hierarchy | |·|/flat | (·)/hierarchy | (·)/flat |
|---|---|---|---|---|---|
| support/standard | 1.25 | 2.00 | 2.25 | 1.38 | 2.25 |
| support/weighted | 3.38 | 2.13 | 3.13 | 2.63 | 2.50 |
| distinct/standard | 0.63 | 2.63 | 1.25 | 1.88 | 1.63 |
| distinct/weighted | 4.50 | 3.63 | 4.25 | 3.63 | 3.88 |

The second column in Table 12 refers to calculations over a 15% data sample. The reported quantities equal to normalized $L_1$ distances between vectors of columns' ordinal numbers resulting from Algorithm 3, 590, in FIG. 23 when computing φ as mutual information over the whole discretized data set and over its discretized sample. Evidently, discretization over a sample leads toward less similar feature selection outputs (comparing to mRMR executed on the original data set as a baseline) for the weighted technique of selecting special values 295.

Further columns in Table 12 correspond to four different ways of ranking co-occurrences of pairs of histogram bars and special values 295. (Settings |•|/hierarchy in combination with support/standard represent the current production version of the considered approximate query engine.) Like above, distances between data columns' ordinal numbers resulting from Algorithm 3,590, when computing Ø as mutual information over the original data set versus computing it using formula (20) are reported. Labels |•|/hierarchy, |•|/flat, (•)/hierarchy, and (•)/flat refer to four strategies of choosing co-occurrences that should be stored in the engine. |•|/ means applying function $rank_t^{|\cdot|}$ while (•) means replacing it with $$rank_t^{|\cdot|}(i, j) = p_t(i)p_t(j)\left(\frac{p_t(i, j)}{p_t(i)p_t(j)} - 1\right) \quad (22)$$

The idea behind $rank_t^{(\cdot)}$ is to devote the multi-column footprint to positive co-occurrences, i.e., ratios $\tau_t(i,j)$ that are significantly greater than 1.

Settings hierarchy and flat refer to two ways of looking at pairs of special values 295. Special values 295 that drop into a's i-th histogram range and b's j-th histogram range are denoted by $k_i$ and $l_j$ respectively. The special-value related ranking corresponding to the hierarchy setting (used currently in the exemplary engine) compares special values' 295 ratios to the ratios of their parents (In formula (23), settings hierarchy and |•| are combined and the case of (•) is analogous.)

Table 13 below shows mRMR orderings of columns in the network traffic data set discretized using support/weighted settings for bars and special values 295 (refer to Table 12).

Herein, it is presented in a simplified notation as compared to equation (4):

$$rank_t^{|\cdot|}(k_i, l_j) = p_t(k_i)p_t(l_j)\left|\frac{p_t(k_i, l_j)}{p_t(k_i)p_t(l_j)} - \frac{p_t(i, j)}{p_t(i)p_t(j)}\right| \quad (23)$$

As for the flat setting, $$\frac{p_t(k_i, l_j)}{p_t(k_i)p_t(l_j)}$$

is put against 1 instead of $$\frac{p_t(i, j)}{p_t(i)p_t(j)}.$$

In order to keep a kind of co-occurrence ranking consistency, pairs of histogram bars 280 are then evaluated by means of their frequencies 290 excluding special values 295.

Table 12 provides some insights with regard to relationships between different settings. Notably, in this example, (•) seems to be a better choice than |•|, if and only if we use it together with hierarchy/standard or flat/weighted strategies responsible for selecting (pairs of) special values 295. For the standard setting, sampled discretization seems to be more accurate than the granulated approximations. The present systems and methods provide a huge advantage with regard to the speed of calculations when comparing to both standard and sampled ways of running mRMR feature selection similar to the previously mentioned observations related to sampling-based approximate query solutions.

Table 13 illustrates an example of more detailed experimental outcomes. All versions of collecting information about co-occurrences provides results that are quite similar to the ordering in the first column (starting with column

TABLE 13

| standard | sampled | |·|/hierarchy | |·|/flat | (·)/hierarchy | (·)/flat |
|---|---|---|---|---|---|
| p_element | p_element | p_element | p_element | p_element | p_element |
| service | trans_type | service | service | service | service |
| trans_type | d_class | trans_type | trans_type | s_address | trans_type |
| server | s_port | d_address | s_address | trans_type | s_class |
| d_address | service | s_vrf | s_vrf | d_port | server |
| protocol | s_class | s_port | d_class | s_port | d_class |
| s_port | d_port | s_address | s_port | d_address | s_port |
| monitor | server | d_port | d_port | s_vrf | d_port |
| d_port | s_address | protocol | protocol | protocol | s_address |
| s_vrf | d_address | monitor | s_class | monitor | protocol |
| d_class | protocol | d_class | d_address | d_class | s_vrf |
| s_address | d_interface | s_class | monitor | s_class | monitor |
| d_interface | s_vrf | d_interface | d_interface | s_interface | d_address |
| s_class | monitor | s_interface | s_interface | d_interface | d_interface |
| m_address | s_interface | m_address | m_address | m_address | s_interface |
| s_interface | m_address | server | server | server | m_address | p_element as the first choice in all cases). In practice, a lot depends on the mRMR stopping condition. For instance, if the algorithm is set up to select three columns, then the baseline feature subset would take a form of {p_element, service, trans_type}. In this particular situation, the Ĩ-driven computations would lead toward (almost) the same subsets.

In another embodiment, approximate summary transformations may be applied in data mining. In an example, approximate derivation of entropy-based mutual information scores for pairs of data columns may be provided. First, for each packrow 310—a fragment of the original data set—only quantized and partial characteristics of columns and their interdependencies are stored. Thus, any reference to pairwise probability distributions may yield imperfect results. On the other hand, slight imperfections may not invalidate decision making processes based on approximate scores, with an expected advantage of significant acceleration of calculations.

Packrow-level computations of mutual information may currently be implemented in an exemplary approximate database engine for the purpose of spanning locally optimal belief propagation trees that serve as the basis for SQL filtering. For a given query, trees maximizing overall mutual information (summed over their edges) can take different forms for different packrows 310. This diversity provides more accurate approximate query execution 207 than would be a case for belief propagation trees optimized globally for the whole data. However, if the task is to find pairs of data columns that are interdependent globally, then such purely local calculations may suffer from mistakes.

"Domain drift" is evolution of single column summarized characteristics from packrow 310 to packrow 310. This was observed in previously presented experimental results—for columns whose values are distributed across packrows 310 in a uniform way, their approximated mutual information scores (linking them with other columns) are relatively more reliable than for columns whose values are drifting along the data. The current model of distributed approximation of mutual information may be enriched by additional calculations conducted over an aggregated table gathering together simplified summaries of all packrows 310 to solve this problem.

From a general perspective of parallel and distributed computing, the exemplary approach to approximating global (table-level) mutual information is a typical example of decomposing a given task onto pre-arranged data fragments and then, aggregating local outcomes in quite a naïve way. On the other hand, the discussion triggered by the experiments serves as a guideline how to make that second phase of calculations more sensitive with respect to the data. Calculations on an aggregated table representing all packrows would need to be preceded by assembling global quantization of a domain of each single column. This may be done by merging one-column summaries available for particular packrows 310 into global representations—a mechanism that is already used inside an embodiment of the approximate database engine for other purposes.

Figure 24:
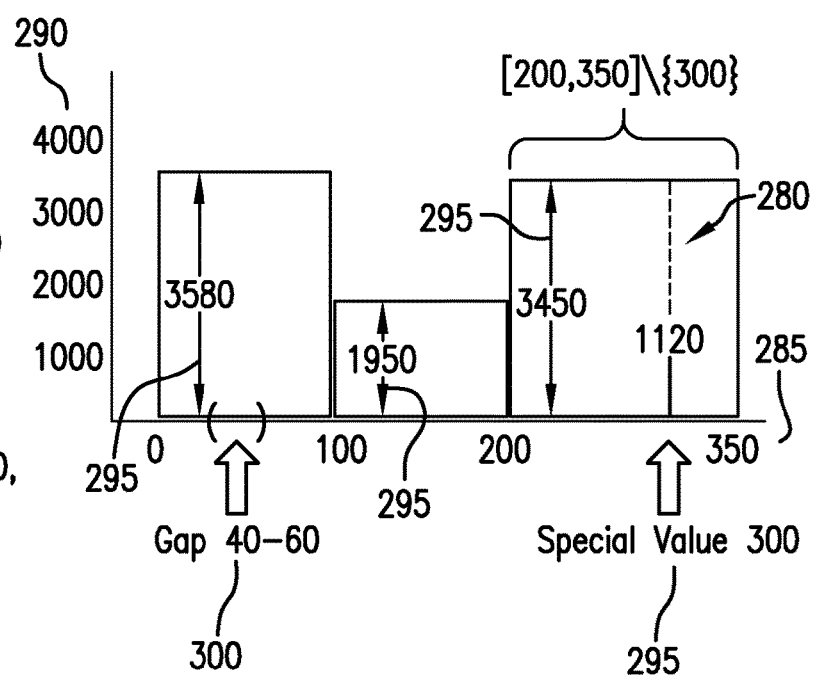
FIG. 24 illustrates summarized content of a single data pack corresponding to a single numeric column, over a single packrow.

FIG. 24 illustrates summarized content of a single data pack 275 corresponding to a single numeric column, over a single packrow 310. Parts of quantized data pack's 275 domain take form of complements 140 (such as [200, 350]\{300}) and special values 295 (such as 300) annotated with frequencies 290 derived from the original data. FIG. 24 shows how the domain of a given numeric column (alphanumeric columns are still under investigation), within a given packrow 310, can be quantized onto ranges 285 and exceptions, called special values 295. There is a lot of work behind designing heuristics that choose ranges 285 and special values 295 for particular data packs 275, i.e., collections of values of a single column within a single packrow 310. Technically, operations are performed on complements 140, i.e., ranges 285 with special values 295 excluded. As a result, for each column within a packrow 310 its local domain partition is obtained, with its parts annotated with frequencies 290 of rows having the corresponding values. Besides special values 295 and complements 140 there are also gaps 300, although they have no influence on experiments conducted herein.

Figure 25:
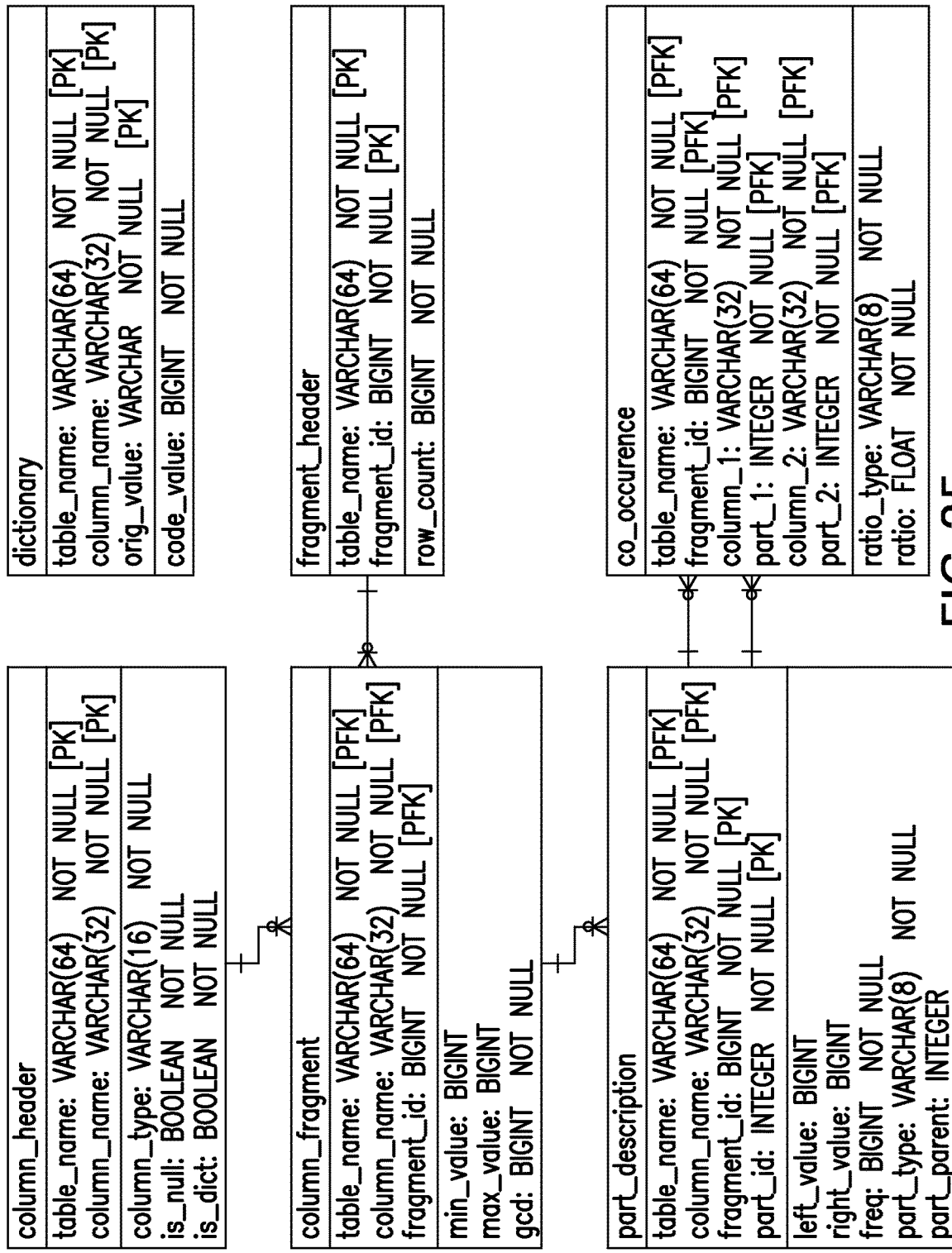
FIG. 25 illustrates a revised metadata schema representing granulated summaries according to systems and methods of the present disclosure.

FIG. 25 and Table 14 represent complete summary contents 600. FIG. 25 illustrates a schema of an exemplary metadata table that is available as a virtual table for analytical and diagnostic scripting independently of the engine. Besides single-pack parts and their frequencies, the key aspect is to derive and store the most meaningful co-occurrences (i.e. interdependencies) involving pairs of columns in particular packrows 310. For packrow t and columns a and b, a's and b's parts (special values 295 or complements 140) are referenced using iterators i and j, respectively. $P_t(part_t^a[i])$, $P_t(part_t^b[j])$ and $P_t(part_t^a[i], part_t^b[j])$ denote probabilities of occurrence of a's values within its i-th part, b's values within its j-th part and pairs of a's and b's values within their i-th and j-th parts, respectively. Co-occurrence ratios are defined as (the meaning of formula (24) is the same as in case of formula (2), now rewritten in new notation):

$$\tau_t(part_t^a[i].part_t^b[j]) = \frac{P_t(part_t^a[i], part_t^b[j])}{P_t(part_t^a[i])P_t(part_t^b[j])} \quad (24)$$

Previously, several methods of on-load evaluation were investigated, which co-occurrences are most worth storing. Different "budgets" for the number of stored ratios (and other parameters) that can influence the speed and accuracy of query execution 207 were tested. Generally, it is assumed that a complete map of co-occurrences does not need to be maintained. Instead, pairs that were not evaluated as meaningful during data load can be estimated using default ratio $$\tilde{\tau}_t(a, b) == \frac{1 - \sum_{stored\_ratios} P_t(part_t^a[i])P_t(part_t^b[j])\tau_t(part_t^a[i], part_t^b[j])}{1 - \sum_{stored\_ratios} P_t(part_t^a[i])P_t(part_t^b[j])} \quad (25)$$

where "Σ stored ratios" means the sum over all combinations of parts indexed by i and j such that $\tau_t(part_t^a[i], part_t^b[j])$ has been chosen to be stored by the engine.

Table 14 shows a high-level description of metadata tables and their columns currently supported by an exemplary approximate database engine.

TABLE 14

| Table/Columns | Description of Contents |
|---|---|
| column_header | Basic information about columns |
| table_name | Table name |
| column_name | Column name |
| column_type | Column type |

TABLE 14-continued

| Table/Columns | Description of Contents |
| --- | --- |
| is_null | Can column have null values |
| is_dict | Are column's values replaced by dictionary codes |
| dictionary | Information about dictionary codes |
| table_name | Table name |
| column_name | Column name |
| orig_value | Original column's value |
| code_value | Its corresponding code used in data summaries 340 |
| fragment_header | Basic information about packrows |
| table_name | Table name |
| fragment_id | Packrow's ordinal number in table |
| row_count | Amount of original rows represented by packrow |
| column_fragment | Basic information about data packs |
| table_name | Table name |
| column_name | Column name |
| fragment_id | Packrow's ordinal number in table |
| min_value | Minimum value occurring in data pack |
| max_value | Maximum value occurring in data pack |
| gcd | Greatest common divisor for values in data pack |
| part_description | Detailed information about data pack summaries |
| table_name | Table name |
| column_name | Column name |
| fragment_id | Packrow's ordinal number in table |
| part_id | Part's ordinal number (unique in data pack) |
| left_value | Minimum value occurring in part |
| right_value | Maximum value occurring in part |
| freq | Amount of rows with values inside part's domain |
| part_type | Special value/complement/gap |
| part_parent | For a value or gap, id of a range it belongs to |
| co_occurrence | Information about co-occurrence ratios |
| table_name | Table name |
| fragment_id | Packrow's ordinal number in table |
| column_1 | First column in co-occurrence ratio |
| part_1 | id of part corresponding to column_1 |
| column_2 | Second column in co-occurrence ratio |
| part_2 | id of part corresponding to column_2 |
| ratio_type | Type of ratio (equations (24) or (25)) |
| ratio | Ratio for pair (part_1, part_2) in given packrow |

Next, several examples of how to use above outlined structures in approximate analytics are explored (both in our already-existing approximate database engine and in new approaches to approximate data mining). However, the overall methodology makes practical sense only if granulated summaries of the original data are produced fast enough. From a software architecture perspective, the present systems and methods comprise two fully separate layers, responsible for: 1) distributed and asynchronous acquisition of summaries and 2) utilization of already-stored summaries to run approximate operations. The first layer is supposed to look efficiently through potentially distributed and heterogeneous data sources, leaving the actual data in-place. Given that summaries of particular packrows 310 may be computed independently from each other, this phase can be highly optimized. Still, even from perspective of a single packrow 310, aforementioned quantization and ranking based calculations require significant effort and, therefore, it will be always important to investigate new computational techniques at this level.

Finally, summaries described herein differ slightly from those introduced previously. In the earlier approach, co-occurrence ratios were evaluated at two different levels of hierarchy: pairs of special values 295 and pairs of ranges 285—but not "range minus special values 295" complements 140. (Referring to FIG. 24, it would mean counting rows with values in [200, 350] instead of [200, 350]\{300}.) Then, the exemplary engine synchronized calculations at both levels of most meaningful co-occurrences. On the other hand, representations referenced in FIG. 25 and Table 14 are flattened, forming single-layer partitions of local column domains. Such partitions are much easier to handle, both during data load and any later computations. As a side effect, the illustrative engine may now store (if it decides to do so) a co-occurrence ratio linking a special value with a complement defined over another column.

There are many aspects in which the approximate database engine development corresponds to machine learning research. For instance, the approach to deriving quantizations of local data column domains within subsequent packrows 310 is comparable to state-of-the-art discretization methods.

As another example, the previously discussed exemplary approximate query mechanism refers strongly to so-called probabilistic graphical models. Namely—as already mentioned above—for any SQL statement with WHERE conditions, the engine constructs an internal tree-based scheme allowing it to propagate influence of those conditions on one-column representations of all data columns involved in the statement. Such trees are spanned over nodes symbolizing columns and they can be optimized for each packrow 310 separately.

In order to span a tree for packrow t, one may rely on the idea of maximizing its joint mutual information. With full access to packrow's contents, then such local mutual information for columns a and b would take a form of $$I_t(a, b) = \sum_{v_a, v_b} P_t(v_a, v_b) \log \frac{P_t(v_a, v_b)}{P_t(v_a) P_t(v_b)},$$

where $v_a$ and $v_b$ denote original values of a and b, respectively. In an example quantized version, $I_t$ (a, b) could be rewritten as $\Sigma_{i,j} P_t(\text{part}_t^a[i], \text{part}_t^b[j]) \log \tau_t(\text{part}_t^a[i], \text{part}_t^b[j])$, whereby $P_t(\text{part}_t^a[i], \text{part}_t^b[j])$ could further be replaced with could be further replaced with $P_t(\text{part}_t^a[i]) P_t(\text{part}_t^b[j]) \tau_t(\text{part}_t^a[i], \text{part}_t^b[j])$. However, given limited information about pairwise probability distributions stored in the framework, only coefficients in equations (24) and (25) may be used to approximate it (the meaning of $\tilde{I}_t$ (a, b) is the same as $I_t(a, b)$ in previous sections. However, $\tilde{I}$ is written here as I to emphasize that this is actually an approximation of local mutual information):

$$\tilde{I}_t(a, b) = \sum_{stored\_ratios} P_t(part_t^a[i]) P_t(part_t^b[j])$$

$$\tau_t(part_t^a[i], part_t^b[j]) \log \tau_t(part_t^a[i], part_t^b[j]) + \log \tilde{\tau}_t(a, b) \times$$

$$(1 - \sum_{stored\_ratios} P_t(part_t^a[i]) P_t(part_t^b[j]) \tau_t(part_t^a[i], part_t^b[j])$$

Given the observed efficiency of the above approach in approximate querying, the same style of calculations may be introduced in other areas. Summary-based techniques that are useful for basic data exploration and machine learning may be developed. The first step is to adapt the above way of approximating mutual information for the purpose of accelerating classical minimum redundancy maximum relevance (mRMR) feature selection. However, in this case global mutual information referring to the whole data table is required—not its particular fragments represented by separate packrows 310. In previous sections, the following naïve technique was used to estimate global mutual information for columns a, b in table T (where N denotes the amount of packrows in T):

$$\tilde{I}(a, b) = \frac{1}{N} \sum_{t=1}^{N} \tilde{I}_t(a, b) \quad (26)$$

To assess reliability of formula (26), a comparative analysis of mRMR outcomes produced using approximate and exact modes of calculating mutual information was conducted. A data set containing several millions of network transmissions, obtained from a company developing tools for early detection of viruses and worms was investigated with the aim of identifying features characterizing suspiciously large transfers.

In order to calculate exact variant of mutual information measure I, the data set was first discretized using the same procedure as the one applied in our approximate engine to identify meaningful ranges 285 and special values 295 for particular packrows. Thus, for each column, a single "big data pack" representing the whole column's content was quantized. Then I was calculated for each pair of discretized columns.

Orderings of additions of columns were analyzed to feature sets constructed by mRMR algorithm. Although final outcomes differed from each other, by operating with approximate $\tilde{I}$ instead of exact I, mRMR still produced useful feature sets. On the other hand, a disadvantage of mRMR is that its outputs can be sensitive with respect to heuristic choices of features at early stages of selection process. Hence, experiments focusing simply on information scores, without applying them as inputs to any more sophisticated algorithms were conducted.

In an example, the quantization procedure was examined from the perspective of its expressive power, including its comparison with other data discretization techniques. Domain of a given column (within a given packrow 310) is first split onto eight equal-length intervals in order to assure that all its areas are described in sufficiently detailed way. Then, each of such intervals is partitioned onto eight smaller buckets supported by roughly uniform (within the given interval) number of original rows. In the meantime, a certain amount of special values 295 is identified. This way, one-column domain characteristics are obtained that can be useful for internal engine mechanisms and—on top of that—for external data representation and visualization purposes. Therefore, the aforementioned illustrative experiment based on utilizing the quantization algorithm also at the level of full data makes sense from a practical perspective.

Experiments

Figure 26:
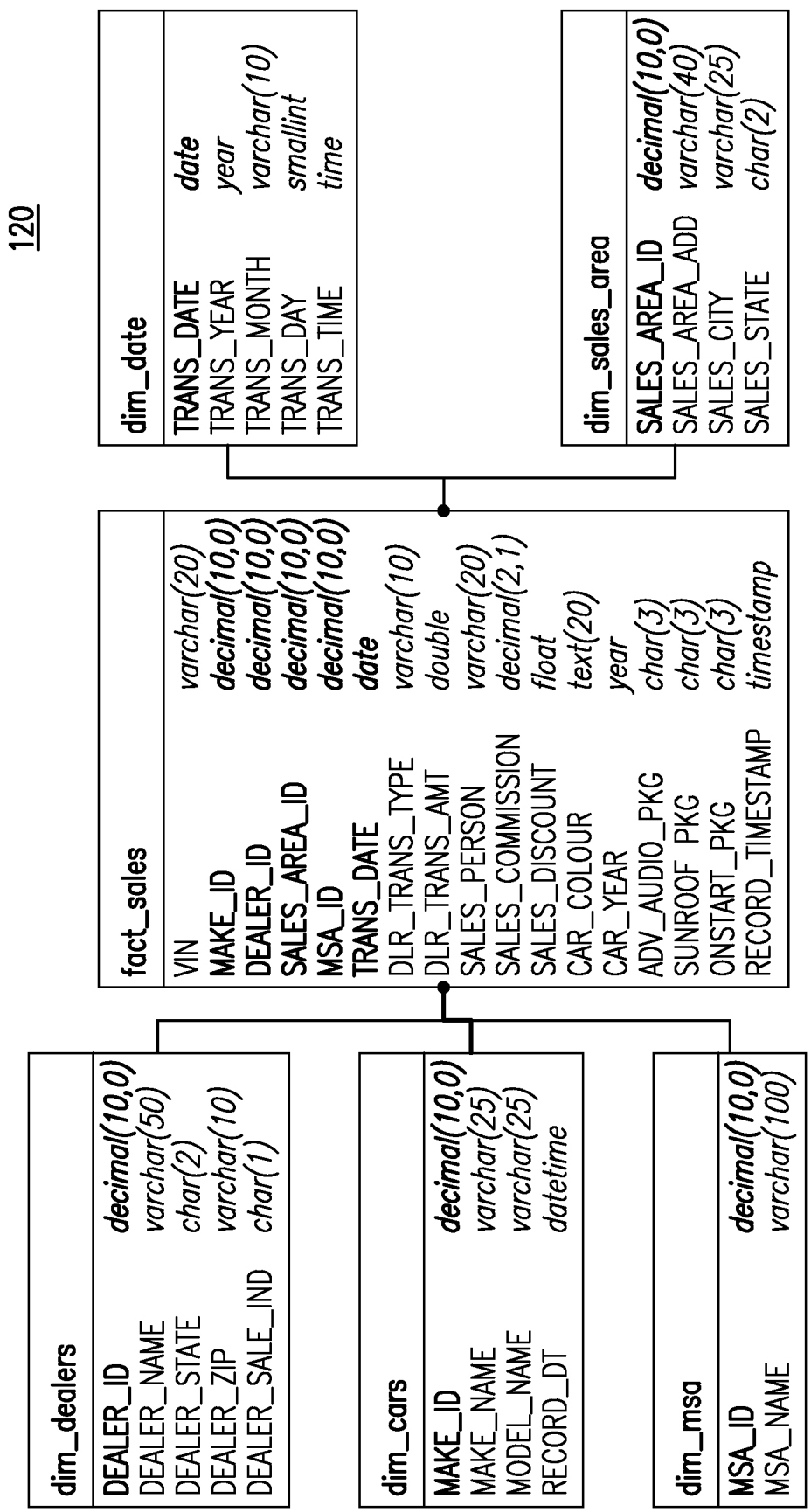
FIG. 26 is an exemplary "car sales" database, an artificial data set with 1,000,000,000 rows in the fact table.

Previous experiments—referring to tuning parameters of our data summaries 340 from the perspectives of, respectively, approximate query and feature selection accuracies—were conducted on proprietary real world data sets. An exemplary artificially created data set called "car_sales" was also utilized. FIG. 26 illustrates the "car_sales" database—an artificial data set (with 1,000,000,000 rows in the fact table). Herein, its denormalized version and accuracy of approximate calculation of mutual information measure against the subtable consisting of its first $100 \times 2^{16}$ rows (a relatively small subset containing $100 \times 2^{16}$ rows therefore represented by 100 summarized packrows 310) were considered. Table 15 shows mutual information rankings obtained for pairs of "car_sales" columns using exact and approximate modes of calculations. In both cases, 50 most strongly interdependent column pairs a-b, ordered descending by I(a, b) and $\tilde{I}(a, b)$, respectively, are displayed. Exact computation of/was preceded by global discretization of the original data set using the same method as the one applied in the illustrative approximate database engine per-packrow, in order to derive special values 295 and range complements 140.

Rankings—not specific quantities—were considered as this is the key aspect of comparing different pairs of columns while, e.g., conducting feature selection processes. When looking at Table 15, for the set of columns with identifiers and time-specific attributes excluded, it is seen that general tendencies in score orderings obtained using both variants of calculations are quite comparable to each other. In particular, top four interdependencies in both scenarios are the same.

TABLE 15

| rank based on exact I-scores | rank based on approx. I-scores |
|---|---|
| model_name-record_dt | dealer_name-dealer_zip |
| make_name-record_dt | make_name-model_name |
| make_name-model_name | model_name-record_dt |
| dealer_zip dealer_name-dealer_state | make_name-record_dt dlr_trans_type-sales_commission dlr_trans_type- |
| dealer_state-dealer_zip sales_discount-sales_person sales_discount-sales_commission sales_person-sales_commission sales_discount- | sales_discount dealer_state-dealer_zip dealer_name-dealer_state sales commission-sales_discount sales_person-sales_commission |
| dlr_trans_type dlr_trans_type-sales_commission dlr_trans_type-sales_person sales_city-sales_state sales_area_add-sales_city dealer_name-dealer_sale_ind dealer_zip-dealer_sale_ind sales_area_add- | sales_person-sales discount dlr_trans_type-sales_person sales_city-sales_state dealer_state-dealer_sale_ind dealer_zip-dealer_sale_ind dealer_name-dealer_sale_ind dlr_trans_type-car_year |
| sales_state dealer_state-dealer_sale_ind record_dt-sales_area_add dealer_name-sales_city record_dt-dealer_name sales_city-sales_person model_name-sales_area_add dealer_zip-sales_city dealer_name-sales_person record_dt-sales_city model_name-dealer_name | dealer_sale_ind-car_year car_year-onstart_pkg dlr_trans_type-car_colour car_year-sunroof_pkg car_year-adv_audio_pkg car_colour-onstart_pkg car_colour-sunroof_pkg dealer_state-dlr_trans_type make_name-sunroof_pkg make_name-dlr_trans_type |

TABLE 15-continued

| | |
|---|---|
| record_dt-dealer_zip sales_area_add-msa_name sales_discount-record_dt sales_discount-sales_city record_dt-sales_person sales_discount-dealer_name dealer_zip-sales_person model_name-sales_city sales_discount-sales_area_add dlr_trans_amt-record_dt model_name-dealer_zip record_dt-msa_name model_name-sales_person sales_city-msa_name sales_discount-model_name sales_discount-dealer_zip dealer_name-msa_name msa_name-sales_person dealer_name-sales_area_add dlr_trans_amt-model_name dealer_zip-msa_name dlr_trans_amt-msa_name dealer_zip-sales_area_add | dealer_sale_ind-car_colour dealer_state-sunroof_pkg sales_state-adv_audio_pkg car_colour-adv_audio_pkg dealer_state-adv_audio_pkg make_name-dealer_sale_ind sales_commission-car_year sales_person-car_year sales_discount-car_year sales_state-dlr_trans_type sales_state-onstart_pkg make_name-onstart_pkg sales_person-car_colour sales_commission-car_colour sales_discount-car_colour dealer_state-onstart_pkg make_name-adv_audio_pkg dealer_sale_ind-sales_state sales_state-sunroof_pkg dealer_state-sales_discount dealer_state-sales_commission dealer_state-sales_person make_name-sales_commission |

TABLE 16

| column | I(*, pack) |
|---|---|
| sales_area_add | 0.000576 |
| dlr_trans_amt | 0.000573 |
| dealer_name | 0.000548 |
| record_dt | 0.000548 |
| sales_city | 0.000532 |
| model_name | 0.000530 |
| dealer_zip | 0.000527 |
| sales_person | 0.000521 |
| sales_discount | 0.000520 |
| msa_name | 0.000488 |
| sales_commission | 0.000295 |
| sales_state | 0.000192 |
| dealer_state | 0.000172 |
| make_name | 0.000142 |
| car_colour | 0.000096 |
| car_year | 0.000053 |
| adv_audio_pkg | 0.000004 |
| dlr_trans_type | 0.000004 |
| sunroof_pkg | 0.000003 |
| onstart_pkg | 0.000003 |
| dealer_sale_ind | 0.000002 |

On the other hand, there are also significant differences. One of them refers to columns whose value ranges 285 vary most often when looking at different packrows 310, i.e., so-called "time-dependent" columns (where "time" is interpreted as natural flow of rows as they are loaded into a database). Such columns were identified by measuring their exact mutual information/with respect to an artificial column indicating ordinal numbers of packrows that particular rows belong to (values from 1 to 100). Outcomes of such scoring are reported in Table 16 above which ranks most "time-dependent" columns in the "car_sales" data set. I (*, pack) denotes mutual information (computed on the original data) measured between particular columns and column pack labeling rows with their packrow numbers. The column with packrow indicators is denoted as pack.

Mutual information scores involving "time-dependent" columns tend to be relatively weaker in approximate variant of computations than in its exact counterpart. For better visualization, 10 columns most strongly correlated with packrow ordinal numbers are bolded in both tables. Clearly, mutual information scores for such columns are underestimated comparing to the others during considered Ĩ-approximate calculations.

Experimental results are quite intuitive as the approach to approximating mutual information was originally designed for the purpose of local computations. By averaging local approximations, one cannot fully express dependencies between columns in the entire data. Still, it may be relatively easy to introduce an additional coefficient reflecting "inter-packrow" co-occurrences that would be complementary to "intra-packrow" level that is already in place.

In an embodiment, one approach is to merge summaries of single packrows 310 into overall data representation and conduct extra calculations at such unified level. The first step may be to derive global quantization of domains of particular columns based on characteristics of their corresponding data packs 275. Then, by projecting approximations of each of local (per-packrow) pairwise probability distributions onto a "grid" of globally quantized column domains, pairwise distributions corresponding to the whole data table may be estimated. Such estimation is likely to be less accurate with respect to local relationships between columns within particular data fragments. However, this is what is needed—scores calculated based on such high-level distributions can be sufficient counterparts for scores $\tilde{I}_t$ (a, b), t=1, . . . , N, that are designed to reflect those local relationships.

Figure 27:
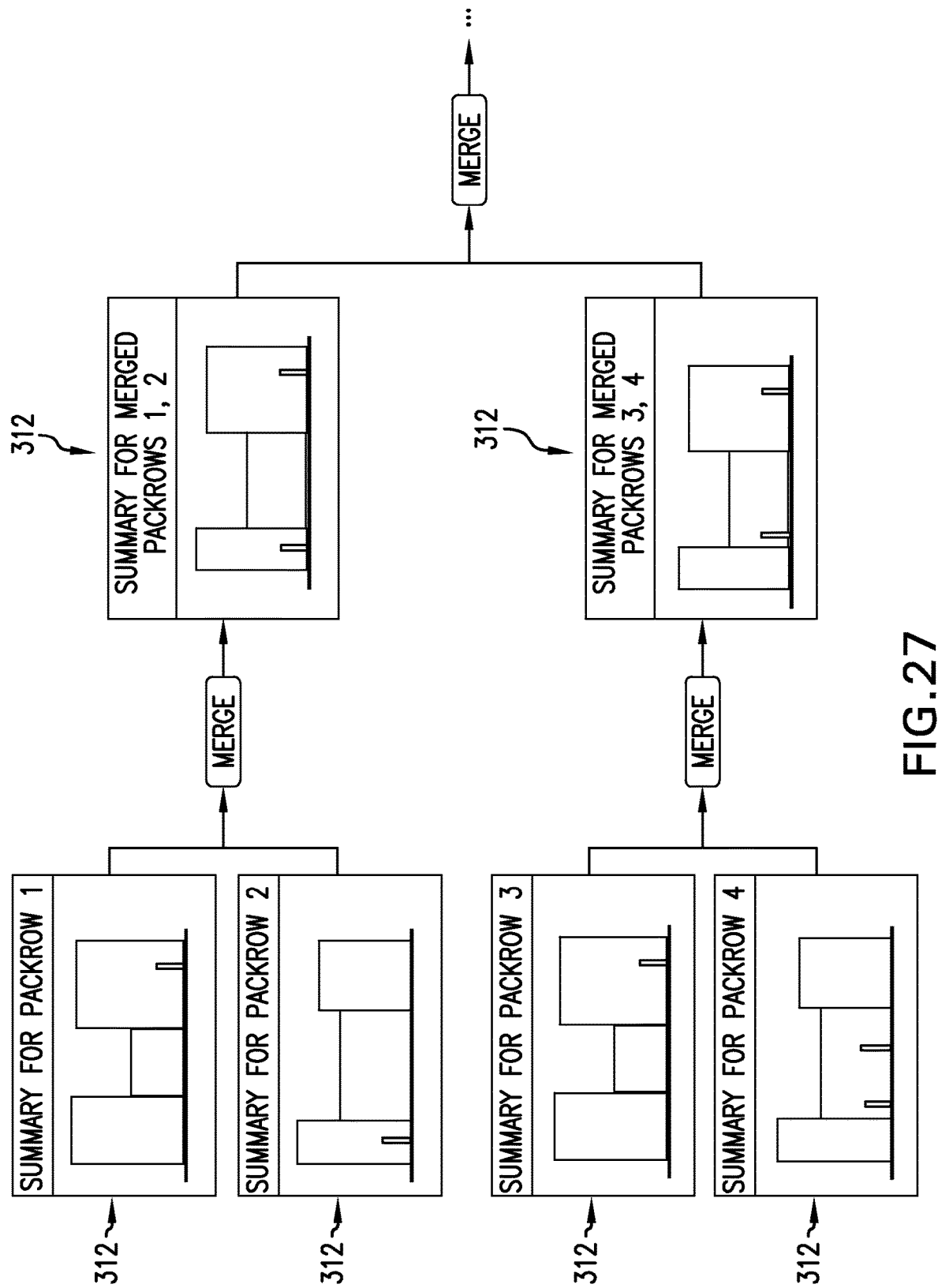
FIG. 27 illustrates construction of global representation of column a based on (multithreaded) agglomerative merging of local per-packrow summaries.

FIG. 27 illustrates how such global quantization can be obtained in agglomerative way. At each step, summaries of two packrows 312 are merged, composing their unified compacted representation that can serve as input for next steps. Merging is performed by summing up (in a weighted way, if particular packrows 310 consisted originally different amounts of rows) two histograms 280 (as well as special values 295, etc.) and running quantization algorithm that is analogous to the one used during data load. As the sets of histogram ranges 285 representing two packrows 310 can differ from each other, the algorithm is executed on joint histogram with potentially higher resolution. Hence, its main task is to choose range 285 borders (and special values 295) providing most reasonable merged representation using limited footprint (that is more comparable to footprint 570 of each of single packrows 310 rather than a sum of their footprints).

Analogous idea of merging packrow summaries 312 was outlined above in context of approximate execution of multi-table queries. This kind of strategy is used to deal with one-to-many join operations. Namely, whenever needed, algorithms produce a unified "big-packrow" summary of a dimension table and then, in a loop, such summary is amalgamated with particular fact table packrows (which lets us compose extended denormalized representations of those packrows). Thus, the mechanism of assembling global representations based on per-packrow summaries 312 may be helpful in many different scenarios. Moreover, the engine specific multithreaded implementation shows that such merging operations can be highly optimized.

The obtained global quantization of column a is denoted by a*. One way of looking at a* is by means of CASE WHEN expression that labels values of a with identifiers of domain parts (special values 295 or range complements 140) of a's global histogram representation that they drop into. Then, one may approximate mutual information I(a, b) by running SQL statement "SELECT a*, b*, count(*) FROM T GROUP BY a*, b*;" and aggregating its outcome as I(a*, b*) (or rather Ĩ (a*, b*) I given the fact that query results produced by the exemplary database engine are approximate). Ĩ (a*, b*) may serve as the aforementioned coefficient reflecting "interpackrow" dependencies between columns a and b.

To summarize, an improvement of approximation of mutual information scores that are insufficiently modeled by equation (26) are provided. Coefficient Ĩ (a*, b*) derived above may be a good approximation of I(a, b) by itself. However, the key point is to learn how to combine it with local scores, Ĩ(a, b). This ultimate idea can be expressed by the following equation, where ⊗ denotes combination operator:

$$I(a,b) \approx \widetilde{I_1}(a,b) \otimes \ldots \otimes \widetilde{I_N}(a,b) \otimes \tilde{I}(a^*,b^*) \qquad (27)$$

Equation (27) represents just one of possible options. In particular, although the engine runs fast on large data sets, derivation of Ĩ(a*, b*) may be a bottleneck compared to distributed computations of $\tilde{I}_t(a, b)$, t=1, . . . , N.

First, in granular computing, where any calculations are supposed to run over so-called information granules gathering together various forms of entities that are similar or adjacent to each other, if packrows 310 are interpreted as groups of adjacent entities and their summaries 312 treated as information granules, then the overall approximate analytics framework, as well as previous developments in the area of analytical databases, may be envisioned as industry-ready deployment of granular computing paradigms.

Figure 28:
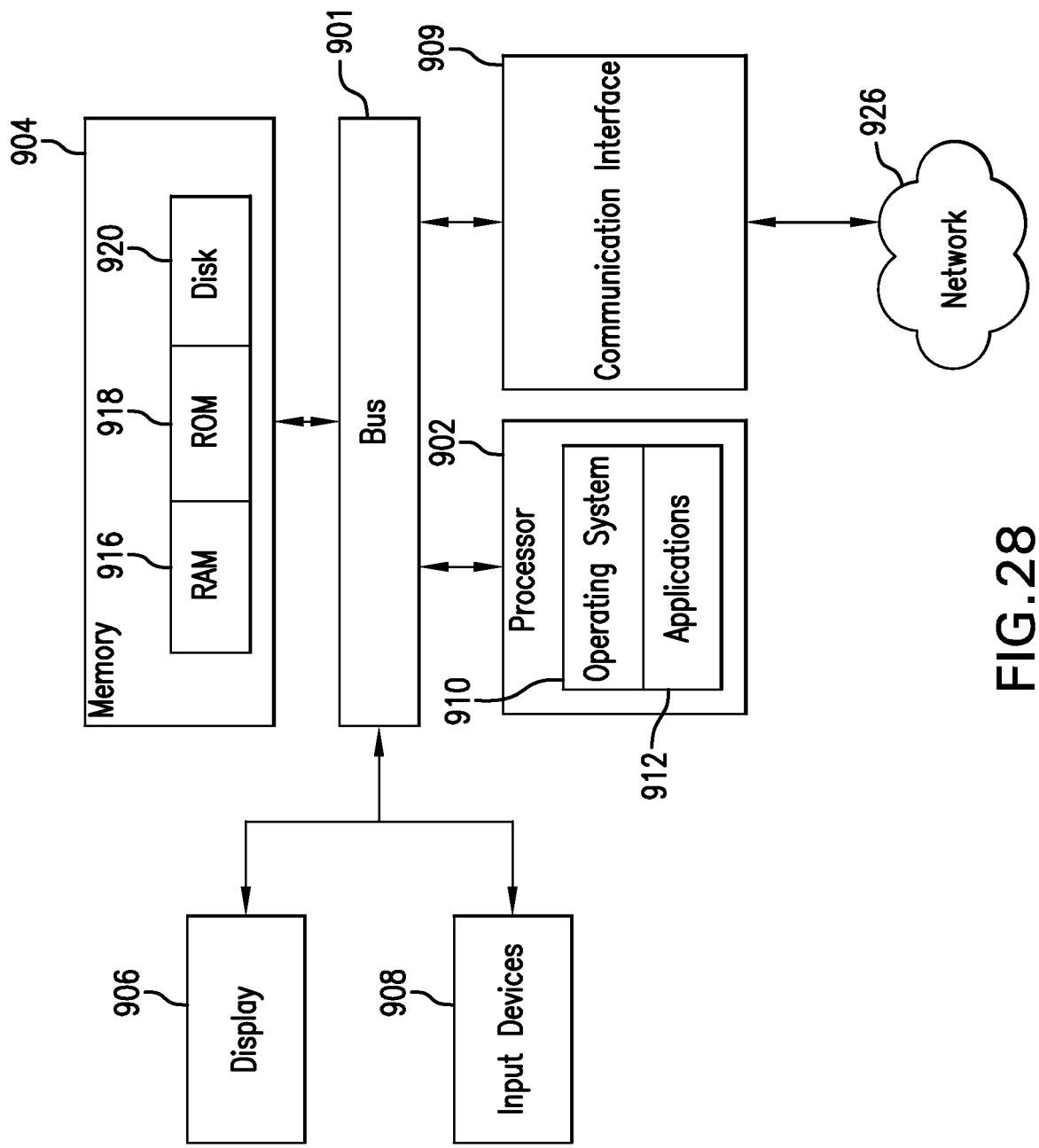
FIG. 28 is an exemplary block diagram of a computer system in accordance with embodiments of the present systems and methods.

Second, referring to somewhat relevant approach to data clustering, data rows are dynamically grouped into microclusters (analogous to our packrows) and then, the final clustering process is conducted on vectors of their averaged summaries. Therein, the contents of particular micro-clusters are assumed to be sufficiently homogeneous to neglect operations at "intrapackrow" level. In case of both granular computing and aforementioned data clustering, the fundamental idea is to handle highly aggregated objects whose footprint is even smaller than in case of our one- and two-column summaries 312. These approaches serve as a guideline to design faster (and still meaningful enough as complementary computation) methods to obtain the last component in equation (27). In the field of databases, in order to operate with aforementioned balance, one first needs to understand how to express accuracy of approximate calculations. This may be thought of as measuring appropriately specified similarities between exact and approximate query outcomes. Analogously, in the area of data mining, one may adapt for this purpose some already-existing approaches to structural comparisons of models learnt from the data. An exemplary block diagram of a computer system 900, in which processes involved in the embodiments described herein may be implemented, is shown in FIG. 28.

The computer system/device architecture 900 may be representative of a client application or any of the computing devices, servers, or computers described above. The computing device 900 generally may include a bus 901, a one or more than one microprocessor or processor 902, a memory 904 a display 906, one or more user input devices 908, and a communication interface 909, which may all be coupled to the bus 901. The system 900 executes program instructions to carry out the functions of the present systems and methods. The present communications systems and methods also include embodiments in which computer system 900 is implemented as a plurality of networked computer systems, which may be single-processor computer systems, multi-processor computer systems, or a mix thereof. The computing device 900 may additionally include a display device (not shown) for communicating an output to a user. In one example, the user input devices 908 may be a keyboard or pointing device such as a mouse. Input/output circuitry provides the capability to input data to, or output data from the computer system 900. For example, input/output circuitry may include input devices 908, such as keyboards, mice, touchpads, trackballs, scanners, analog to digital converters, etc., output devices, such as video adapters, monitors, printers, etc., and input/output devices, such as, modems, etc. A network adapter may interfaces device 900 with a network 926. Network 926 may be any public or proprietary LAN or WAN, including, but not limited to the Internet.

Memory 904 stores program instructions that are executed by, and data that are used and processed to perform the functions of computer system 900. Memory 904 may include, for example, electronic memory devices, such as random-access memory (RAM) 916, read-only memory (ROM) 918, programmable read-only memory (PROM), electrically erasable programmable read-only memory (EEPROM), flash memory, etc., and electro-mechanical memory/disks 920, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 904 may vary depending upon the function that computer system 900 is programmed to perform. In the example shown in FIG. 28, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements. The communication interface 909 provides an interface for communicating with a network 926. An operating system 910 or applications 912 run on the processor 902. In one example, the data processing system 900 may include either a client or a server. Any of the software modules or components mentioned above may be stored in the memory 904 for execution by the processor 902.

As shown in FIG. 28, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for capture and transformation of granulated data summaries from a data set stored in a server implemented in a computer system comprising a processor, a memory adapted to store program instructions and data, and program instructions executable by the processor to perform:
   receiving, at the computer system, a query for at least one chunk of data stored in the server;
   generating, at the computer system, a response to the query including a result generated from at least one data summary of the at least one chunk of data without accessing the data itself, wherein generating at least one data summary for the at least one chunk of data comprises:
      dividing, at the computer system, the data stored in the server into a plurality of chunks;
      generating, at the computer system, statistical information for at least some columns in some of the chunks of the data;
      generating, at the computer system, statistical information about relationships between at least some pairs of columns of the chunks of data; and
      generating, at the computer system, at least one data summary based on the generated statistical information for the at least some columns and the generated statistical information about relationships between at least some pairs of columns; and
   transmitting, at the computer system, the generated response to the query.

2. The method of claim 1, wherein generating a response to the query comprises utilizing, at the computer system, a mechanism of tree-based belief propagation adapted to populate changes in the at least one data summary.

3. The method of claim 1, wherein the generated response to the query is a standard SQL result.

4. A method for capture and transformation of granulated data summaries from a data set stored in a server implemented in a computer system comprising a processor, a memory adapted to store program instructions and data, and program instructions executable by the processor to perform:
   receiving, at the computer system, a query for at least one chunk of data stored in the server;
   generating, at the computer system, a response to the query including a result generated from at least one data summary of the at least one chunk of data without accessing the data itself, wherein generating at least one data summary for at least one chunk of the data comprises:
      receiving, at the computer system, data including a plurality of rows of the data at the computer system;
      generating, at the computer system, at least a chunk of the data including a predetermined number of received rows of the data;
      generating, at the computer system, statistical information for the generated chunks of the data;
      generating, at the computer system, statistical information about relationships between at least some pairs of columns of the chunks of data; and
      generating, at the computer system, at least one data summary based on the generated statistical information for the generated chunks of data and on the generated statistical information about relationships between the at least some pairs of columns of the chunks of data; and
   transmitting, at the computer system, the generated response to the query.

5. The method of claim 4, wherein the statistical information for the generated chunks of data and the statistical information about relationships are updated using the at least one data summary that is generated as data is received by the computer system.

6. A method for capture and transformation of granulated data summaries from a data set stored in a server implemented in a computer system comprising a processor, a memory adapted to store program instructions and data, and program instructions executable by the processor to perform:
   receiving, at the computer system, a query for at least one chunk of data stored in the server;
   generating, at the computer system, a response to the query including a result generated from at least one data summary of the at least one chunk of data without accessing the data itself, wherein the at least one data summary of the at least one chunk of data takes the form of a relational data table with columns and rows, wherein the at least one data summary comprises at least one histogram reflecting intensities of occurrences of values of at least one column, and at least one co-occurrence ratio reflecting intensities of co-occurrences of values of a plurality of columns; and
   transmitting, at the computer system, the generated response to the query.

7. The method of claim 6, wherein the at least one histogram reflects intensities of occurrences within a quantized domain of values of the at least one column within the at least one data chunk, and wherein the at least one co-occurrence ratio reflects intensities of co-occurrences of quantized values of the plurality of columns.

8. The method of claim 7, wherein the domain of values of the at least one column is quantized based on heuristic classification of the estimated expected accuracy of the generated response to the query subject to different choices of quantization settings.

9. The method of claim 7, wherein the at least one co-occurrence ratio does not represent information about all possible combinations of values of the plurality of columns and the co-occurrence ratios related to unrepresented combinations of values are estimated based on information about the at least one co-occurrence ratio related to combinations of the quantized values.

10. The method of claim 7, wherein the at least one co-occurrence ratio to be represented is selected from a set of all combinations of values of the plurality of columns based on heuristic classification of the estimated expected accuracy of the generated response to the query.

11. A system for capture and transformation of granulated data summaries from a data set stored in a server, the system comprising a processor, a memory adapted to store program instructions and data, and program instructions executable by the processor to perform:
 receiving a query for at least one chunk of data stored in the server;
 generating a response to the query including a result generated from at least one data summary of the at least one chunk of data without accessing the data itself, wherein generating at least one data summary for the at least one chunk of data comprises:
  dividing, at the computer system, the data stored in the server into a plurality of chunks;
  generating, at the computer system, statistical information for at least some columns in some of the chunks of the data;
  generating, at the computer system, statistical information about relationships between at least some pairs of columns of the chunks of data; and
  generating at least one data summary based on the generated statistical information for the at least some columns and the generated statistical information about relationships between at least some pairs of columns; and
 transmitting the generated response to the query.

12. The system of claim 11, wherein generating a response to the query comprises utilizing a mechanism of tree-based belief propagation adapted to populate changes in the at least one data summary.

13. The system of claim 11, wherein the generated response to the query is a standard SQL result.

14. A system for capture and transformation of granulated data summaries from a data set stored in a server, the system comprising a processor, a memory adapted to store program instructions and data, and program instructions executable by the processor to perform:
 receiving a query for at least one chunk of data stored in the server;
 generating a response to the query including a result generated from at least one data summary of the at least one chunk of data without accessing the data itself, wherein generating at least one data summary for at least one chunk of the data comprises:
  receiving data including a plurality of rows of the data at the computer system;
  generating at least a chunk of the data including a predetermined number of received rows of the data;
  generating statistical information for the generated chunks of the data;
  generating statistical information about relationships between at least some pairs of columns of the chunks of data; and
  generating at least one data summary based on the generated statistical information for the generated chunks of data and on the generated statistical information about relationships between the at least some pairs of columns of the chunks of data; and
 transmitting the generated response to the query.

15. The system of claim 14, wherein the statistical information for the generated chunks of data and the statistical information about relationships are updated using the at least one data summary that is generated as data is received by the computer system.

16. A system for capture and transformation of granulated data summaries from a data set stored in a server, the system comprising a processor, a memory adapted to store program instructions and data, and program instructions executable by the processor to perform:
 receiving a query for at least one chunk of data stored in the server;
 generating a response to the query including a result generated from at least one data summary of the at least one chunk of data without accessing the data itself, wherein the at least one data summary of the at least one chunk of data takes the form of a relational data table with columns and rows, wherein the at least one data summary comprises at least one histogram reflecting intensities of occurrences of values of at least one column, and at least one co-occurrence ratio reflecting intensities of co-occurrences of values of a plurality of columns; and
 transmitting the generated response to the query.

17. The system of claim 16, wherein the at least one histogram reflects intensities of occurrences within a quantized domain of values of the at least one column within the at least one data chunk, and wherein the at least one co-occurrence ratio reflects intensities of co-occurrences of quantized values of the plurality of columns.

18. The system of claim 17, wherein the domain of values of the at least one column is quantized based on heuristic classification of the estimated expected accuracy of the generated response to the query subject to different choices of quantization settings.

19. The system of claim 17, wherein the at least one co-occurrence ratio does not represent information about all possible combinations of values of the plurality of columns and the co-occurrence ratios related to unrepresented combinations of values are estimated based on information about the at least one co-occurrence ratio related to combinations of the quantized values.

20. The system of claim 17, wherein the at least one co-occurrence ratio to be represented is selected from a set of all combinations of values of the plurality of columns based on heuristic classification of the estimated expected accuracy of the generated response to the query.

21. A computer program product, for capture and transformation of granulated data summaries from a data set stored in a server, the computer program product comprising a non-transitory computer readable storage medium having program instructions embodied therewith, the program instructions executable by a computer to cause the computer to perform the method comprising:
 receiving, at the computer system, a query for at least one chunk of data stored in the server;

generating, at the computer system, a response to the query including a result generated from at least one data summary of the at least one chunk of data without accessing the data itself, wherein generating at least one data summary for the at least one chunk of data comprises:
    dividing, at the computer system, the data stored in the server into a plurality of chunks;
    generating, at the computer system, statistical information for at least some columns in some of the chunks of the data;
    generating, at the computer system, statistical information about relationships between at least some pairs of columns of the chunks of data; and
    generating, at the computer system, at least one data summary based on the generated statistical information for the at least some columns and the generated statistical information about relationships between at least some pairs of columns; and
transmitting, at the computer system, the generated response to the query.

22. The computer program product of claim 21, wherein generating a response to the query comprises utilizing, at the computer system, a mechanism of tree-based belief propagation adapted to populate changes in the at least one data summary.

23. The computer program product of claim 21, wherein the generated response to the query is a standard SQL result.

24. A computer program product, for capture and transformation of granulated data summaries from a data set stored in a server, the computer program product comprising a non-transitory computer readable storage medium having program instructions embodied therewith, the program instructions executable by a computer to cause the computer to perform the method comprising:
    receiving, at the computer system, a query for at least one chunk of data stored in the server;
    generating, at the computer system, a response to the query including a result generated from at least one data summary of the at least one chunk of data without accessing the data itself, wherein generating at least one data summary for the at least one chunk of data comprises:
        receiving, at the computer system, data including a plurality of rows of the data at the computer system;
        generating, at the computer system, at least a chunk of the data including a predetermined number of received rows of the data;
        generating, at the computer system, statistical information for the generated chunks of the data;
        generating, at the computer system, statistical information about relationships between at least some pairs of columns of the chunks of data; and
        generating, at the computer system, at least one data summary based on the generated statistical information for the generated chunks of data and on the generated statistical information about relationships between the at least some pairs of columns of the chunks of data; and
    transmitting, at the computer system, the generated response to the query.

25. The computer program product of claim 24, wherein the statistical information for the generated chunks of data and the statistical information about relationships are updated using the at least one data summary that is generated as data is received by the computer system.

26. A computer program product, for capture and transformation of granulated data summaries from a data set stored in a server, the computer program product comprising a non-transitory computer readable storage medium having program instructions embodied therewith, the program instructions executable by a computer, to cause the computer to perform a method comprising:
    receiving, at the computer system, a query for at least one chunk of data stored in the server;
    generating, at the computer system, a response to the query including a result generated from at least one data summary of the at least one chunk of data without accessing the data itself, wherein the at least one data summary of the at least one chunk of data takes the form of a relational data table with columns and rows, wherein the at least one data summary comprises at least one histogram reflecting intensities of occurrences of values of at least one column, and at least one co-occurrence ratio reflecting intensities of co-occurrences of values of a plurality of columns; and
    transmitting, at the computer system, the generated response to the query.

27. The computer program product of claim 26, wherein the at least one histogram reflects intensities of occurrences within a quantized domain of values of the at least one column within the at least one data chunk, and wherein the at least one co-occurrence ratio reflects intensities of co-occurrences of quantized values of the plurality of columns.

28. The computer program product of claim 27, wherein the domain of values of the at least one column is quantized based on heuristic classification of the estimated expected accuracy of the generated response to the query subject to different choices of quantization settings.

29. The computer program product of claim 27, wherein the at least one co-occurrence ratio does not represent information about all possible combinations of values of the plurality of columns and the co-occurrence ratios related to unrepresented combinations of values are estimated based on information about the at least one co-occurrence ratio related to combinations of the quantized values.

30. The computer program product of claim 27, wherein the at least one co-occurrence ratio to be represented is selected from a set of all combinations of values of the plurality of columns based on heuristic classification of the estimated expected accuracy of the generated response to the query.

* * * * *